US 6,731,631 B1

(12) United States Patent
Chang et al.

(10) Patent No.: US 6,731,631 B1
(45) Date of Patent: May 4, 2004

(54) SYSTEM, METHOD AND ARTICLE OF MANUFACTURE FOR UPDATING A SWITCHING TABLE IN A SWITCH FABRIC CHIPSET SYSTEM

(75) Inventors: You-Sung Chang, Taejon (KR); Ju-Hwan Yi, Taejon (KR); Seung-Wang Lee, Taejon (KR); Moo-Kyung Kang, Taejon (KR)

(73) Assignee: Paion Company, Limited, Seoul (KR)

( * ) Notice: Subject to any disclaimer, the term of this patent is extended or adjusted under 35 U.S.C. 154(b) by 0 days.

(21) Appl. No.: 09/669,319

(22) Filed: Sep. 25, 2000

Related U.S. Application Data
(60) Provisional application No. 60/225,034, filed on Aug. 11, 2000.

(51) Int. Cl.[7] .......................... H04L 12/56; G06F 13/00
(52) U.S. Cl. ....................... 370/388; 370/389; 370/422; 709/238
(58) Field of Search ................................. 370/351, 359, 370/360, 386, 388, 389, 392, 401, 411, 422, 395.1; 709/237, 238, 244

(56) References Cited

U.S. PATENT DOCUMENTS

| 4,639,881 A | 1/1987 | Zingher |
| 4,998,242 A | 3/1991 | Upp |
| 5,068,916 A | 11/1991 | Harrison et al. |
| 5,119,370 A | 6/1992 | Terry |
| 5,276,445 A | 1/1994 | Mita et al. |
| 5,408,469 A * | 4/1995 | Opher et al. ................ 370/60.1 |
| 5,689,500 A * | 11/1997 | Chiussi et al. ............... 370/235 |
| 5,732,087 A | 3/1998 | Lauer et al. |
| 5,831,980 A | 11/1998 | Varma et al. |
| 5,835,491 A | 11/1998 | Davis et al. |
| 6,046,979 A | 4/2000 | Bauman |
| 6,067,300 A | 5/2000 | Baumert et al. |
| 6,067,301 A | 5/2000 | Aatresh |
| 6,078,963 A * | 6/2000 | Civanlar et al. ............ 709/238 |
| 6,084,858 A | 7/2000 | Matthews et al. |
| 6,122,669 A | 9/2000 | Crayford |
| 6,157,643 A * | 12/2000 | Ma ........................... 370/389 |
| 6,163,539 A | 12/2000 | Alexander et al. |
| 6,252,878 B1 * | 6/2001 | Locklear, Jr. et al. ....... 370/401 |

FOREIGN PATENT DOCUMENTS

| WO | WO 97/09806 A1 | 3/1997 | |
| WO | WO 97/09806 | * 3/1997 | ........... H04L/12/64 |

* cited by examiner

Primary Examiner—Alpus H. Hsu
(74) Attorney, Agent, or Firm—Squire, Sanders & Dempsey L.L.P.

(57) ABSTRACT

A system, method and article of manufacture are provided for updating a switching table in a switch fabric. In general, one or more status packets are received by a switch fabric component without handshaking between the transmitting source(s) and the receiving switch fabric component. Each status packet includes information relating to a status of an output port. A switching table is then updated based on the status information of the received status packet.

25 Claims, 43 Drawing Sheets

SF1 SWITCHING TABLE

| SF PORT | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1/1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2/1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3/1 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4/1 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5/1 | 0 | 0 | 0 | 0 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6/1 | 0 | 0 | 0 | 0 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| 7/1 | 0 | 0 | 0 | 0 | 0 | 0 | 0 | 0 | 0 | 0 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| 8/1 | 0 | 0 | 0 | 0 | 0 | 0 | 0 | 0 | 0 | 0 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |

DEVICE PORT

FIG. 23

SF2 SWITCHING TABLE

DEVICE PORT

| SF PORT | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1/2 | 1 | 1 | 1 | 1 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 | 0 | 0 | 0 |
| 2/2 | 0 | 1 | 1 | 1 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 | 0 | 0 | 0 |
| 3/2 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4/2 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5/2 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6/2 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7/2 | 0 | 0 | 0 | 0 | 0 | 0 | 0 | 0 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 8/2 | 0 | 0 | 0 | 0 | 0 | 0 | 0 | 0 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |

FIG. 24

SF3 SWITCHING TABLE

| SF PORT \ DEVICE PORT | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1/3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2/3 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 3/3 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4/3 | 1 | 1 | 1 | 1 | 1 | 1 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 |
| 5/3 | 0 | 0 | 0 | 0 | 0 | 0 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |
| 6/3 | 0 | 0 | 0 | 0 | 0 | 0 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 |
| 7/3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8/3 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |

FIG. 25

SF4 SWITCHING TABLE

2302

| | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1/4 | 1 | 1 | 0 | 0 | 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 | 0 | 0 | 0 | 0 |
| 2/4 | 1 | 1 | 0 | 0 | 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 | 0 | 0 | 0 | 0 |
| 3/4 | 0 | 0 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4/4 | 0 | 0 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5/4 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6/4 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7/4 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8/4 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 |

DEVICE PORT

SF PORT

SYSTEM, METHOD AND ARTICLE OF MANUFACTURE FOR UPDATING A SWITCHING TABLE IN A SWITCH FABRIC CHIPSET SYSTEM

CROSS-REFERENCE TO RELATED APPLICATIONS

This application claims the benefit of U.S. Provisional Application No. 60/225034, filed Aug. 11, 2000, entitled "GIGABIT ETHERNET IP SWITCH CHIPSET" and which is incorporated herein by reference in its entirety for all purposes.

FIELD OF THE INVENTION

The present invention relates generally to data routing systems and, more particularly, to routing packets through a network switch.

BACKGROUND OF THE INVENTION

Ethernet is a widely-installed local area network technology. Specified in a standard, Institute of Electrical and Electronic Engineers (IEEE) 802.3, Ethernet was originally developed by Xerox and then developed further by Xerox, DEC, and Intel. An Ethernet LAN typically uses coaxial cable or special grades of twisted pair wires. A commonly installed Ethernet systems are called 10BASE-T and provide transmission speeds up to 10 Mbps. Devices are connected to the cable and compete for access using a Carrier Sense Multiple Access with Collision Detection (CSMA/CD) protocol. Fast Ethernet or 100BASE-T provides transmission speeds up to 100 megabits per second and may be used for LAN backbone systems, supporting workstations with 10BASE-T cards. Gigabit Ethernet provides an even higher level of backbone support at 1000 megabits per second (1 gigabit or 1 billion bits per second).

Fast Ethernet is a local area network transmission standard that provides a data rate of 100 megabits per second (referred to as "100BASE-T"). Workstations with existing 10 megabit per second (10BASE-T) Ethernet card can be connected to a Fast Ethernet network. (The 100 megabits per second is a shared data rate; input to each workstation is constrained by the 10 Mbps card). Gigabit Ethernet is a local area network transmission standard that provides a data rate of 1 billion bits per second (one gigabit). Gigabit Ethernet is defined in the IEEE 802.3 standard. Gigabit Ethernet may be used as an enterprise backbone. Gigabit Ethernet may be carried on optical fibers (with very short distances possible on copper media). Existing Ethernet LANs with 10 and 100 Mbps cards can feed into a Gigabit Ethernet backbone.

Data may be sent over a packet switching network using digital signals. In a packet switching network, users can share the same paths at the same time and the route a data unit travels can be varied as conditions change. In packet-switching, a message is divided into packets, which are units of a certain number of bytes. The network addresses of the sender and of the destination are added to the packet. Each network point looks at the packet to see where to send it next. Packets in the same message may travel different routes and may not arrive in the same order that they were sent. At the destination, the packets in a message are collected and reassembled into the original message.

Layering is the organization of programming into separate steps that are performed sequentially, defined by specific interface for passing the result of each step to the next program or layer until the overall function, such as the sending or receiving of some amount of information, is completed. Communication programs are often layered. The reference model for communication programs, Open System Interconnection (OSI) is a layered set of protocols in which two programs, one at either end of a communications exchange, use an identical set of layers. OSI includes of seven layers, each reflecting a different function that has to be performed in order for program-to-program communication to take place between computers. Transmission Control Protocol and Internet Protocol (TCP/IP) is an example of a two-layer set of programs that provide transport and network address functions for Internet communication.

A switch is a internetworking device that selects a path or circuit for sending a unit of data to its next destination. A switch may also include the function of a router and determine the route and specifically what adjacent network point the data should be sent to. Relative to the layered Open Systems Interconnection (OSI) communication model, a switch may be associated with the data link layer—Layer 2. Switches may also be capable of performing the routing functions of the network layer—Layer 3. Layer 3 switches are also sometimes called IP switches.

The Data Link Layer of OSI—Layer 2—is concerned with moving data across the physical links in the network. In a network, a switch may be a device that redirects data messages at the Layer 2 level, using the destination Media Access Control (MAC) address to determine where to direct the message. The Data-Link Layer contains two sublayers that are described in the IEEE-802 LAN standards: Media Access Control (MAC), and Logical Link Control (LLC). The Data Link Layer assures that an initial connection has been set up, divides output data into data frames, and handles the acknowledgements from a receiver that the data arrived successfully. It also ensures that incoming data has been received successfully by analyzing bit patterns at special places in the frames.

The Network Layer of OSI—Layer 3— is concerned with knowing the address of the neighboring nodes in the network, selecting routes and quality of service, and recognizing and forwarding to the transport layer incoming messages for local host domains. A switch may be a Layer 3 device and perform layer 3 functions. The IP address is a layer 3 address.

Switching, does by its nature, involves transient data flows. At Gigabit speeds, these transients occur extremely fast, and in a highly random manner. In the past, it has been difficult to determine in sufficiently fast enough speeds which components of a switch data flows should be directed to so as maximize data flow through the switch and reduce blocking traffic in the switch.

SUMMARY OF THE INVENTION

A system, method and article of manufacture are provided for updating a switching table in a switch fabric. In general, one or more status packets are received by a switch fabric component without handshaking between the transmitting source(s) and the receiving switch fabric component. Each status packet includes information relating to a status of an output port. A switching table is then updated based on the status information of the received status packet.

In an aspect of the present invention, the status packets may be received via paths/channels/conduits dedicated for transmitting the status packets and separate from paths dedicated for transmitting Ethernet packets through the switch fabric system. In another aspect of the present invention, the status packets may be received periodically and the switching table may be updated in real time.

In an embodiment of the present invention, a combined status packet may be generated based on the combined status information of the received status packets. The combined status packet may then be transmitted to other switch fabric components. In one aspect of such an embodiment, the combined status packet may be transmitted from an outer layer switch fabric component to a middle layer switch fabric component.

In one aspect of the present invention, the received status packet may be generated from a port controller. In a further aspect of the present invention, the received status packet may be generated by a switch fabric component. In yet another aspect of the present invention, the status packet may comprise 32 bits of data with each bit being associated with a port of the switch fabric component.

BRIEF DESCRIPTION OF THE DRAWINGS

The foregoing and other features, aspects and advantages are better understood from the following detailed description, appended claims, and accompanying drawings where:

FIGS. 23, 24, 25, 26 are schematic illustrations of exemplary switching tables for the switch fabric depicted in FIG. 22 in accordance with an embodiment of the present invention;

DETAILED DESCRIPTION

An Ethernet switch fabric chipset system is disclosed utilizing a switch fabric topology and a multiprocessor port controller capable of supporting wire-speed, non-blocking, Layer 2 and Layer 3 switching of 32 Gigabit Ethernet data streams, and which is expandable to what is known in the art as network processor. For a basic understanding of switching technology, the reader is directed to: *The Switch Book: the complete guide to LAN switching technology* by Rich Seifert (John Wiley & Sons, Inc. 2000) which is incorporated herein by reference in its entirety for all purposes.

With the system set forth herein, determinations as to which of the switch fabric components transient data flows can be directed may be made sufficiently fast enough to maximize data flow through the switch fabric system while preventing blockage by other data flow traffic. This is accomplished by making as much of the determination as possible before the transient occurs and reducing the decision to consideration of simple the next switch fabric component in the path, rather than the entire path through the switch fabric. As part of this solution, a separate control path may be provided in addition to the data path to provide for sending status and control information back through the switch fabric and to help reduce or eliminate the need for handshaking in the control path. As another part of this solution, a switching table may be provided inside each switch fabric component which can be updated utilizing the control path.

SYSTEM CONFIGURATION

Figure 1:
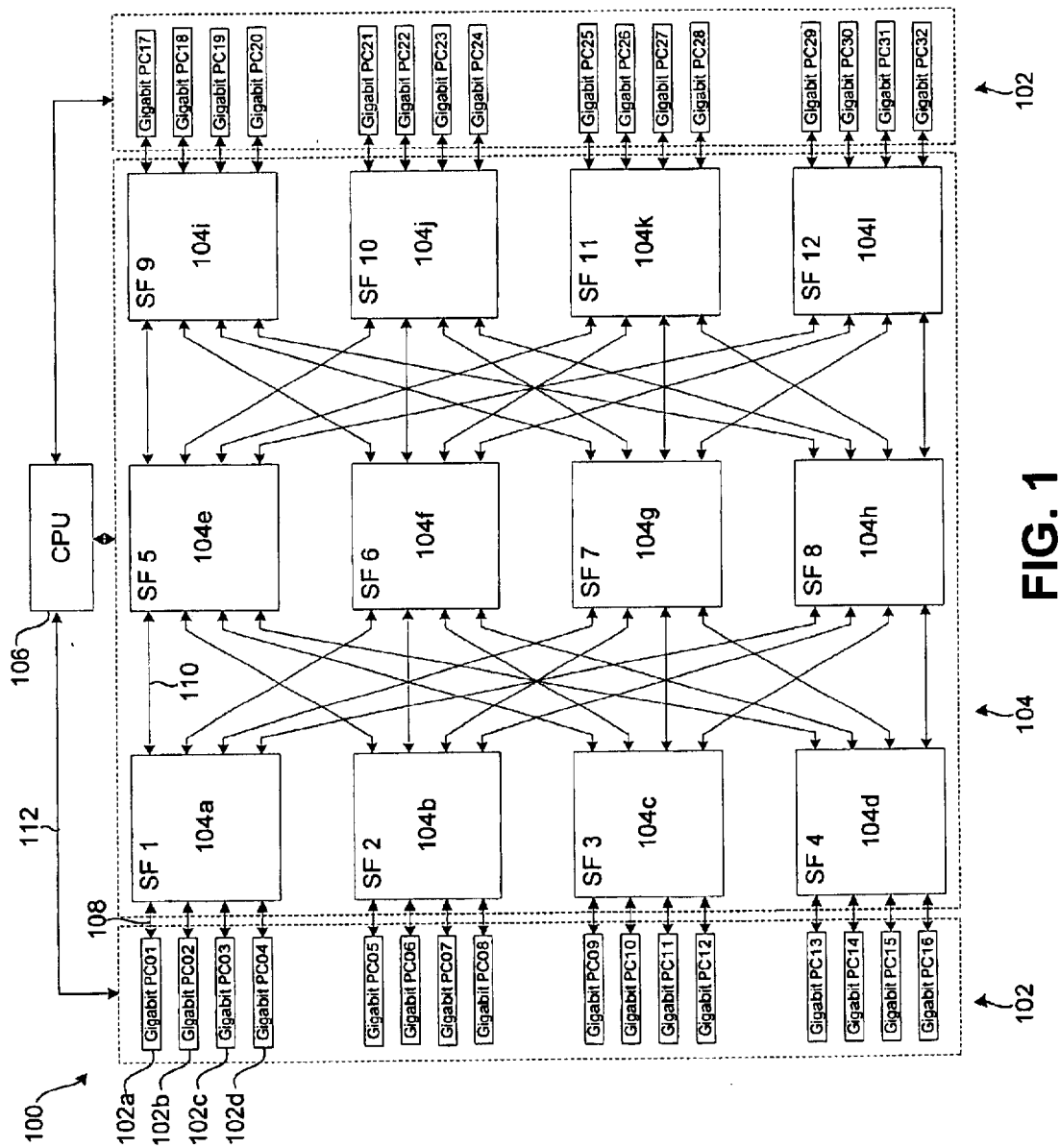
FIG. 1 is a schematic block diagram of a multi-port switch architecture in accordance with an embodiment of the present invention.

FIG. 1 is a schematic block diagram of a multi-port switch architecture 100 in accordance with an embodiment of the present invention. In general, this multi-port switch architecture 100 comprises a plurality of port controllers (32 port controllers in the illustrated embodiment) 102 interconnected to one another via a switch fabric 104, and a network control processor 106 connected to the port controllers 102 and the switch fabric 104. As illustrated in FIG. 1, the connections (108, 110, 112 for example) between the elements are bi-directional. With further reference to FIG. 1, in this particular embodiment of the multi-port switch architecture 100, the switch fabric may comprise a plurality of switch fabric components (12 switch fabric components in the illustrated embodiment) 104a, 104b, 104c, 104d, 104e, 104f, 104g, 104h, 104i, 104j, 104k, 104l connected together via bi-directional conduits (e.g., conduit 110) in what is known as a Clos network arrangement/topology. The particular arrangement depicted in FIG. 1 is a known as a three-stage or layer Clos network topology having a middle stage of switch fabric components (104e, 104f, 104g, 104h) connecting a pair of outer stages of switch fabric components (104a, 104b, 104c, 104d and 104i, 104j, 104k, 104l).

With the Clos network topology for the switch fabric 104, each outer stage switch fabric component 104a, 104b, 104c, 104d and 104i, 104j, 104k, 104l is directly coupled via independent conduits to each of the middle stage switch fabric components 104e, 104f, 104g, 104h. For example, in FIG. 1, switch fabric component 104a has four conduits coupling it to the four middle stage switch fabric components 104e, 104f, 104g, 104h. Conversely, with the Clos network topology for the switch fabric 104, each of the middle stage switch fabric components 104e, 104f, 104g, 104h is directly coupled via independent conduits to each of the outer stage switch fabric components 104a, 104b, 104c, 104d, 104i, 104j, 104k, 104l. Thus, in the embodiment illustrated in FIG. 1, each of the middle stage switch fabric components 104e, 104f, 104g, 104h has a direct and independent connection to each of the outer stage switch fabric components 104a, 104b, 104c, 104d, 104i, 104j, 104k, 104l.

It should also be noted that for purposes of a single packet traversing the switch fabric, one may consider the particular embodiment illustrated in FIG. 1, as having an input stage comprising a single outer stage switch fabric component, a middle stage comprising the middle stage switch fabric components and an output stage comprising the remaining outer stage switch fabric components due to the bi-directional connectivity between the switch fabric components.

Each outer layer switch fabric component 104a, 104b, 104c, 104d, 104i, 104j, 104k, 104l has a plurality of the port controllers directly coupled/connected thereto. In the embodiment illustrated in FIG. 1, each of the outer layer switch fabric components has four port controllers coupled to it by four conduits, one conduit (e.g., conduit 108)for each port controller. For example, switch fabric 104a has port controllers 102a, 102b, 102c, 102d coupled to it by four separate bi-directional conduits. In one aspect of this embodiment, the port controllers 102 may all comprise gigabit port controllers.

A feature of the Clos network topology of the switch fabric is that it is a non-blocking topology: there is a path from every port controller to all of the other port controllers not directly coupled to the same switch fabric component through every one of the middle stage switch fabric components 104e, 104f, 104g, 104h. For example, the port controllers 102a, 102b, 102c, 102d connected to switch fabric component 104a are connected to the port controllers coupled to all of the other outer stage switch fabric components 104b, 104c, 104d, 104i, 104j, 104k, 104l via each of the middle stage switch fabric components 104e, 104f, 104g, 104h.

In a preferred embodiment of the configuration 100 shown in FIG. 1, there may be 16 Gigabit Ethernet port controllers provided to each outer stage of switch fabric components for a total of 32 Gigabit Ethernet port controllers. In this preferred embodiment, maximum thruput demand from each set of 16 Gigabit Ethernet port controllers may be 16×2 (duplex) Gigabit Ethernet Data Streams=32 Gbps+Overhead for a maximum thruput demand in both directions of: [(32 Gbps+Overhead)+(32 Gbps+Overhead)]=64 Gbps+Overhead. In such a preferred embodiment, each of the switch fabric components in the 32-Gigabit Ethernet port configuration, may be a modified 8-Port Crossbar Switch Fabric with a thruput capability of 16 Gbps plus Overhead. Since the middle stage of the switch fabric comprises contains 4 of these devices, thruput of the middle stage may total 64 Gbps+Overhead.

Figure 2:
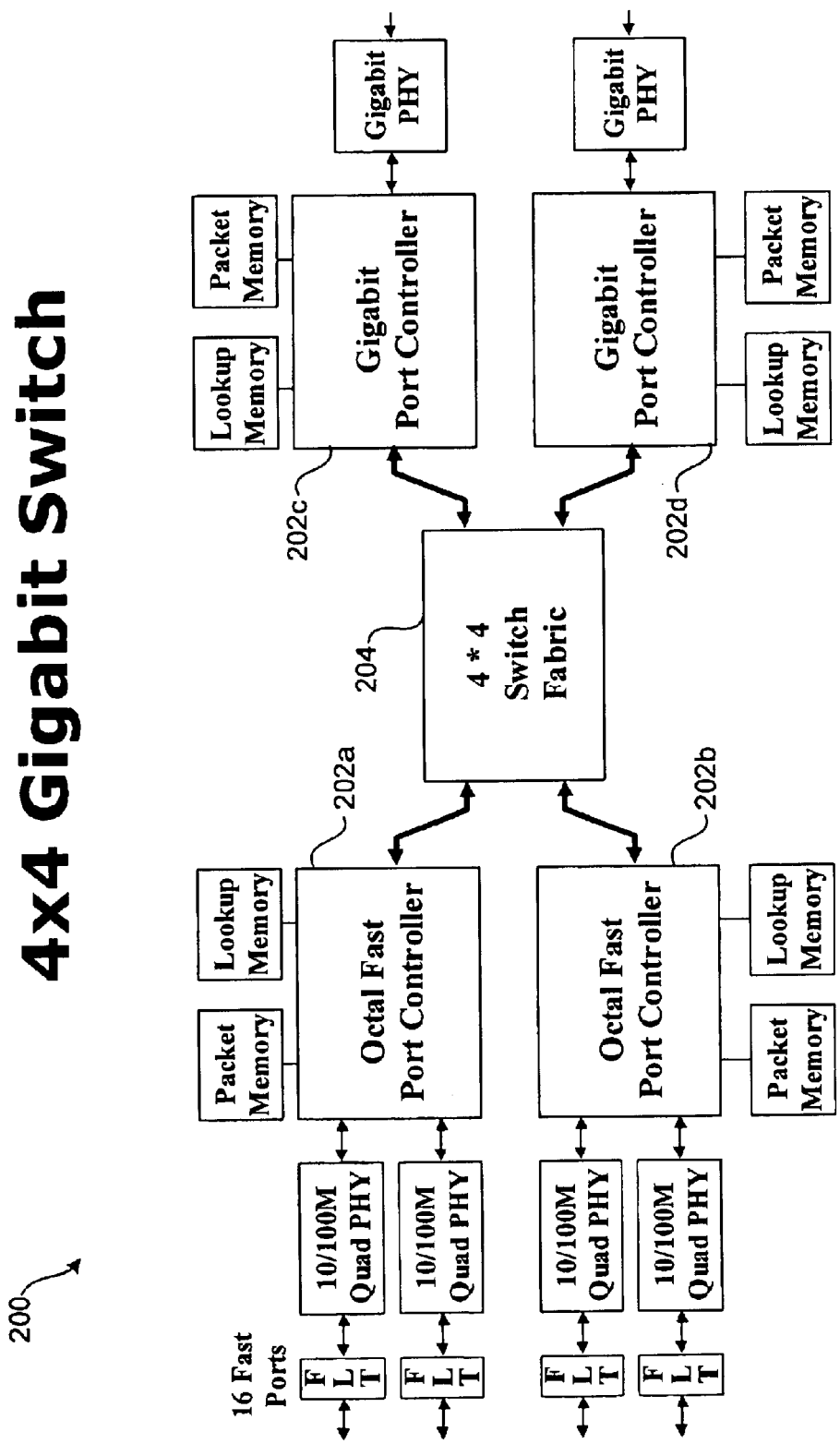
FIG. 2 is a schematic block diagram of another multi-port switch architecture in accordance with an embodiment of the present invention.

FIG. 2 is a schematic block diagram of another multi-port switch architecture 200 in accordance with an embodiment of the present invention. In this embodiment, the multi-port switch architecture 200 comprises four port controllers 202a, 202b, 202c, 202d interconnected together via a switch fabric comprising a single switch fabric component 204. In one aspect of such an embodiment, the port controllers 202a, 202b, 202c, 202d may comprise fast Ethernet port controllers having a similar architecture as that of a port controller as that as illustrated in FIG. 1.

Figure 3:
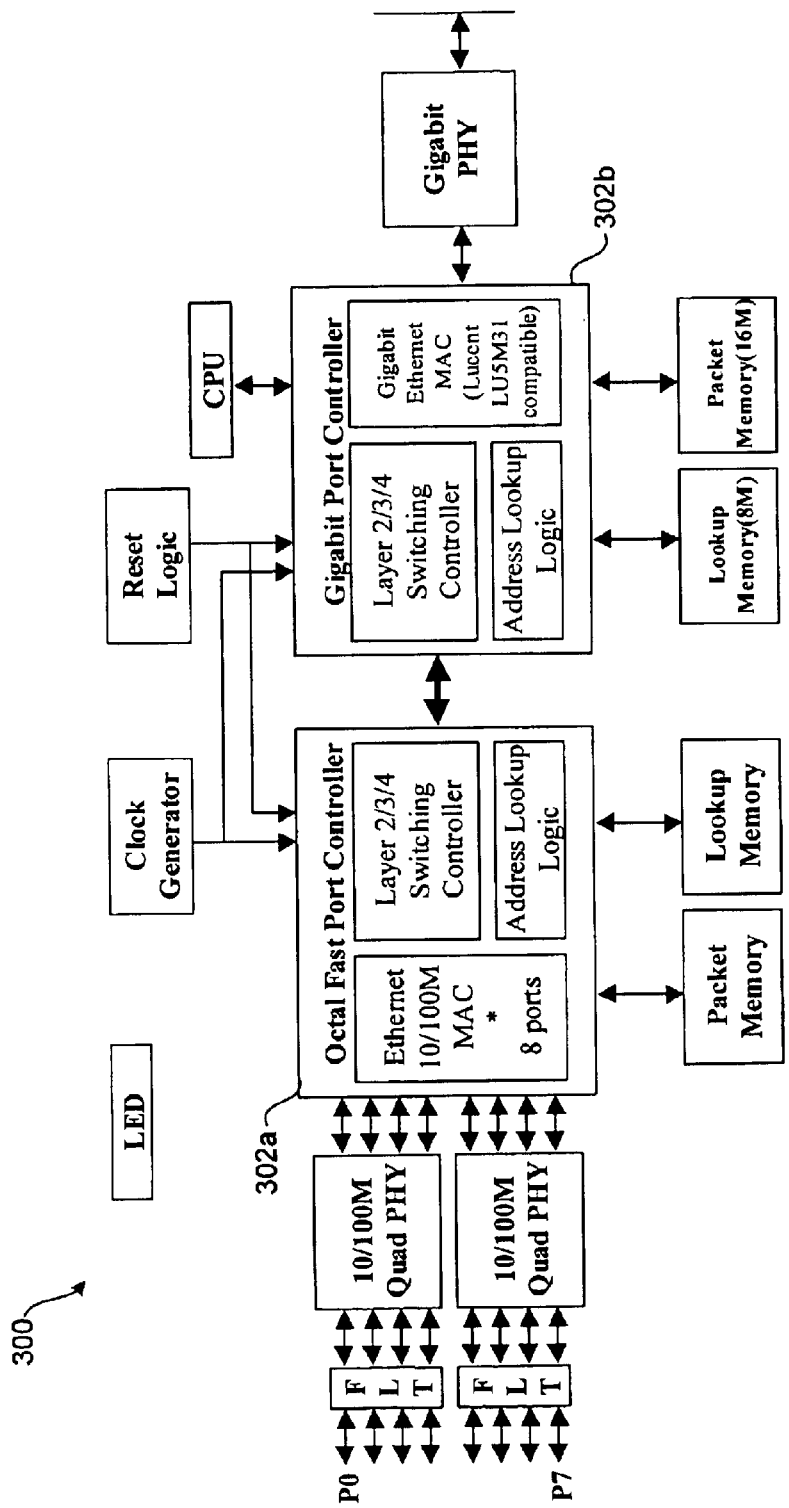
FIG. 3 is a schematic block diagram of a gigabit up-linking in accordance with an embodiment of the present invention.

FIG. 3 is a schematic block diagram of a gigabit up-linking 300 in accordance with an embodiment of the present invention. The up-linking 300 comprises first and second port controllers 302a, 302b bi-directionally connected together. In one aspect of such an embodiment, one of the port controllers may comprises a fast Ethernet port controller 302a such as the type used in the multi-port switch architecture 200 depicted in FIG. 2 and the other port controller 302b may comprise a gigabit port controller such as the type used in the multi-port switch architecture 100 depicted in FIG. 1.

PORT CONTROLLER

Each port controller implements a technique known as pipelining. Pipelining is an implementation technique in which multiple instructions are overlapped in execution. A pipeline may be defined as a series of stages, where some work is done at each stage. In general, the port controller has a first pipeline for receiving Ethernet packets from the physical interface (PHY), processes them, and transmits them to the Switch Fabric. The port controller also has a similar but less complex second pipeline for receiving Ethernet Packets from the switch fabric and transmits them to the physical interface (PHY).

In general, there may be at least two preferred versions of the port controller. A first preferred version may provide wire-speed packet processing and other port controller functions, for a single (duplexed) Gigabit Ethernet line. The second preferred version may provide the same functionality for 8-Fast Ethernet (or Ethernet) lines. These devices may be configured with the switch fabric to provide wire speed Layer 2/Layer 3 switching for up to 32 Gigabit Ethernet Lines, or up to 256 Fast Ethernet Lines.

Figure 4:
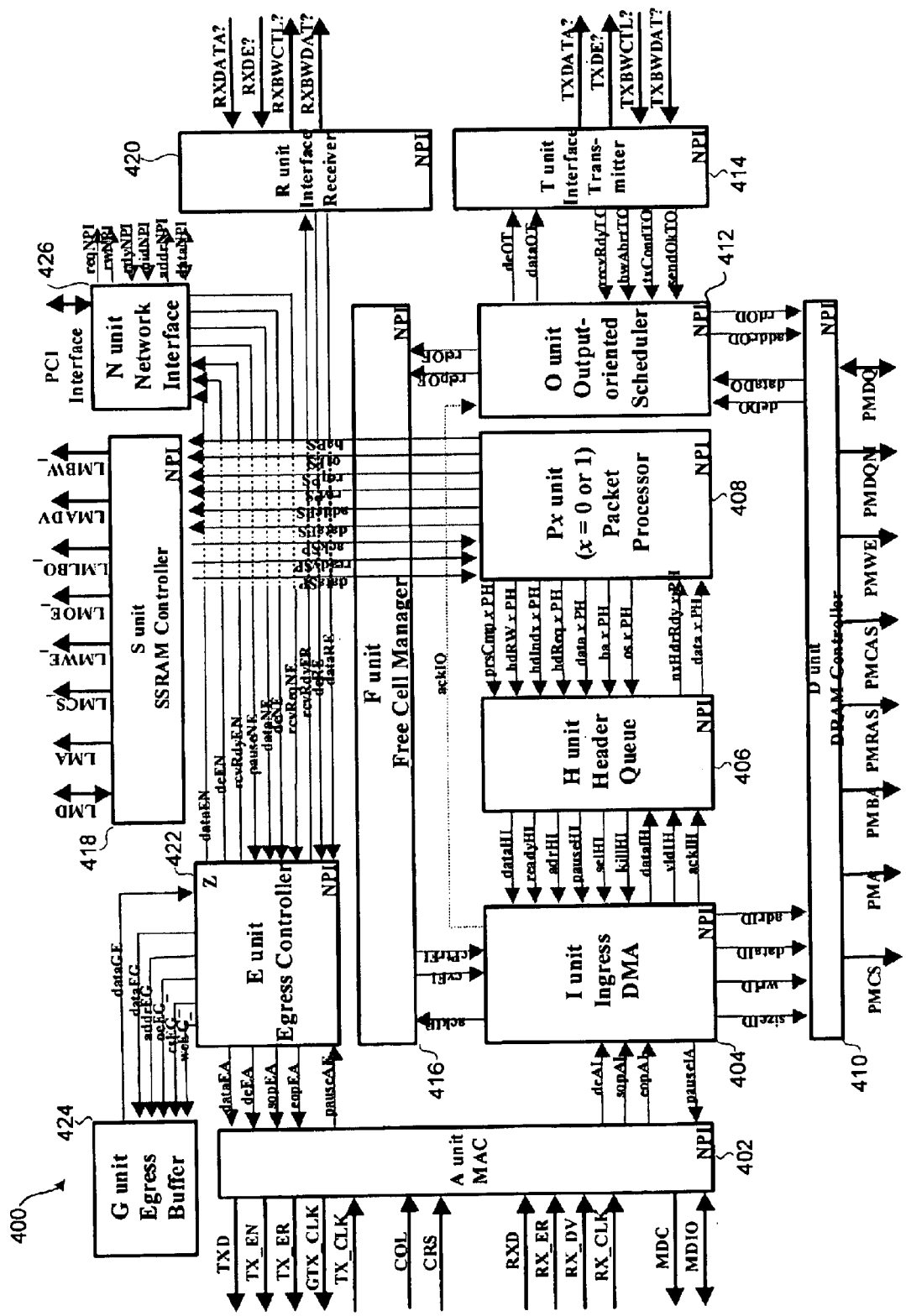
FIG. 4 is a schematic block diagram of an architecture of a port controller in accordance with an embodiment of the present invention.

FIG. 4 is a schematic block diagram of an architecture of a port controller 400 in accordance with an embodiment of the present invention. The port controller 400 includes a media access control (MAC) unit 402, an ingress direct memory access (Ingress DMA or IDMA) unit 404, a header queue 406, a packet processor unit 408, a dynamic random access memory (DRAM) controller 410, an output orientated scheduler 412, an interface transmitter 414, a free cell manager 416, a synchronous static random access memory (SSRAM) controller 418, an interface receiver 420, an egress controller 422, an egress buffer 424, and a network interface 426. The DRAM controller 410 is coupled to a first memory called an external packet buffer/memory, which is preferably some sort of dynamic random access memory such as synchronous DRAM (SDRAM). The DRAM controller 410 controls the first memory/external packet buffer and reads/writes data from/to the external packet buffer. The SSRAM controller 418 is coupled to a second memory of the port controller, preferably some sort of synchronous static random access memory (SSRAM).

The MAC interface 402 is connectable to an Ethernet physical layer interface (PHY) to receive and transmit data packets. In one embodiment, the MAC interface 402 may comprise a Gigabit MAC with GMII interface. The MAC interface 402 is coupled to the Ingress DMA 404 to permit transmitting of incoming data packets received by the MAC interface to the Ingress DMA 404.

The Ingress DMA 404 is coupled to the header queue 406, the DRAM controller 410 and the free cell manager 416. Upon receipt of an incoming data packet from MAC interface 402, the Ingress DMA 404 separates the header portion of the packet from the body portion of the packet. The header portion of the packet is then transferred by the Ingress DMA 404 to the header queue 406 while the body portion of the packet is transferred to the DRAM controller 410 for storage in the external packet buffer in a linked list. The Ingress DMA 404 is also responsible for defining a link to a space reserved in memory to the header portion being processed by the packet processor 408 with which the Ingress DMA uses to store the processed header portion in memory after the header portion has been processed. The Ingress DMA also is responsible for notifying the output oriented scheduler 412 when the storage of a packet is completed.

The header queue 406 is coupled to the packet processor unit 408. In a preferred embodiment, the header queue 406 stores the headers it receives from the from Ingress DMA 404 for first in, first out (FIFO) processing by the packet processor unit 408.

The packet processor unit 408 serves to analyzes and processes packets. In one embodiment, the packet processor comprises a plurality of packet processors. While in the embodiment illustrated in FIG. 4, the packet processor unit comprises two packet processors—$P_0$ and $P_1$ 408a, 408b, which alternate in the processing of headers in the header queue 406.

The packet processors 408 determines how to process the header portions of incoming packets. Processing of the header portions by the packet processor 408 includes determining the destination of a packet by utilizing a lookup address table, attaching an internal tag (which includes a destination vector) to the header portion of the packet, and then notifying the header queue 406 of the completion of processing. The address lookup is done by accessing (via the SSRAM controller 418) an external address table stored in the external SSRAM (The SSRAM may also be used to store other necessary information).

The output oriented scheduler 412 receives a notification from the Ingress DMA when a packet has been processed. The output oriented scheduler 412 is also coupled to the DRAM controller 410 so that the output oriented scheduler 412 can retrieve processed packets from external packet buffer via the DRAM controller 410. Upon retrieving a processed packet from the packet buffer, the output orientated scheduler 412 transfers the retrieved packet to the interface transmitter 414 (or the network interface 426 depending to the defined priority) for transmission out of the port controller 400.

The DRAM controller 410 executes a writing command to write data from the Ingress DMA 404 into the external packet buffer. The DRAM controller 410 also executes reads and transfers of data from the packet buffer to the output orientated scheduler 412 upon receipt of read commands from the output oriented scheduler 412.

The interface transmitter 414 is coupled to the output orientated scheduler 412. The interface transmitter has an external I/O to permit connection to another port controller or a switch fabric component. The output orientated scheduler 412 sends processed packets to the interface transmitter 414 to permit transmission of the processed packet by the interface transmitter 414 to a switch fabric component or another port controller via its external I/O.

The free cell manager 416 is coupled to the Ingress DMA 404 and the output orientated scheduler 412 and thereby in communication with the DRAM controller 410. The free cell manager 416 manages the external packet buffer space and notifies the Ingress DMA 404 of available space in memory for storing data and frees up memory space after data (i.e., processed packets) is retrieved by the output oriented scheduler 412.

The interface receiver 420 has an external I/O connectable to a switch fabric component or another port controller to permit receipt of packets from the switch fabric component or other port controller. The egress controller 422 is coupled to the interface receiver 420. Coupled to the egress controller 422 are the egress buffer 424 and MAC interface 402. The egress controller 422 temporally stores outgoing packets it received from the interface receiver in the egress buffer 424 and then subsequently transfers the stored packets from the egress buffer 424 to the MAC interface 402 for transmission to the PHY.

The network interface unit 426 exchanges data with the host processor through am external I/O or an internal channel. The network interface unit 426 analyzes the control packet made by the host processor, reads internal registers and modifies the content of a lookup table. In a preferred embodiment, every internal unit of the port controller is connected to the network interface (NPI) bus so that all of the internal units may be controlled by the host processor via network interface unit 426.

The SSRAM controller 4018 is coupled to the second memory (the SSRAM) and controls access to the SSRAM. The network interface unit 4026 and the packet processing unit 408 are coupled to SSRAM controller and thereby access the SSRAM. The SSRAM controller 4018 arbitrates requests from network interface unit and the packet processing unit.

PACKET PROCESSING

In the port controller 400, packets may be saved in the packet memory/buffer according to the order they are received. However, in a preferred embodiment of the present invention, a more flexible packet storing arrangement may be utilized which allows the changing the saving order between header fields and body fields of incoming packets.

Typically, when processing a packet with an Ethernet header and a TCP/IP header, only the Ethernet Field or IP Field may be used in a conventional switch to determine switching directions. In contrast, in the embodiment of the switch fabric system set forth herein, both the Ethernet and IP fields as well as the TCP fields may be used to determine switching directions. However, with such a processing capability, such a sequential packet saving order routine may limit the amount of information that can be acquired during processing of a packet by being incapable (or impractical) of providing sufficient time and/or efficiency to process the header. By changing the saving order between header fields and body fields, more information may be acquired during processing and provide an extra timing margin for processing header fields during saving body fields while maximizing efficiency and reducing memory overhead.

Figure 5:
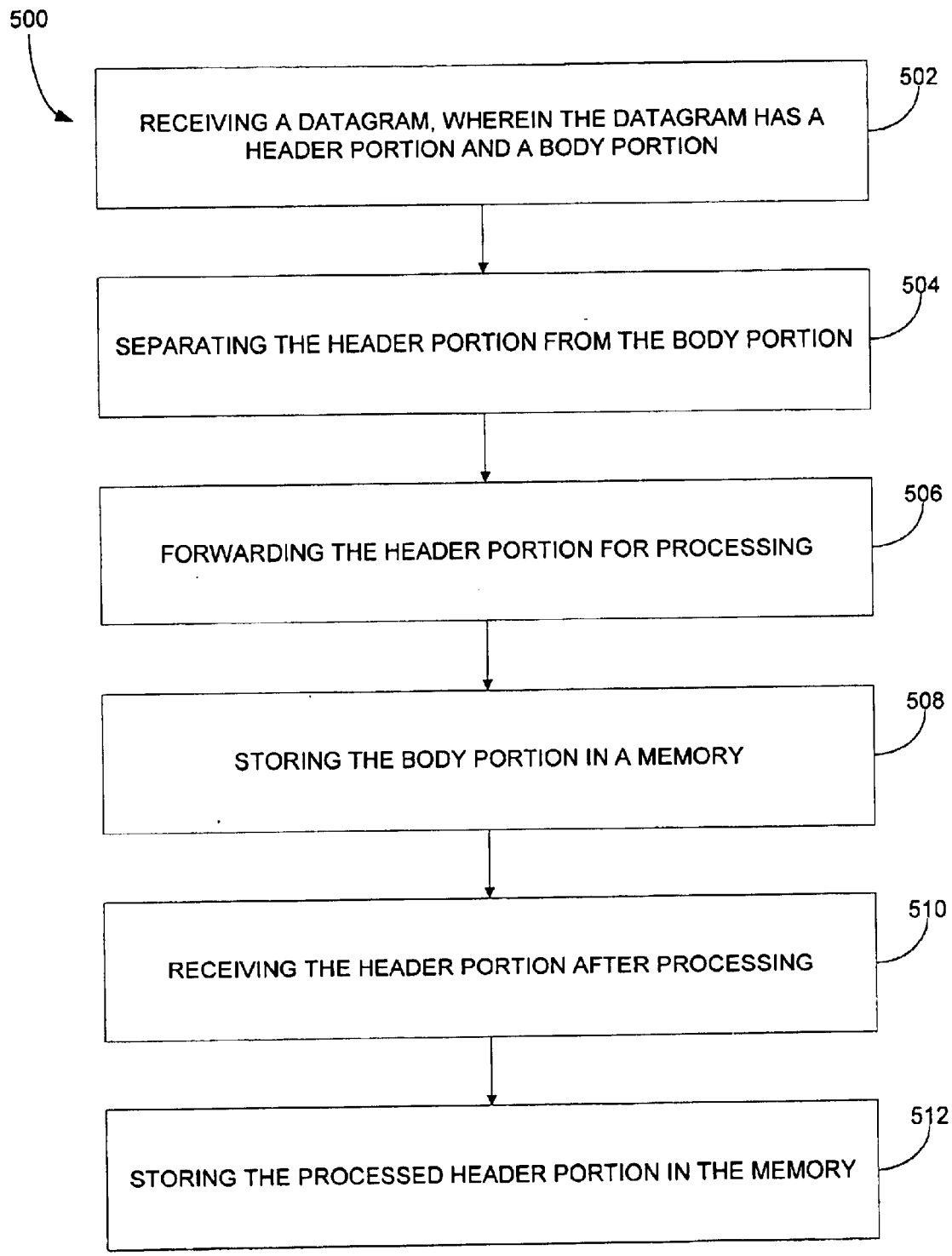
FIG. 5 is a flowchart of a process for preparing a datagram for transmission through a switch fabric in accordance with an embodiment of the present invention.

FIG. 5 is a flowchart of a process 500 for preparing a datagram for transmission through a switch fabric in accordance with an embodiment of the present invention. A datagram having a header portion and a body portion is first received in operation 502. The header portion is separated from the body portion and then forwarded for processing in operations 504 and 506. In operation 508, the separated body portion is stored in a memory. After processing, the header portion is received and stored in the memory in operations 510 and 512.

In an embodiment of the present invention, a space in the memory may be reserved for storing the header portion prior to storing the body portion in the memory with a link to the reserved space also being generated for locating the reserved space. As an option in such an embodiment, storing the processed header may further include utilizing the link to locate the reserved space and then storing the processed header in the reserved space.

In an aspect of the present invention, the body portion may be divided into a plurality of cells. In such an aspect, storing the body portion in the memory may further include sequentially storing each cell in the memory, and generating links between the sequentially stored cells. In another aspect of the present invention, the processed header portion may include a destination vector indicating a destination in the switch fabric system to which the packet is to be routed. In a preferred embodiment of such an aspect, the destination vector may comprise 32 bits of data.

In another embodiment of the present invention, the datagram may be assigned to an output priority queue for subsequent transmission through the switch fabric.

Figure 6:
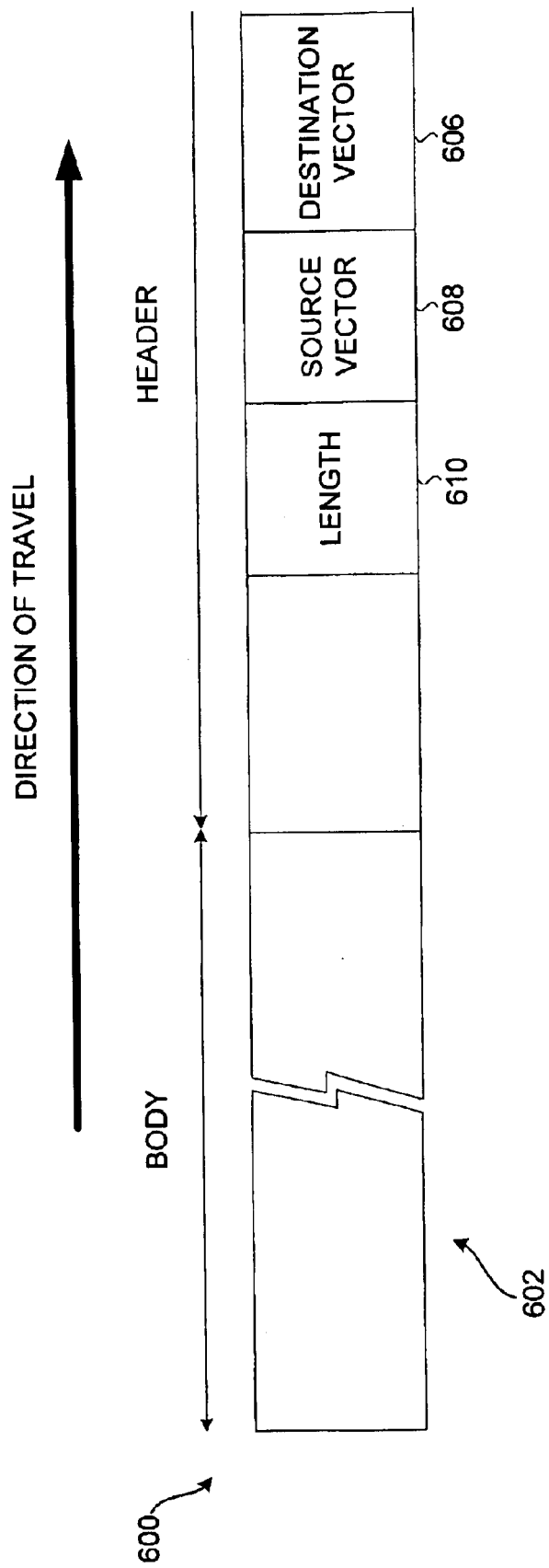
FIG. 6 is a schematic representation of an illustrative packet in accordance with an embodiment of the present invention.

FIG. 6 is a schematic representation of an illustrative packet 600 in accordance with an embodiment of the present invention. A packet may be defined as a unit of data that is routed between an origin and a destination on a packet switched network. A packet 600 comprises a header portion or field ("header") 602 and a body portion or field ("body") 604. The header portion 602 includes control information that is used for switching while the body 604 generally comprises the remainder of the packet.

In the illustrative packet depicted in FIG. 6, the header portion 602 has been processed and includes a destination vector 606 for indicating the destination of the packet, a source vector 608 for indicating the source of the packet, and a length vector 610 indicating the length of the packet (collectively, they are also known as an "internal tag" or "internal tag field"). The header portion 602 may also include the MAC/TCP/IP of the packet and some application data as well.

Figure 7:
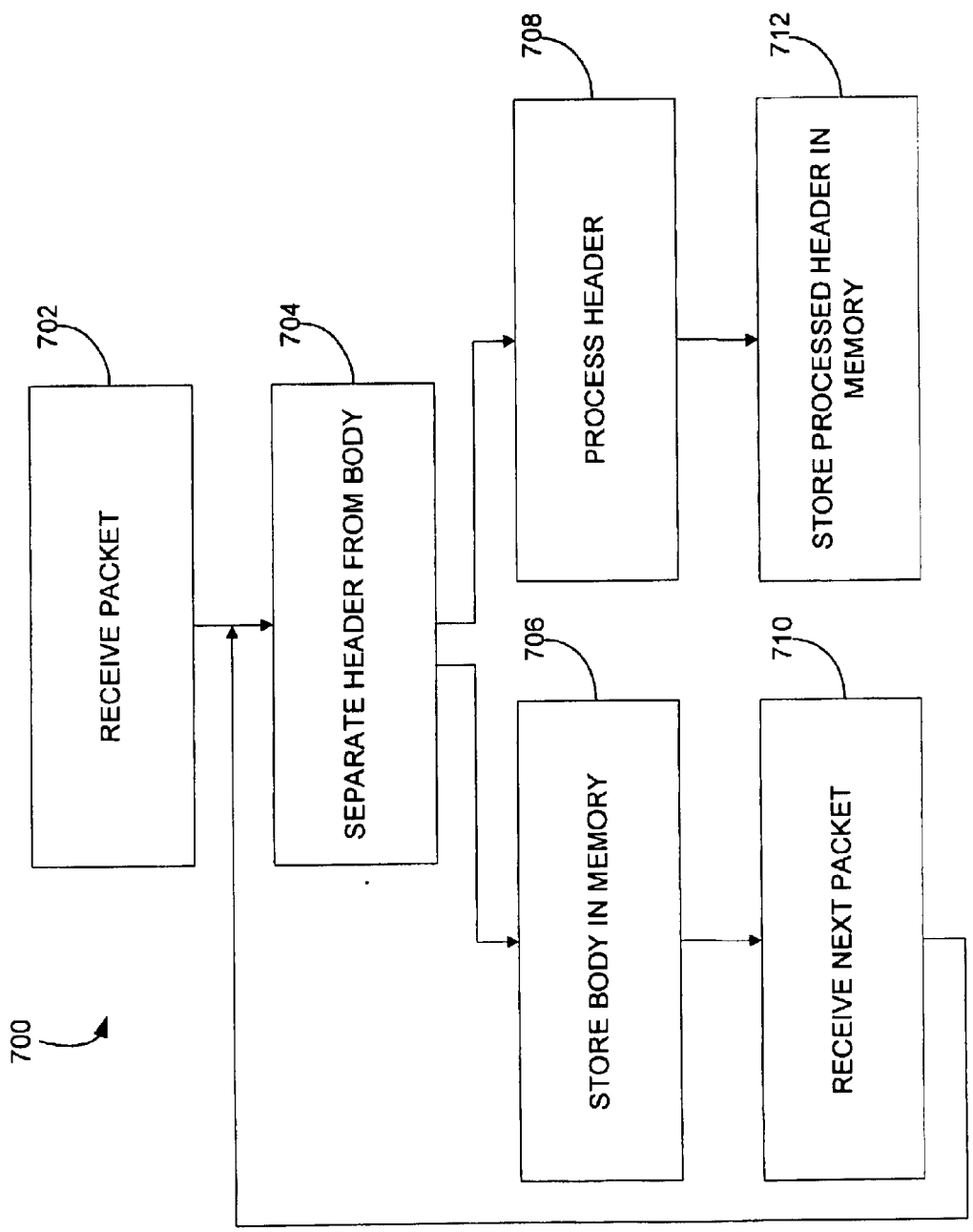
FIG. 7 is a flowchart for a process for processing packets in accordance with an embodiment of the present invention.

FIG. 7 is a flowchart for a process 700 for processing packets 600 in accordance with an embodiment of the present invention. In operation 702, an incoming packet is received. The incoming packet includes a header portion and a body portion. The header portion of the packet is separated from the body portion in operation 704. The separated body portion is then stored in memory in operation 706. In operation 2308, the header portion processed, preferably concurrent to operation 2306. In operation 2310, a subsequent (or second) packet is received with the process 700 repeating for this second packet. Once the header portion of the first incoming packet has been processed, the processed header portion is then stored in the memory in operation 712.

Figure 8:
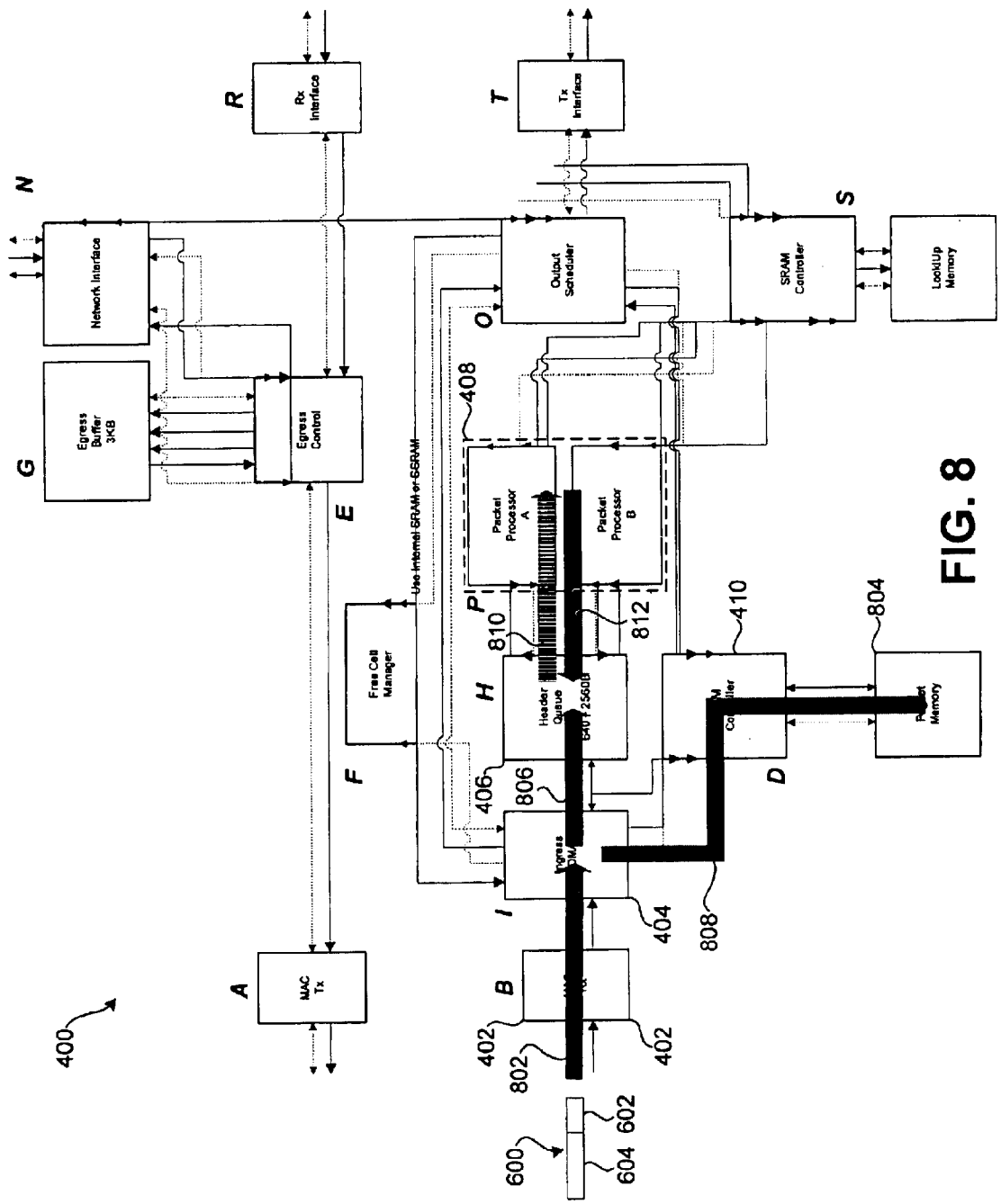
FIG. 8 is a first schematic flow diagram illustrating the process for processing packets set forth in FIG. 7 in a port controller in accordance with an embodiment of the present invention.

FIG. 8 is a first schematic flow diagram illustrating the process 700 for processing packets set forth in FIG. 7 in a port controller 400 in accordance with an embodiment of the present invention. An incoming packet 600 is received into the port controller via the MAC interface 402 which routes the packet to the Ingress DMA 404 (see arrow 802). The header portion 602 of the packet is separated from the body 604 of the packet in the Ingress DMA 404 (see operation 704). The Ingress DMA 404 then forwards the header portion 602 to the header queue 406 for processing (see arrow 806) and stores the body portion 604 in memory ("packet memory") 804 via the DRAM controller 410 (see arrow 808 and operation 706).

For processing of the header portion 602 (see operation 708), the header queue 406 transfers the header portion 602 to an available package processor in the package processor unit 408 (see arrow 810). After the header portion has been processed by the packet processor unit 408, the processed header portion is returned to the header queue 406 (see arrow 812).

Figure 9:
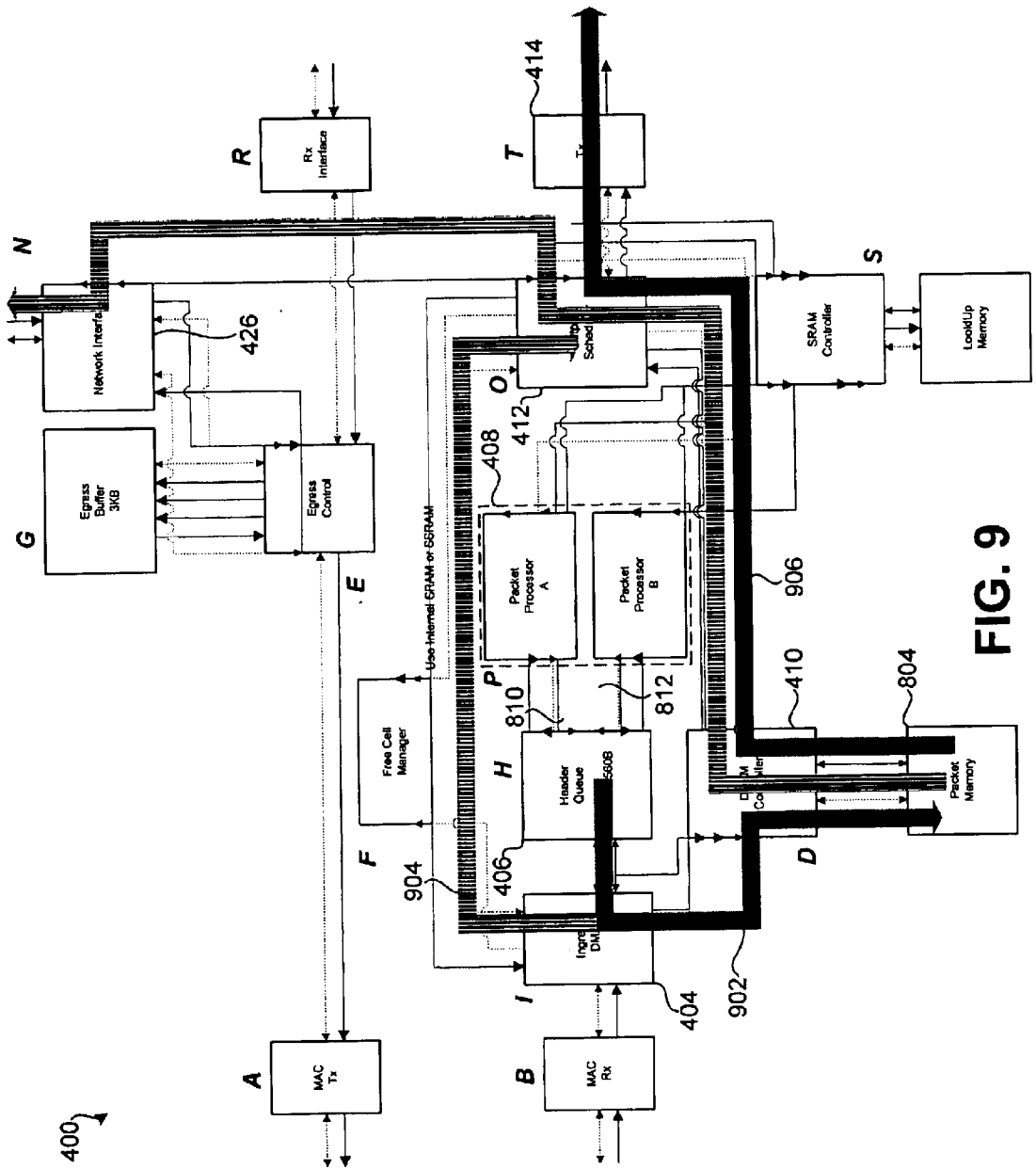
FIG. 9 is a second schematic flow diagram illustrating the process for processing packets set forth in FIG. 7 in a port controller in accordance with an embodiment of the present invention.

FIG. 9 is a second schematic flow diagram illustrating the process 700 for processing packets set forth in FIG. 7 in a port controller 400 in accordance with an embodiment of the present invention. After returning to the header queue 406, the processed header portion is then subsequently stored in the packet memory 804 via the Ingress DMA 404 and DRAM controller 410 (see arrow 902).

Upon storing of the processed header portion, the Ingress DMA 404 notifies the output orientated scheduler 412 that the packet is now ready to be transmitted and provides the output orientated scheduler with information for retrieving the packet from the packet memory 804 (see arrow 904). When the output orientated scheduler 412 is ready to transmit the packet, the output orientated scheduler 412 retrieves the packet from the packet memory 8046 and forwards the packet to the interface transmitter 414 which outputs the packet from the port controller 400 (see arrow 906).

Figure 10:
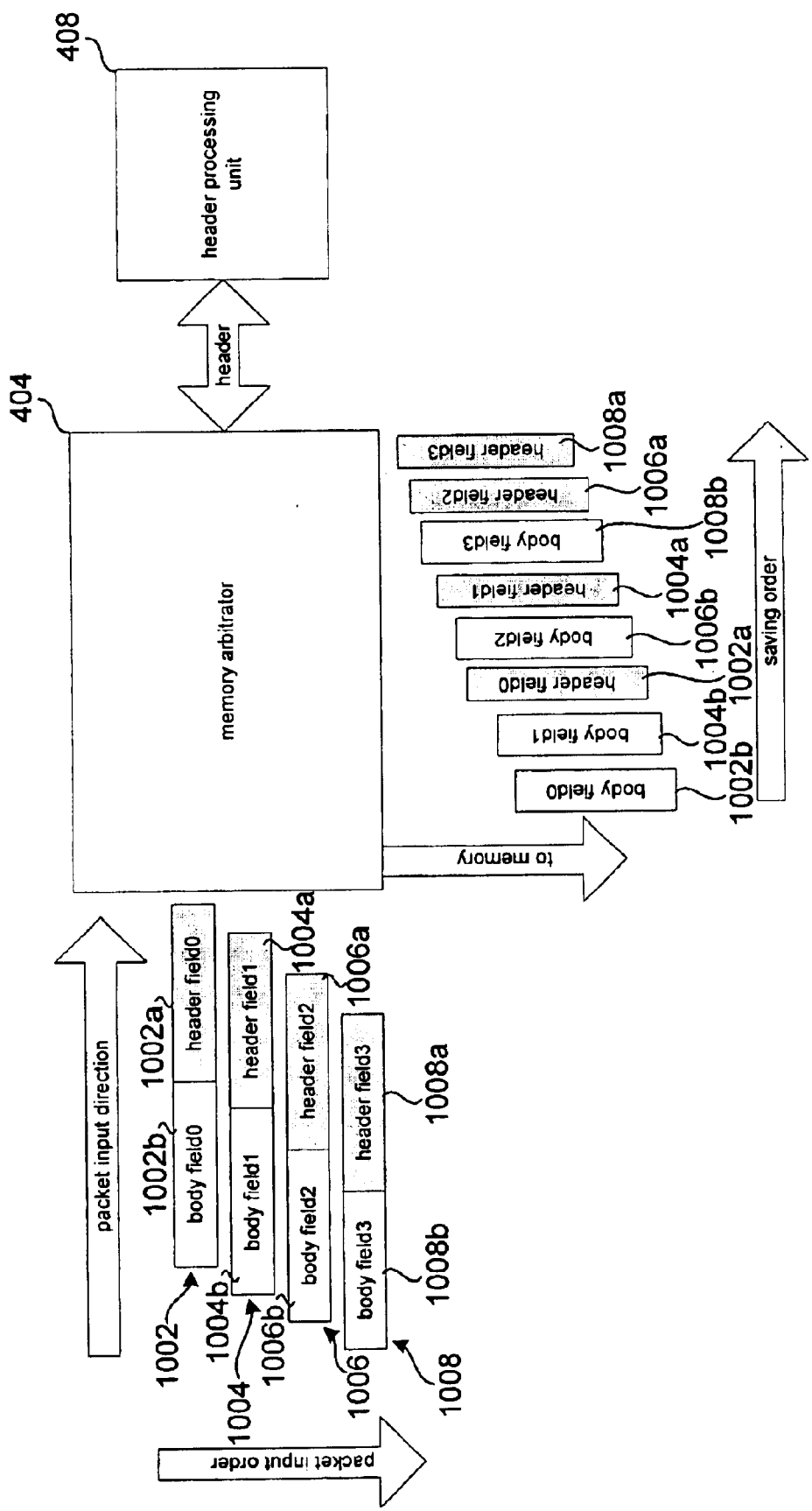
FIG. 10 is a schematic diagram representing an illustration of the processing and storing of a plurality of incoming packets entering a port controller in accordance with an embodiment of the present invention.

FIG. 10 is a schematic diagram representing an illustration of the processing and storing of a plurality of incoming packets entering a port controller in accordance with an embodiment of the present invention. In this illustration, a first incoming packet 1002 is received by Ingress DMA 404 of a port controller followed by a second packet 1004, a third packet 1008 and a fourth packet 1008. As mentioned previously, each packet comprises a header portion (1002a, 1004a, 1006a, 1008a) and body portion (1002b, 1004b, 1006b, 1008b). As each packet is received the header portion from the body portion by the Ingress DMA 404. The separated body portions are then stored in the packet memory 804 while the header portions are forwarded for processing by the packet processor unit 408 (Note: header queue 406 has been left out of FIG. 10 for simplification purposes). Once each of the header portions have been processed, they too are then stored in the packet memory 804 via the Ingress DMA 404 (Note the DRAM controller 410 has also been left out of FIG. 10 for simplification purposes).

As illustrated in FIG. 10, the body portions and processed header portions are stored in the packet memory in the order that they are received by the Ingress DMA. For example, upon receipt and separation of the header and body portions of the first packet 1002, the first body portion 1002b is stored in memory 804 while the first header portion 1002a is transferred for processing by the packet processor unit 408.

While the first header portion 1002a is being processed, the Ingress DMA 404 receives the second packet 1004 and separates header and body portions of the second packet. The second body portion 1004b is then stored in memory while the second header portion 1004a is forwarded for processing. At this point in time, processing of the first header portion 1002a has been completed and the processed first header portion is transferred from processing and stored in memory 804.

Next, while the second header portion 1004a is being processed, the Ingress DMA receives the third packet 1006 and separates header and body portions of the third packet. The third body portion 1006b is then stored in the memory while the third header portion 1006a is forwarded for processing. By this time, processing of the second header portion 1004a has been completed and the processed second header portion is transferred from processing and stored in memory. As the third header portion 1006a is being processed, the Ingress DMA receives the fourth packet 1008 and separates header and body portions of the fourth packet. The fourth body portion 1008b is then stored in the packet memory while the fourth header portion 1008a is forwarded for processing. By this time, processing of the third header portion 1006a has been completed and the processed third header portion is transferred from processing and stored in memory. Finally, when the fourth header portion 1008a has been processed, it too is transferred from processing and stored in memory.

Figure 11:
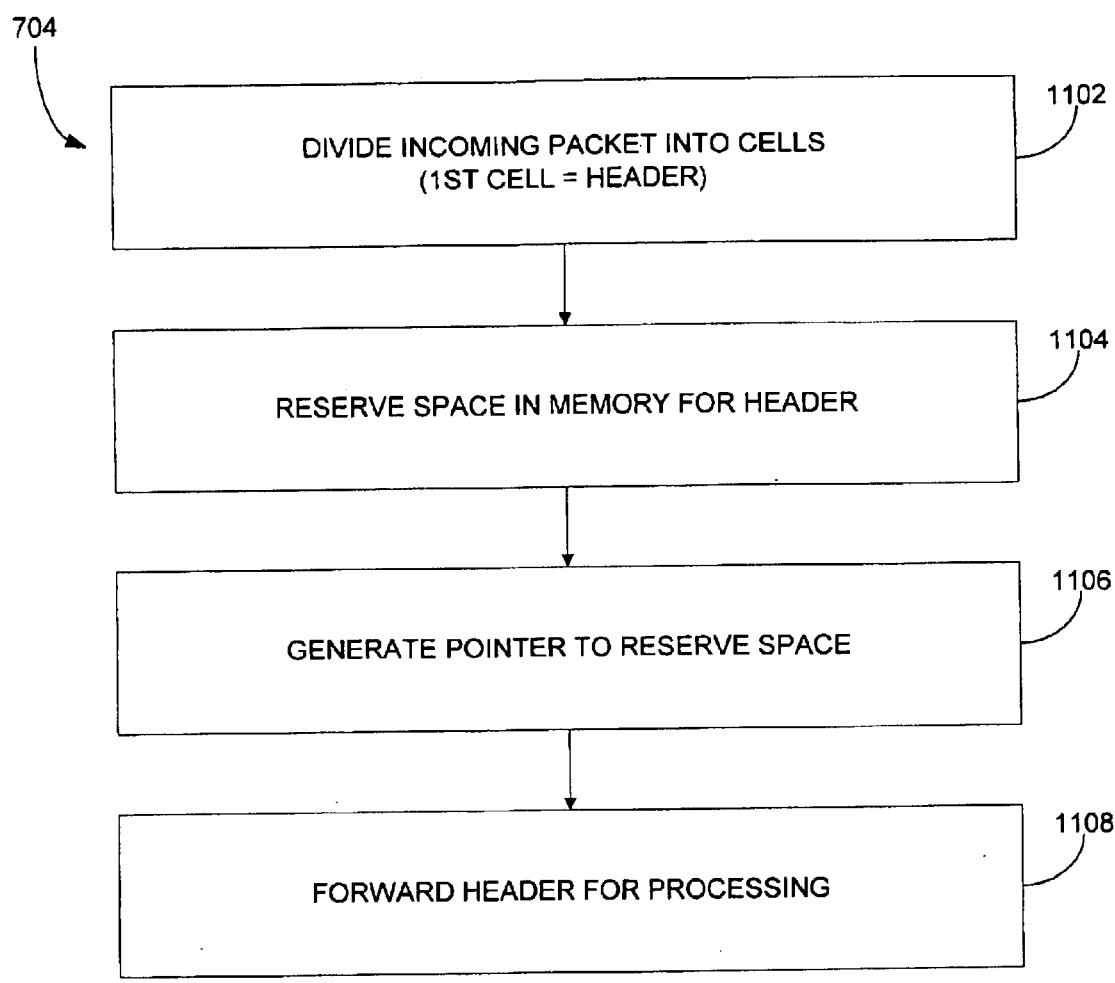
FIG. 11 is a flowchart for a process for separating a header portion from a body portion of a packet in accordance with an embodiment of the present invention.

FIG. 11 is a flowchart for a process 704 for separating a header portion from a body portion of a packet in accordance with an embodiment of the present invention. In operation A4302, an incoming packet is divided into cells as it is received. Included in the first cell of the incoming packet is the header portion. The header portion may include the MAC/IP/TCP header(s) as well as application data. In a preferred embodiment, each cell may have a size of 128 bytes. In operation 1104, space is reserved in memory for the header portion (i.e., the first cell). A pointer to the reserved space in memory is then generated in operation 1106. The header portion is then forwarded to for processing in operation 1108.

Figure 12:
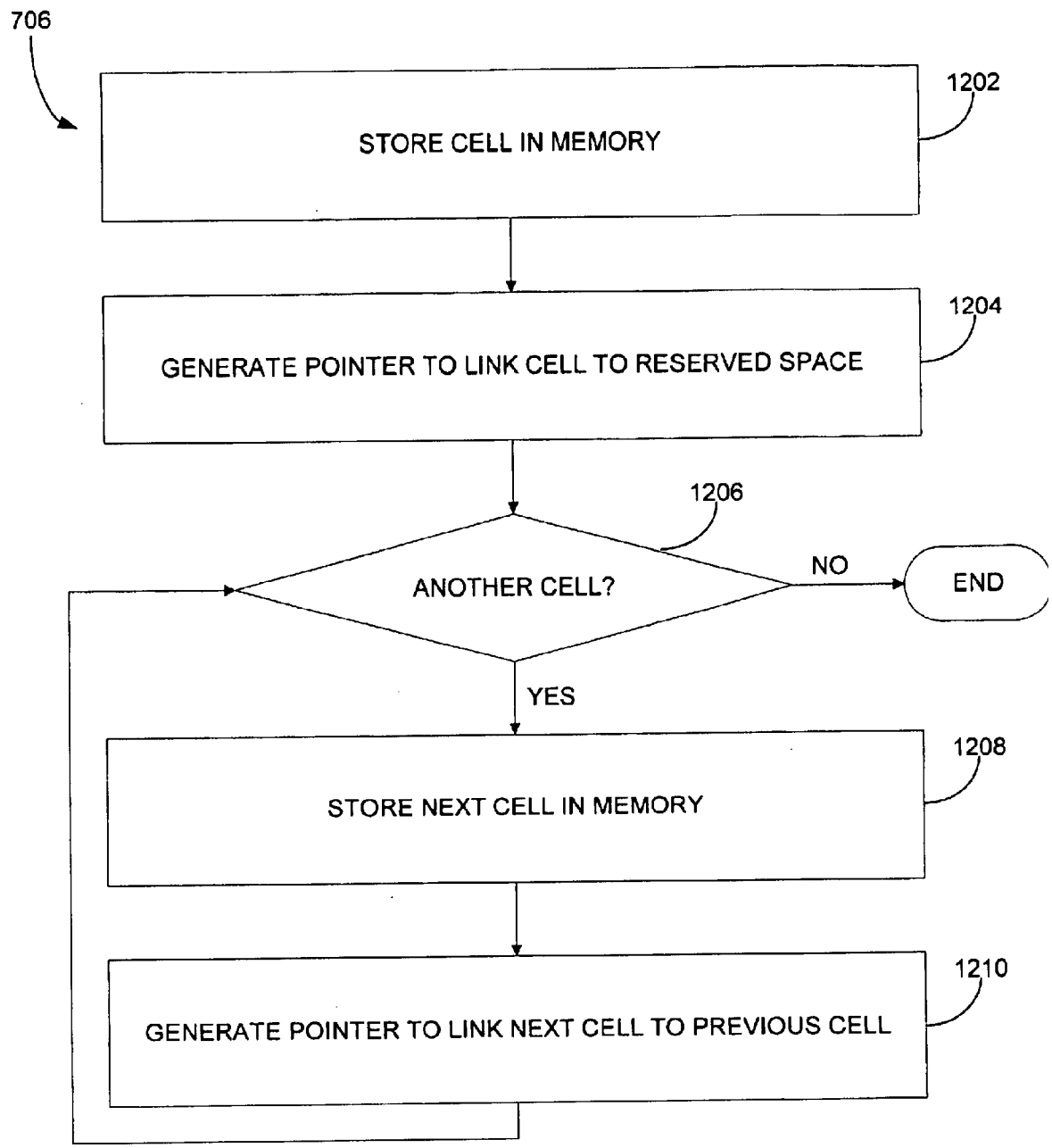
FIG. 12 is a flowchart for a process for storing a body portion of a packet in memory after separation from the header portion in accordance with an embodiment of the present invention.

FIG. 12 is a flowchart for a process 706 for storing a body portion of a packet in memory after separation from the header portion in accordance with an embodiment of the present invention. In operation 1202, the first received cell of the body portion of a packet (i.e., the second cell of the incoming packet) is stored in memory. A pointer is generated in operation 1204 to link the cell to the space reserved for the header portion (i.e., the space reserved for the first cell of the packet). Each subsequently incoming cell of the incoming packet is also stored in memory with a pointer from newly stored cell to the previously stored cell of the packet to link each of the stored cells together (see decision 1206 and operations 1208 and 1210).

Figure 13:
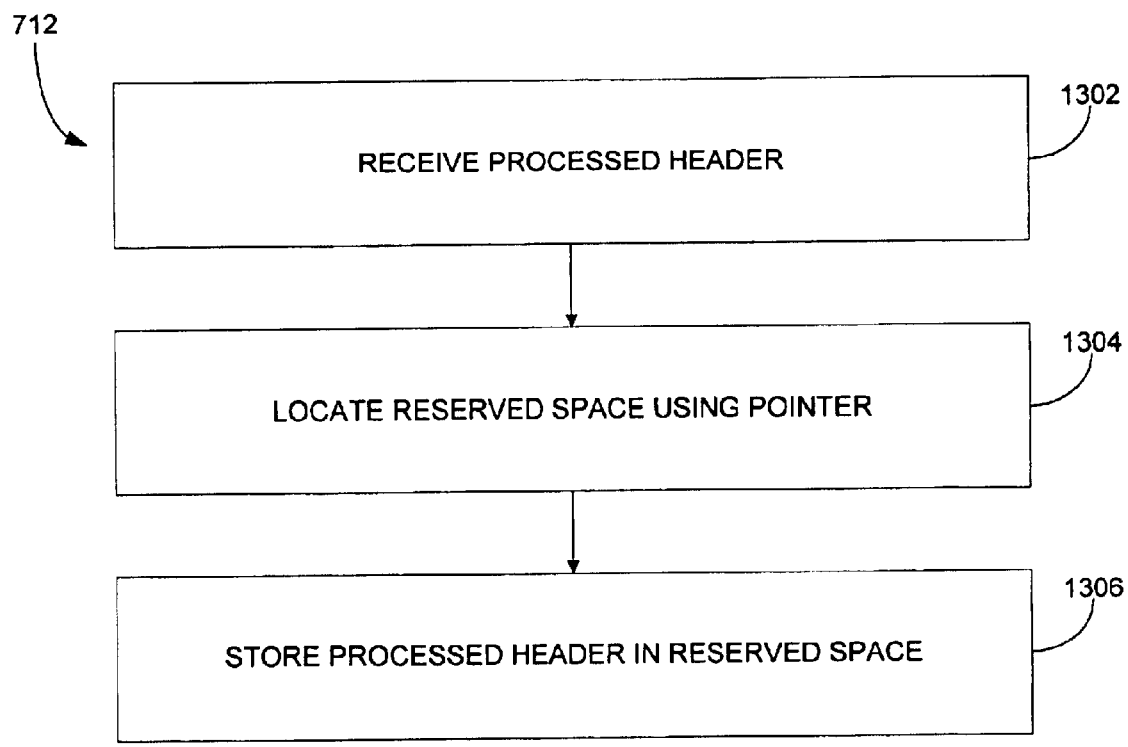
FIG. 13 is a flowchart for a process for storing a processed header portion of a packet in memory in accordance with an embodiment of the present invention.

FIG. 13 is a flowchart for a process 712 for storing a processed header portion of a packet in memory in accordance with an embodiment of the present invention. The processed header portion is received in operation 1302. In operation 1304, the space reserved in memory for the processed header portion is located using the pointer to the reserved space (see operation 1204). The processed header is then stored in the reserved space in operation 1306.

Figure 14:
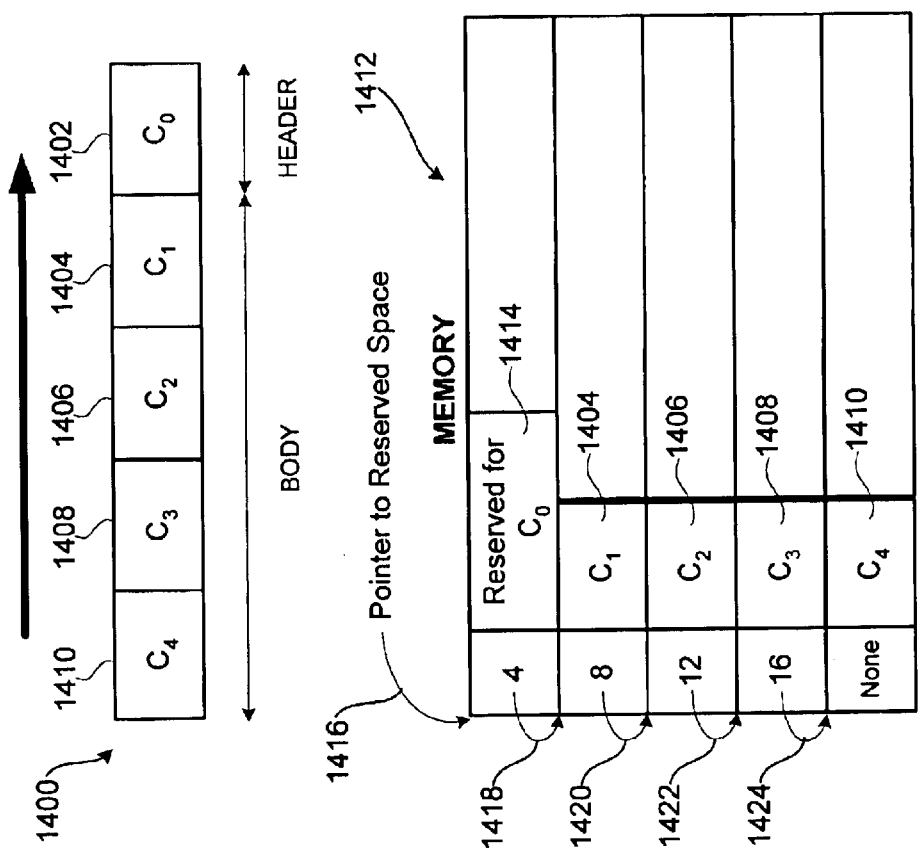
FIG. 14 is a schematic diagram representing the storing of cells of an incoming packet into memory in accordance with an embodiment of the present invention.

FIG. 14 is a schematic diagram representing the storing of cells of an incoming packet into memory in accordance with an embodiment of the present invention. The incoming packet 1400 is divided into a plurality of cells ($C_0$ 1402, $C_1$ 1404, $C_2$ 1406, $C_3$ 1408, $C_4$ 1410) as it is received by the Ingress DMA 404 (see operation 1102 of FIG. 11). As illustrated in FIG. 14, the first cell $C_0$ 1402 contains the header portion of the packet while the remaining cells $C_1$ 1404, $C_2$ 1406, $C_3$ 1408, $C_4$ 1410 contain the body portion of the packet.

In the packet memory 1412, a space 1414 is reserved for the first cell $C_0$ 1402 since it contains the header and a pointer to the reserved space is generated (see operations 1104 and 1106 of FIG. 11). In one embodiment, the size of the reserved space may be larger than the size of the received first cell $C_0$ 1402 to provide sufficient space for any additional data that that may be added to the header portion during processing (see 708 of FIG. 7). A pointer 1416 to the reserved space 1414 is then generated so that the first cell $C_0$ 1402 containing the now processed header portion can be subsequently stored in the reserved space (see operation 1106 of FIG. 11).

Next, the second received cell $C_1$ 1404, which contains a first segment of the body portion of the incoming packet 1400 is stored in the packet memory 1412 (see operation 1202 of FIG. 12) and a pointer 1418 is generated to link the stored cell $C_1$ 1404 to the reserved space (see operation 1204 of FIG. 12). Once the third cell $C_2$ 1406 is received, it too may be stored in the packet memory 1412 and a pointer 1420 generated to link the stored cell $C_2$ 1406 to the previously stored cell $C_1$ 1404 (see operations 1206, 1208, and 1210 of FIG. 12). In a similar fashion, as the fourth and fifth cells $C_3$ 1408, $C_4$ 1410 are received, they each may be stored in the packet memory 1412 and have pointers 1422, 1424 generated linking cell $C_3$ to cell $C_2$ and $C_4$ to cell $C_3$ respectively. In accordance with the process set forth in FIG. 12, since the fifth cell $C_4$ 1410 is the last cell of the packet 1400, the fifth cell $C_4$ does contain a pointer (see 1426).

Figure 15:
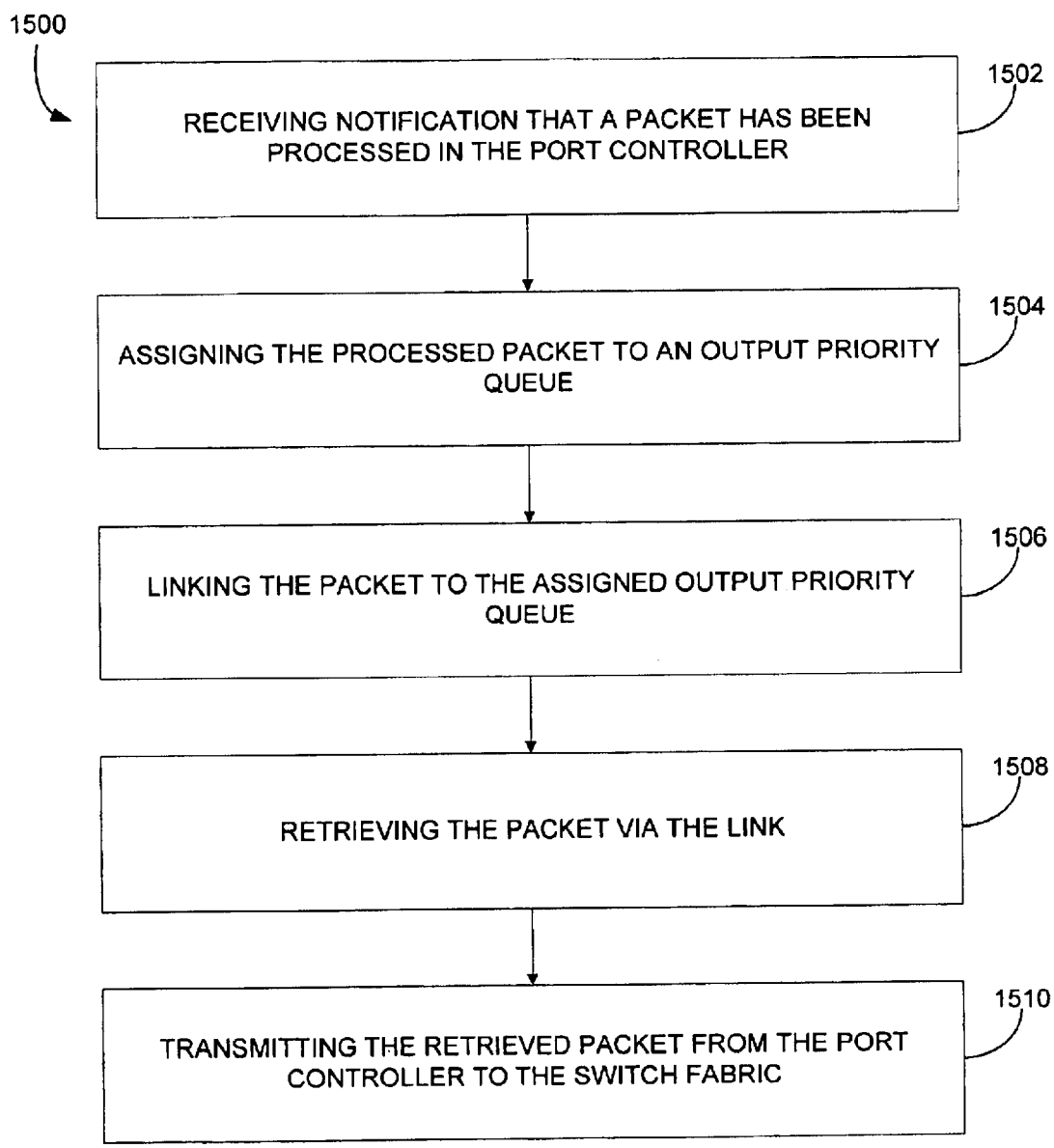
FIG. 15 is a flowchart of a process for transferring a packet from a port controller to a switch fabric in a switch fabric system in accordance with an embodiment of the present invention.

FIG. 15 is a flowchart of a process 1500 for transferring a packet from a port controller to a switch fabric in a switch fabric system in accordance with an embodiment of the present invention. Notification is received in operation 1502 indicating that a packet has been processed in the port controller. The processed packet is assigned and linked to an output priority queue in operations 1504 and 1506. Subsequently, the packet is retrieved via the link in operation 1508 and transmitted from the port controller to the switch fabric in operation 1510.

In an aspect of the present invention, the packet may be linked to the assigned output priority queue in a linked list.

In an embodiment of the present invention, a subsequently processed packet may be assigned and linked to the same output priority queue. As an option, a pointer may link the packet to the subsequently processed packet. In another embodiment of the present invention, the packet may be stored in and retrieved from a memory. As a further option, the packet may be stored in the memory in a plurality of linked cells.

In another aspect of the present invention, the processed packet may include a destination vector indicating one or more destinations for the packet accessible via the switch fabric.

The present invention may also include a data structure for storing the packets in the memory of a port controller. The data structure may comprise a plurality of queues with each queue having a head/start address associated therewith. One or more packets are stored in the memory with each packet assigned to one of the queues. For each queue, the start address may have a link to a first of the packets in the queue and each packet in the queue may a link to the next subsequent packet in the queue. In one aspect, each packet may be stored in the memory in a plurality of linked cells. In a preferred embodiment, a pointer links a cell of the packet to a subsequent cell of the packet with the last cell of the packet having a Null pointer.

Figure 16:
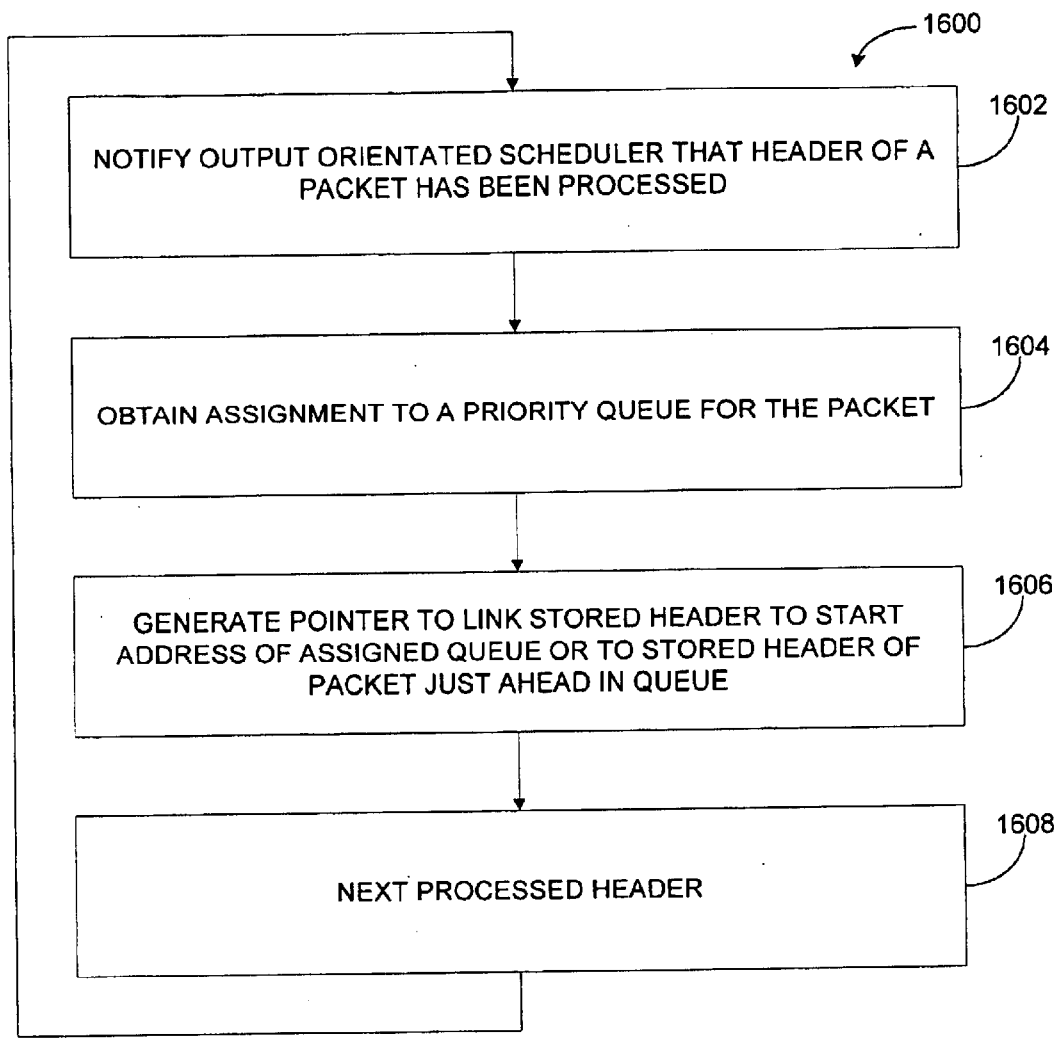
FIG. 16 is a flowchart of a process for generating linked lists of packets queued for egress in accordance with an embodiment of the present invention.

FIG. 16 is a flowchart of a process 1600 for generating linked lists of packets queued for egress in accordance with an embodiment of the present invention. In operation 1602, the Ingress DMA 404 notifies the output orientated scheduler 412 that a header portion of a packet has been processed. Subsequently, the Ingress DMA receives back from the output orientated scheduler information regarding to which output queue (for egress from the port controller) the packet has been assigned in operation 1984. A pointer is generated in operation 1606 linking the header portion now stored in the packet memory to the assigned output queue. If the assigned queue does not have any other packets already assigned to it, then the pointer links the processed header portion to the start address of the assigned queue.

On the other hand if the assigned queue does already have one or more other packets assigned to it, then the pointer links the processed header portion to stored header portion of another packet placed just before it in the queue. Operations 3802, 3804, and 3806 are repeated for each header portion processed by the port controller (see operation 1608).

Figure 17:
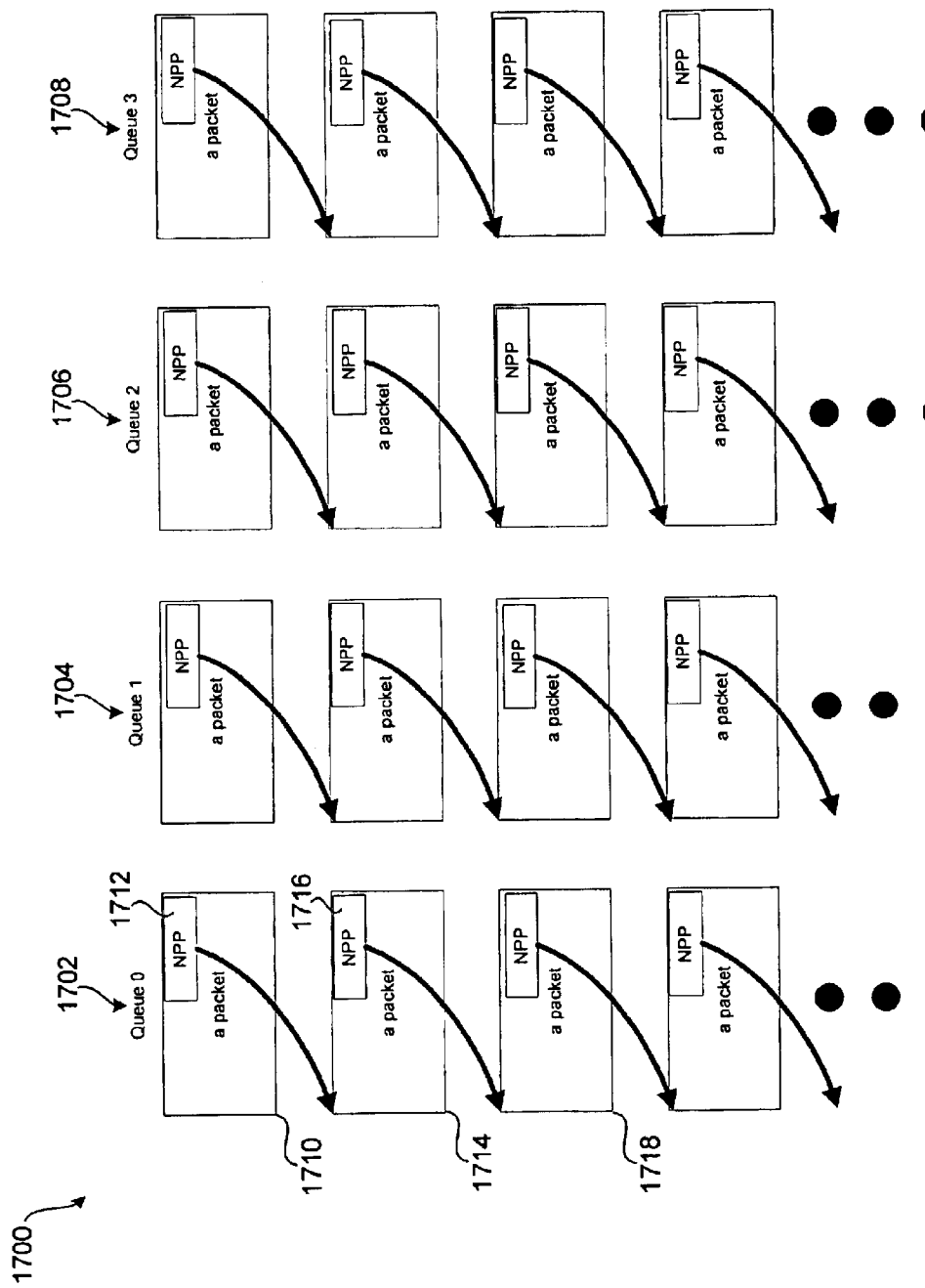
FIG. 17 is a schematic diagram depicting the linking of packets stored in the packet memory to their assigned output priority queues in accordance with an embodiment of the present invention.

FIG. 17 is a schematic diagram depicting the linking of packets stored in the packet memory 804 to their assigned output priority queues in accordance with an embodiment of the present invention. The output orientated scheduler 412 has a plurality of output priority queues 1702, 1704, 1706, 1708 which in the illustrated embodiment comprise four queues. In a preferred embodiment, both the output orientated scheduler and the ingress DMA know the start address of each queue.

Assigned to each priority queue are a plurality of packets stored in the packet memory, with the packets assigned to a particular queue depicted beneath the queue to which they are assigned. Because each queue is a first-in, first-out (FIFO), each stored packet has a next packet pointer ("NPP") providing a link from one packet in a particular queue to the start of the packet following next in the same assigned queue. Additional arrows show how each cell points at the address where its next cell is saved. For example, with reference to queue 0 1702 in FIG. 17, the first packet 1710 stored in the packet memory assigned to queue 0 1702 has a pointer 1712 to the start of the stored packet 1714 next in the queue which in turn has a pointer 1716 to the start of the stored packet 1718 third in the queue and so on.

Figure 18:
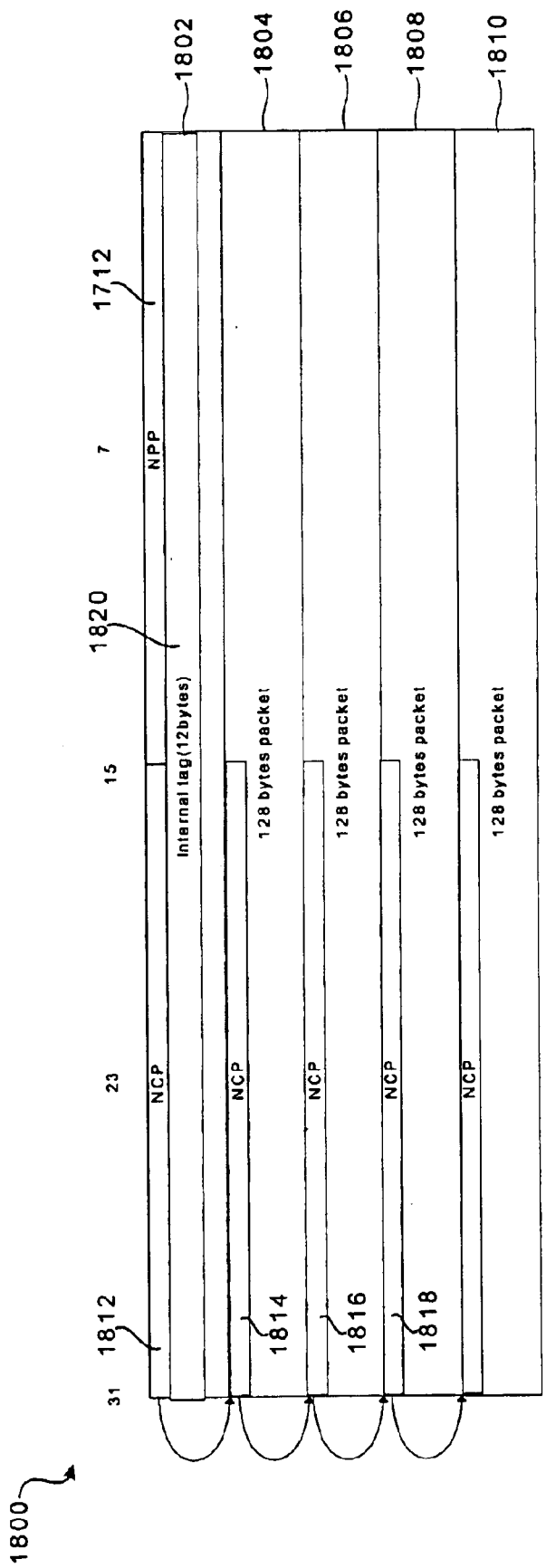
FIG. 18 is a schematic diagram illustrating an exemplary packet stored in the packet memory illustrated in FIG. 17 in accordance with an embodiment of the present invention.

FIG. 18 is a schematic diagram illustrating an exemplary packet 1710 stored in the packet memory illustrated in FIG. 17 in accordance with an embodiment of the present invention. The exemplary packet 1710 is divided into a plurality of cells with the first cell 1802 includes the processed header portion of the packet and the remaining cells 1804, 1806, 1808, 1810 comprising the body of the packet. Cells 1802, 1804, 1806, 1808 each have a next cell pointer ("NCP") 1812, 1814, 1816, 1818 to the start of the next subsequent cell. Every NCP points at the next cell except the final one of the last cell of a packet. The final NCP can have any value but it may be considered as invalid by the output oriented scheduler because output oriented scheduler knows the size of the packet from internal tag information.

In one embodiment, the ingress DMA 404 is responsible for generating the links/pointers. In a preferred embodiment the size of a pointer may be 16 bits (2 bytes).

As mentioned previously, the first cell 1802 has the processed header portion which includes an internal tag which may indicate the size of the packet and the destination port from which the packet is to be output from the switch fabric system. Also, the first cell 1802 includes the next packet pointer 1712 pointing to the start of next stored packet 1714 in queue 0 1702.

Each queue may be a first-in, first-out (FIFO). When the output orientated scheduler 412 is ready to retrieve a packet assigned to one of its FIFO queues from the packet memory, the output orientated scheduler may read the NCP in each cell to find the next cell of the packet. In one embodiment, the NCP of the last cell may be ignored by the output orientated scheduler based on its knowledge of the size of the packet it is retrieving.

Figure 19:
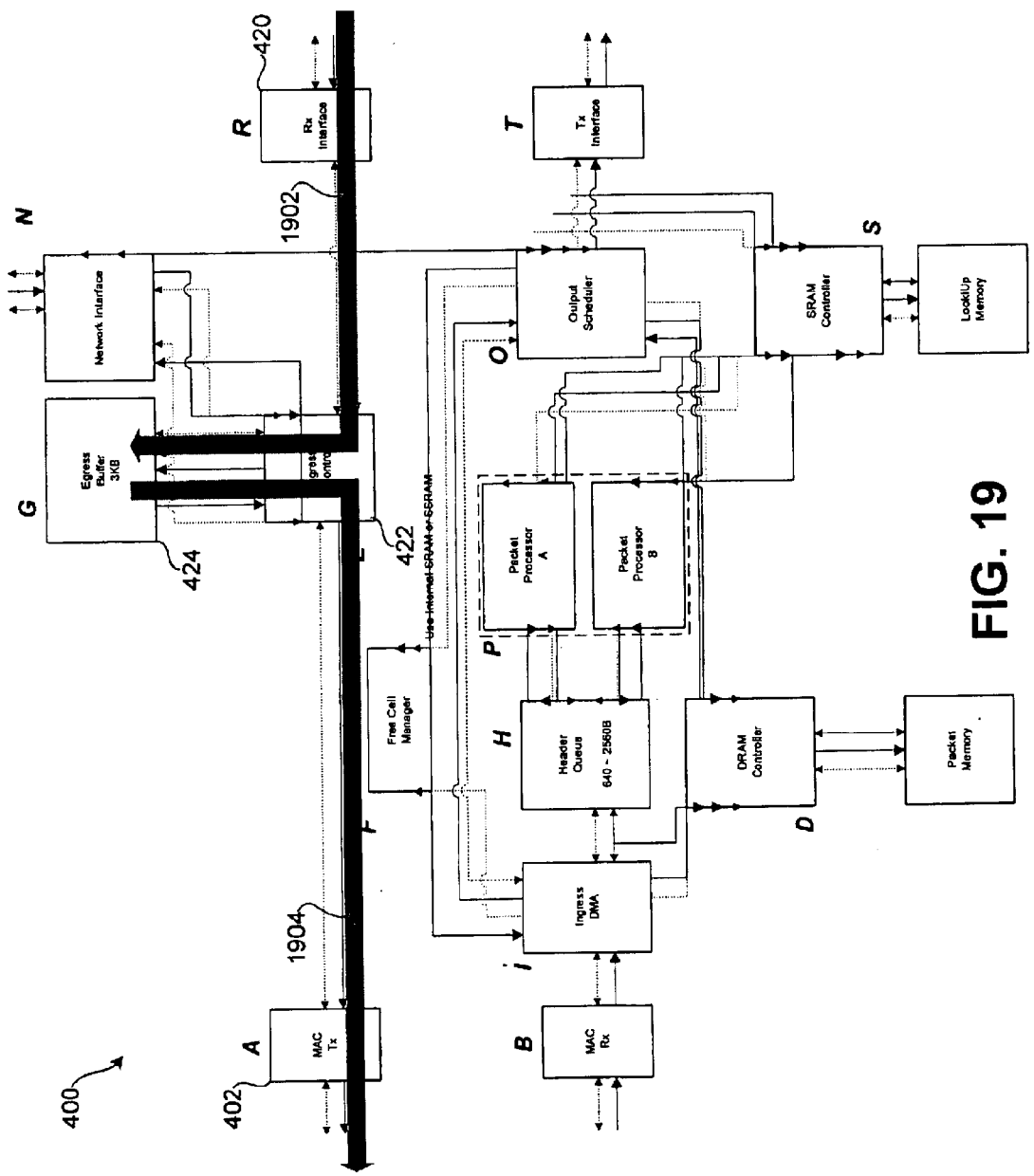
FIG. 19 is a schematic flow diagram illustrating a process for processing a packet exiting a switch system via a port controller in accordance with an embodiment of the present invention.

FIG. 19 is a schematic flow diagram illustrating a process for processing a packet exiting a switch system via a port controller 400 in accordance with an embodiment of the present invention. In this process, the packet has already been processed prior to being received by the port controller 400. The exiting packet is first received into the port controller by the interface receiver 420. The interface receiver 420 forwards the packet to egress controller 422 which may then transfer the packet to the egress buffer 424. When the egress controller is ready to send the exiting packet out of the port controller, the egress controller 422 retrieves the packet from the egress buffer 424 and transfers the packet to the MAC interface 402 for transmitting the packet out of the port controller (see arrow 1904).

SWITCH FABRIC

Figure 20:
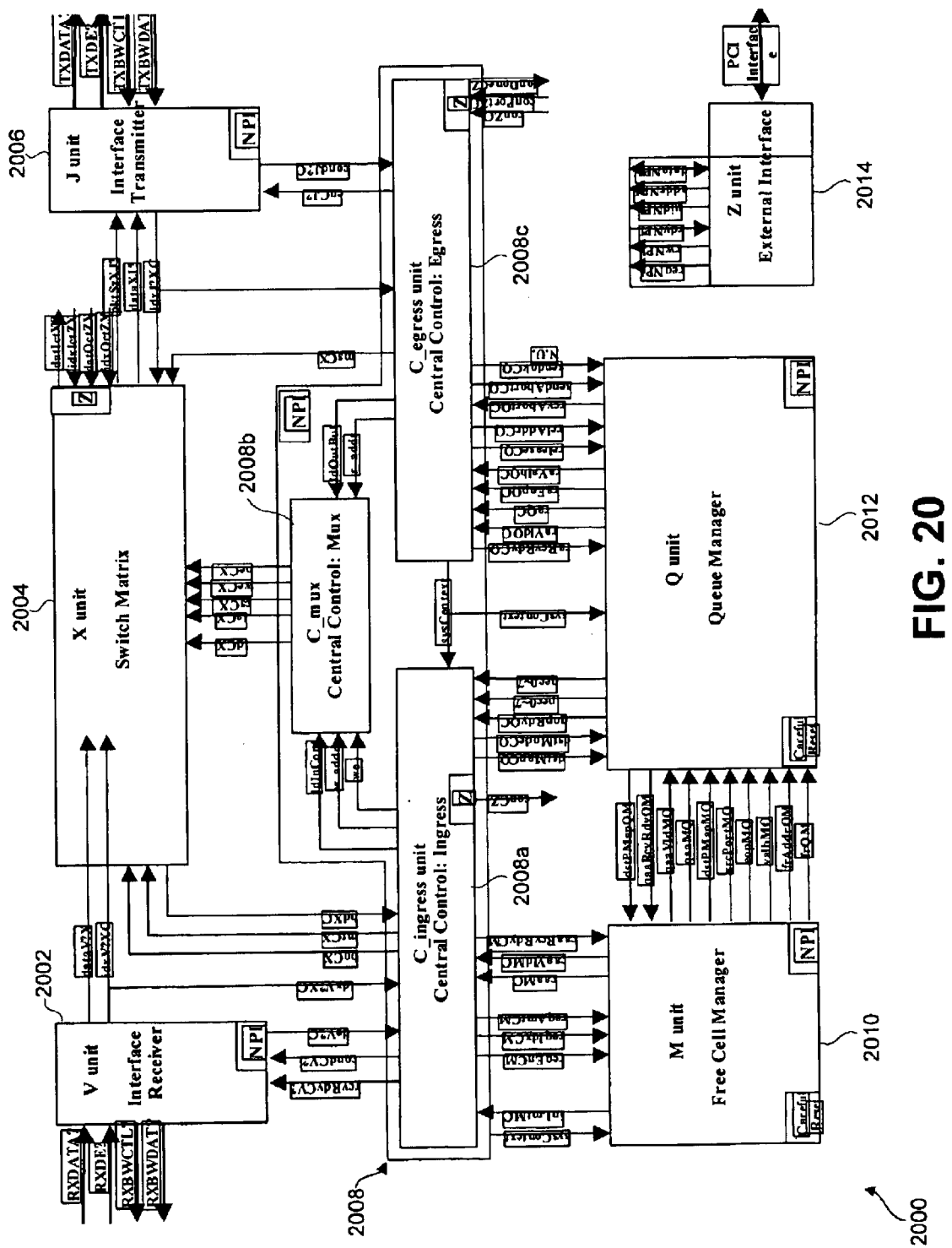
FIG. 20 is a schematic block diagram of an architecture of a switch fabric component in accordance with an embodiment of the present invention.

FIG. 20 is a schematic block diagram of an architecture of a switch fabric component 2000 in accordance with an embodiment of the present invention. The switch fabric component 2000 includes an interface receiver 2002, a switch matrix 2004, an interface transmitter 2006, a central controller 2008, a free cell manager 2010, a queue manager 2012, and an external interface 2014.

For the sake of clarity and ease of comprehension, only one interface receiver 2002 and one interface transmitter 2006 are depicted in FIG. 20. However it should be understood, that a switch fabric component may include more than one interface receiver and more than one interface transmitter. For example, in the 8×8 switch fabric components (e.g., 104*a*) illustrated in FIG. 1, each switch fabric component has eight interface receivers and eight interface transmitters. Similarly, the switch fabric component 204 illustrated in FIG. 2 includes four interface receivers and four interface transmitters.

The interface receiver 2002 serves to receive packets. The interface receiver has an external I/O for connection to an interface transmitter of another switch fabric component or to an interface transmitter 4014 of a port controller. The interface receiver is coupled to the switch matrix 2004 to permit transferring of a received packet from the interface receiver 2002 to the switch matrix 2004. The function of the interface receiver 2002 is similar to that of interface receiver 420 of a port controller. The interface receiver 2002 configures the link through external I/O and also interacts with central controller 2008 for control.

The switch matrix 2004 provides a data path for packets in the switch fabric component. The switch matrix is coupled to both the interface receiver(s) 2002 and the interface transmitter(s) 2006. The switch matrix receives data (i.e., packets) from the interface receivers. Each incoming packets is stored in memory of the switch matrix until the packet can be transferred to an interface transmitter 2006 for transmission out of the switch fabric component. In one preferred embodiment, the switch matrix has 64 Kbytes of memory.

As mentioned above, the interface transmitter 2006 is coupled to the switch matrix 2004. The interface transmitter is connectable to the interface receiver of another switch fabric component or that of a port controller via an external I/O. The interface transmitter 2006 transmits packets from the switch matrix out of the switch fabric component. Each interface transmitter 2006 may be connected externally to an interface receiver of another switch fabric component or a port controller and may configure the link through external I/O. Each interface transmitter 2006 also interacts with central controller 2008 for control.

The central controller 2008 is connected to and controls every unit in the switch fabric component. The central controller 2008 may include three components: an ingress unit 2008*a*, a matrix unit 2008*b* and an egress unit 2008*c*. The central controller 2008 manages the storing of incoming packets in the memory of the switching matrix according to free cell addresses provided by the free cell manager 2010. The central controller 2008 also reads the destination port from the destination vector of a packet and stores the packet in a queue through the queue manager 2012. In addition, the central controller may generate signals to transfer packets from the switch matrix to an interface transmitter 2006 according to the information of the queue manager 2012.

The free cell manager 2010 is coupled to the central controller, and the queue manager 2012. The free cell manager 2010 manages the free cells in the memory of the switching matrix based on information provided via the central controller 2008. In particular, the free cell manager 2010 maintains the information about the occupied cells and the free cells in the switch matrix in a table and provides this information to central controller 2008 and the queue manager 2012.

The queue manager 2012 is coupled to the central controller 2008 and the free cell manager 2010. The queue manager 2012 receives information about incoming packets and stores the information as a linked list by FIFO according to output ports. The queue manager 2012 also manages the queues of exiting packets.

The external interface 2014 is connected to the central controller and the switch matrix. The function of the external interface is the same as the network interface of the port controller. The external interface exchanges control packets with the internal channel via an external I/O, and then analyzes these packets to maintain internal registers in switch fabric component.

Figure 21:
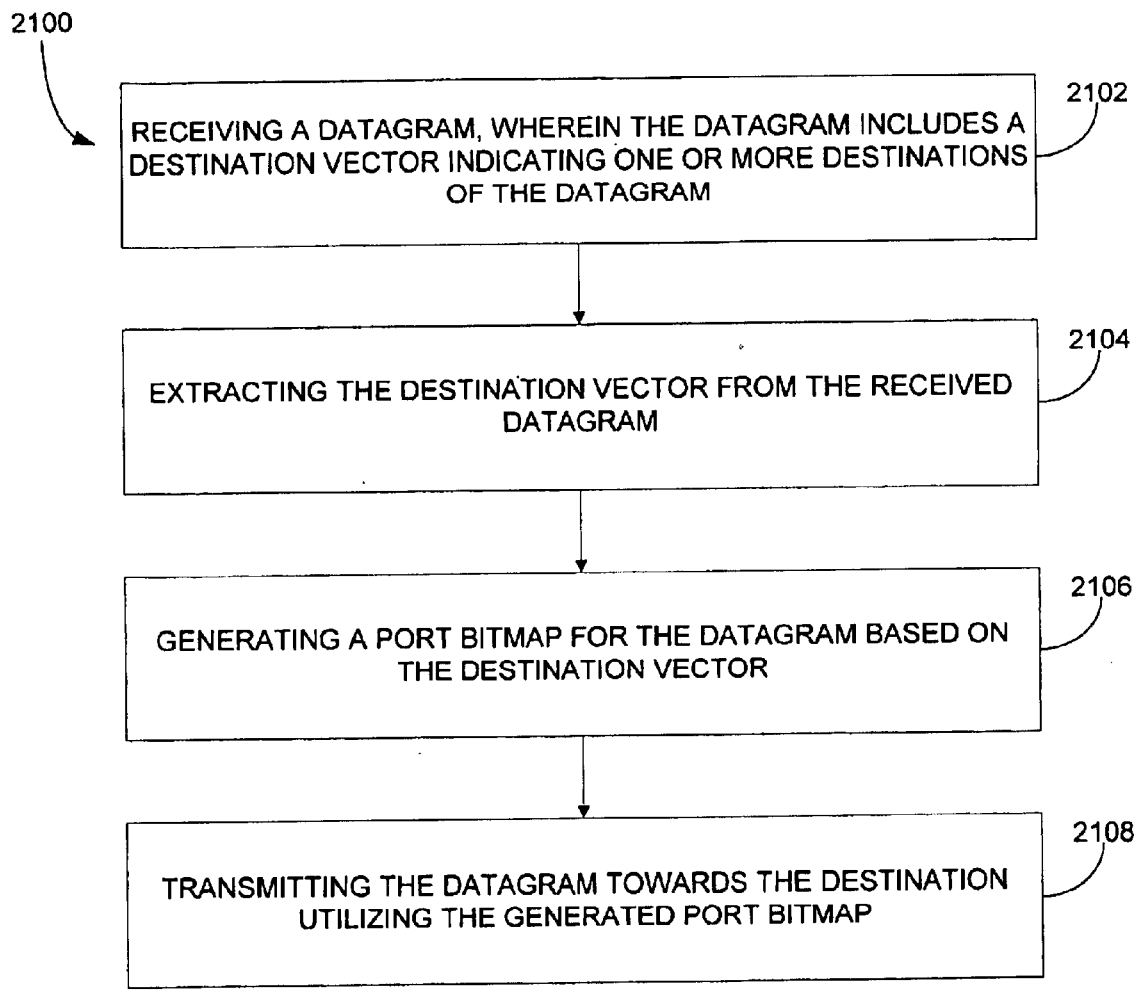
FIG. 21 is a flowchart of a process for sending a datagram through a switch fabric in accordance with an embodiment of the present invention.

FIG. 21 is a flowchart of a process 2100 for sending a datagram through a switch fabric in accordance with an embodiment of the present invention. From a received datagram, a destination vector is extracted (see operations 2102 and 2104). The destination vector indicates one or more destinations (i.e., Uni.-cast or multicast) of the datagram. A port bitmap is generated for the datagram based on the destination vector in operation 2106. The datagram is subsequently transmitted in operation 2108 towards the destination utilizing the port bitmap.

In an aspect of the present invention, the destination vector may comprise 32 bits of data. In another aspect of the present invention, the port bitmap may comprise 8 bits of data.

In an embodiment of the present invention, generating the port bitmap may further include obtaining all destinations of the datagram from the destination vector and then utilizing a switching table to determine through which switch ports of the switch fabric component can the datagram be routed to reach the destinations. The port bitmap may then be generated to indicate therein all of the determined switch ports through which the can the datagram be routed to reach its intended destinations.

In another embodiment of the present invention, transmitting the datagram may also include creating a mask based on the port bitmap, and modifying the port bitmap using the mask upon transmission of datagram. In such an embodiment, modifying the port bitmap using the mask may also include clearing the port bitmap of a data associated with the destination that the datagram was transmitted towards.

In a further embodiment of the present invention, the availability of a switch port through which the datagram may be routed to reach the destinations may also be determined. The datagram may then be transmitted through a switch port determined to be available.

Figure 22:
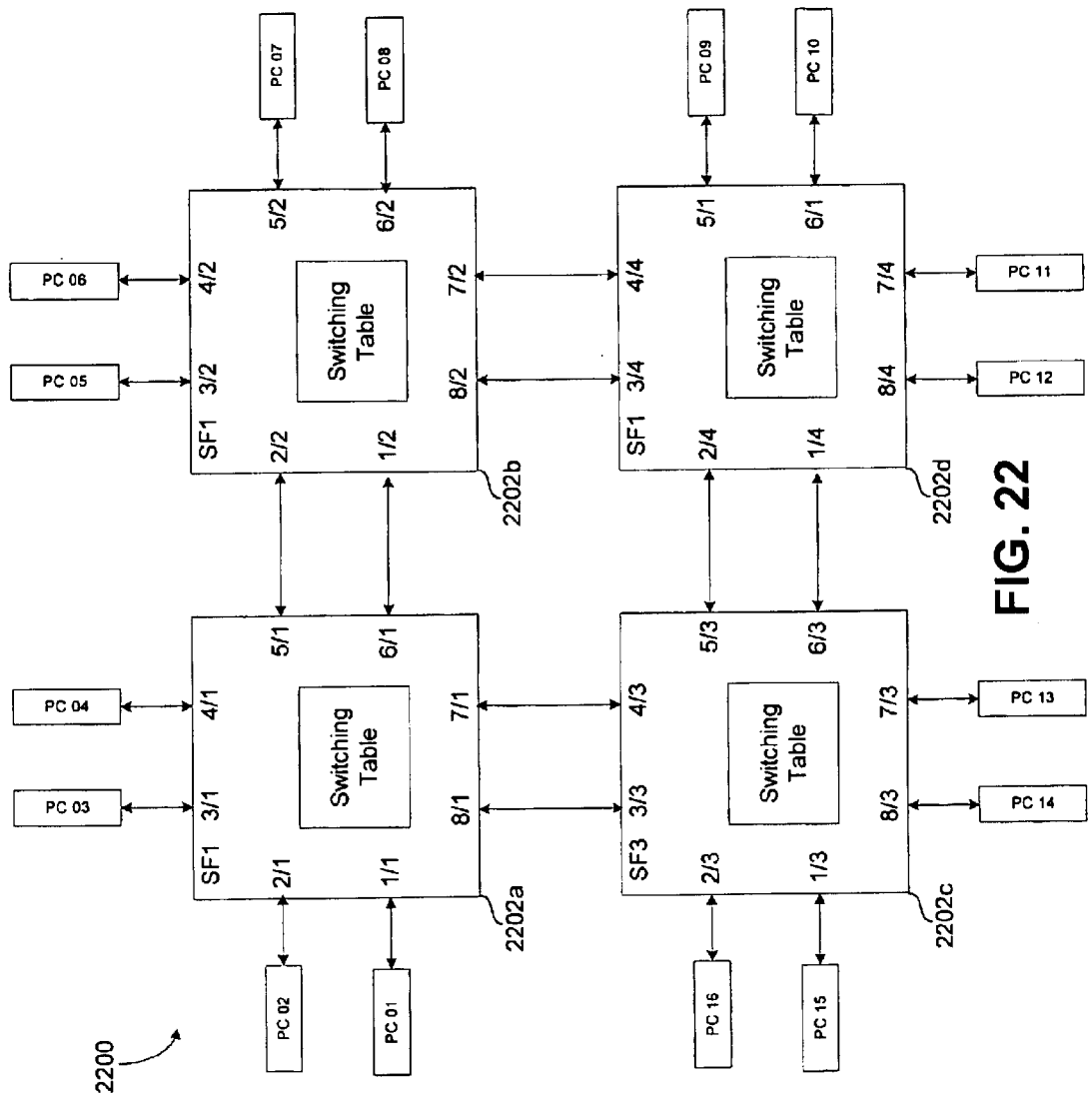
FIG. 22 is a schematic block diagram of a switch fabric comprising four 8 by 8 switch fabric components to illustrate the implementation of switching tables for routing packets through the switch fabric in accordance with an embodiment of the present invention.

FIG. 22 is a schematic block diagram of a switch fabric 2200 comprising four 8 by 8 switch fabric components to illustrate the implementation of switching tables for routing packets through the switch fabric in accordance with an embodiment of the present invention. The underlying principles discussed under this implementation may be utilized with any switch fabric in accordance with the present specification. For purposes of this discussion, is important to remember that the switch fabric and the switch fabric components are all bi-directional.

As illustrated in FIG. 22, the switch fabric 2200 comprises four 8 by 8 switch fabric components denoted as: SF1 2202*a*, SF2 2202*b*, SF3 2202*c*, and SF4 2202*d*. Each switch fabric component has eight ports ("switch ports"). For example, in FIG. 22, the eight switch ports of SF1 2202*a* are indicated as: 1/1, 2/1, 3/1, 4/1, 5/1, 6/1, 7/1, and 8/1 ("one-of- one, two-of-one, three-of-one, . . . " and so on). The eight switch ports of SF2, SF3, and SF4 are similarly denoted in FIG. 22. For example, the ports of SF2 2202*b* are denoted using n/2, (where n is an integer between 1 and 8), the ports of SF3 2202*c* are denoted using n/3, and the ports of SF4 2202*d* are denoted using n/4 (where n is an integer between 1 and 8).

In the illustrated switch fabric of FIG. 22, each switch fabric component has two ports coupled to the two adjacent switch fabric components. For example, ports 5/1 and 6/1 of SF1 2202*a* are coupled to ports 2/2 and 1/2 of SF2 2202*b*, respectively, and ports 7/1 and 8/1 of SF1 2202*a* are coupled to ports 4/3 and 3/3 of SF3 2202*c*, respectively.

With continuing reference to FIG. 22, the switch fabric 2200 also includes a plurality of device ports. For purposes of this discussion, a device port may be defined as a port of a switch fabric component which may be coupled to an external device, (such as, for example, a port controller) and are not connected to another switch fabric component in the switch fabric. In the exemplary embodiment illustrated in FIG. 22, the switch fabric has sixteen (16) device ports (these are numbered 1 through 16 in FIG. 22) with each switch fabric component having four device ports. For example, SF1 2202*a* has device ports 1, 2, 3, and 4, SF2 2202*b* has device ports 5, 6, 7, and 8, SF3 2202*c* has device ports 9, 10, 11, and 12, and SF4 2202*d* has device ports 13, 14, 15, and 16.

SWITCHING TABLES

In an embodiment of the present invention, switching tables may be utilized to help enhance flexibility of the switch fabric. A switching table may be associated with each switch fabric component to record which devices may be reached through each port of a switch fabric component. In other words, each switching table provides information as to which ports of a particular switch fabric component may be used (i.e., are accessible) to transmit a packet from out of the particular switch fabric component.

FIGS. 23, 24, 25, 26 are schematic illustrations of exemplary switching tables for the switch fabric 2200 depicted in FIG. 22 in accordance with an embodiment of the present invention. In particular, the exemplary switching table 2300 illustrated in FIG. 23 is for switch fabric component SF1 2202*a*, the exemplary switching table 2400 illustrated in FIG. 24 is for switch fabric component SF2 2202*b*, the exemplary switching table 2500 illustrated in FIG. 25 is for switch fabric component SF3 2202*c*, and the exemplary switching table 2600 illustrated in FIG. 26 is for switch fabric component SF4 2202*d*.

Each switching table may be represented as a grid (e.g., a plurality of bitmap arrays) having a plurality of columns 2302 for the device ports of the switch fabric and a plurality of rows 2304 for the ports of the particular switch fabric component. Together the columns and rows form the bitmap arrays of the switching table. In this grid representation, a bitmap array comprises a row of boxes formed by the columns and rows of the switching table grid. In the boxes formed by the columns and rows of each grid are 1's 0's. A "1" in a box indicates that a particular device port is accessible via the port of the particular row while a "0" in a box indicates that a particular device port is not accessible via the port of the particular row. Using such a representation, one can generate a bitmap a port of a switch fabric component based on the array associated with the particular port.

For example, with reference to FIG. 23 which represents the switching table 2300 for switch fabric component SF1 2202*a*, one can ascertain the bitmap array for port 1/1 by looking at the top row which is designated for port 1/1. In this array, there is a "1" in the box under the column for device port 1, and "0" in each of the boxes under the rest of the columns. This indicates that only device port 1 is accessible via port 1/1 of SF1 2202*a* (i.e., a packet in SF1 whose destination is accessible via transmission through device port 1 must be routed through port 1/1). Similarly, referring to the row (i.e., array) which is designated for port 5/1, we see that there is a "1" in each of the boxes under the columns for device ports 5, 6, 7, 8, 9, and 10, and "0" in each of the boxes under the columns for device ports 1, 2, 3, 4, 11, 12, 13, 14, 15, and 16. This indicates that device ports 5, 6, 7, 8, 9, and 10 are accessible for a packet in SF1 via port 5/1 of SF1 2202*a*.

It should be noted that in the exemplary illustrative embodiment illustrated in FIGS. 22, and 23–26, the switching tables have been generated to limit access from any port of a switch fabric component to no more than six device ports. This has been done to help simply understanding of the travel of a packet through the switch fabric 2200 of FIG. 22. It should be understood that for the switch fabric 2200 in FIG. 22, that a port of a switch fabric component could have access to up to twelve ports (for example, a packet in SF1 transmitted via port 5/1 could have access to device ports 5 through 16 if the switching tables were so generated).

It should also be noted that each of the switching tables illustrated in FIGS. 23–26 have been generated in accordance with a preferred embodiment where columns for up to 32 device ports have been included. This preferred embodiment of the switching tables is to help enable the use of switching tables in the preferred embodiment of the switch fabric illustrated in FIG. 1 which has a switch fabric with 32 device ports with 32 port controllers connected thereto. Because the exemplary switch fabric 2200 illustrated in FIG. 22 only has 16 device ports (for e.g., connecting 16 port controllers thereto), the boxes in columns 17 through 32 all contain "0's" in each of the four switching tables 23–26.

Figure 27:
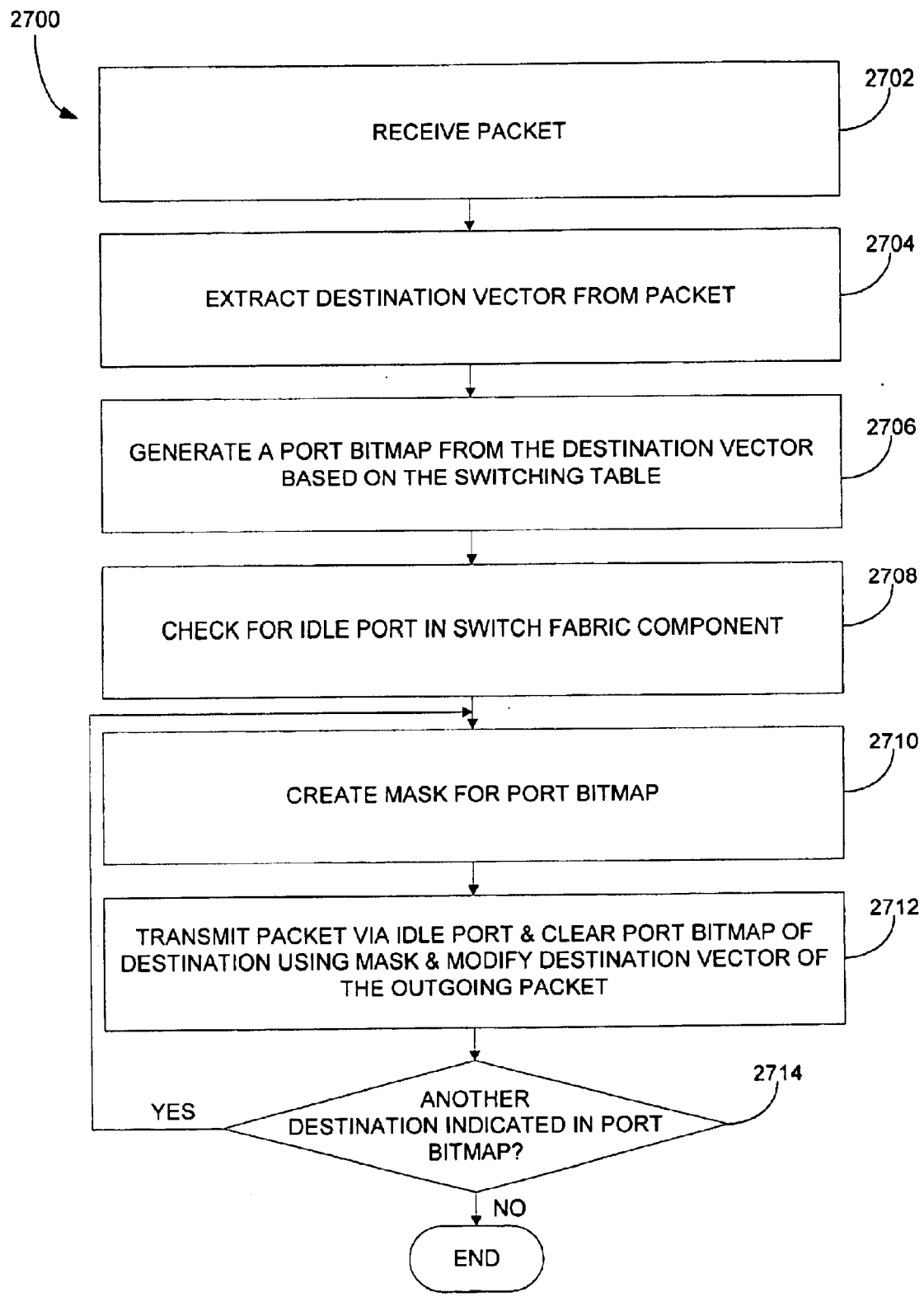
FIG. 27 is a flowchart for a process for processing a packet through a switch fabric component in accordance with an embodiment of the present invention.

FIG. 27 is a flowchart for a process 2700 for processing a packet through a switch fabric component in accordance with an embodiment of the present invention. In operation 2702, a packet is received by the switch fabric component. A destination vector is extracted from the received packet in operation 2704. A port bitmap is then generated from the extracted destination vector based on the switching table of the switch fabric component in operation 2706. In operation 2708, logic of the switch fabric component checks to determine whether one of the ports of the switch fabric component indicated in the port bitmap is idle. If one of the ports indicated by the port bitmap is found to be idle, then a mask for the identified idle port is created based on the port bitmap in operation 2710. In operation 2712, the outgoing packet is then transmitted via the identified idle port of the switch fabric and the port bitmap is cleared of the information relating to the port through which the packet was just transmitted. A clearing process is also executed on the destination vector of the outgoing packet at the identified port to modify the destination vector of the outgoing packet. In decision 2714, if it determined that another destination is included in the port bitmap, then operations 2710 and 2712 are repeated for each additional destination.

When a packet enters a switch fabric component, the destination vector of the packet and the switching table of the switch fabric component are used to determine through which ports of the switch fabric component the packet should exit. In one embodiment, the determination result may be stored as a linked list. In one aspect, the determination result may comprise a port bitmap. In another aspect, the determination result may comprise the destination vector.

Figure 28:
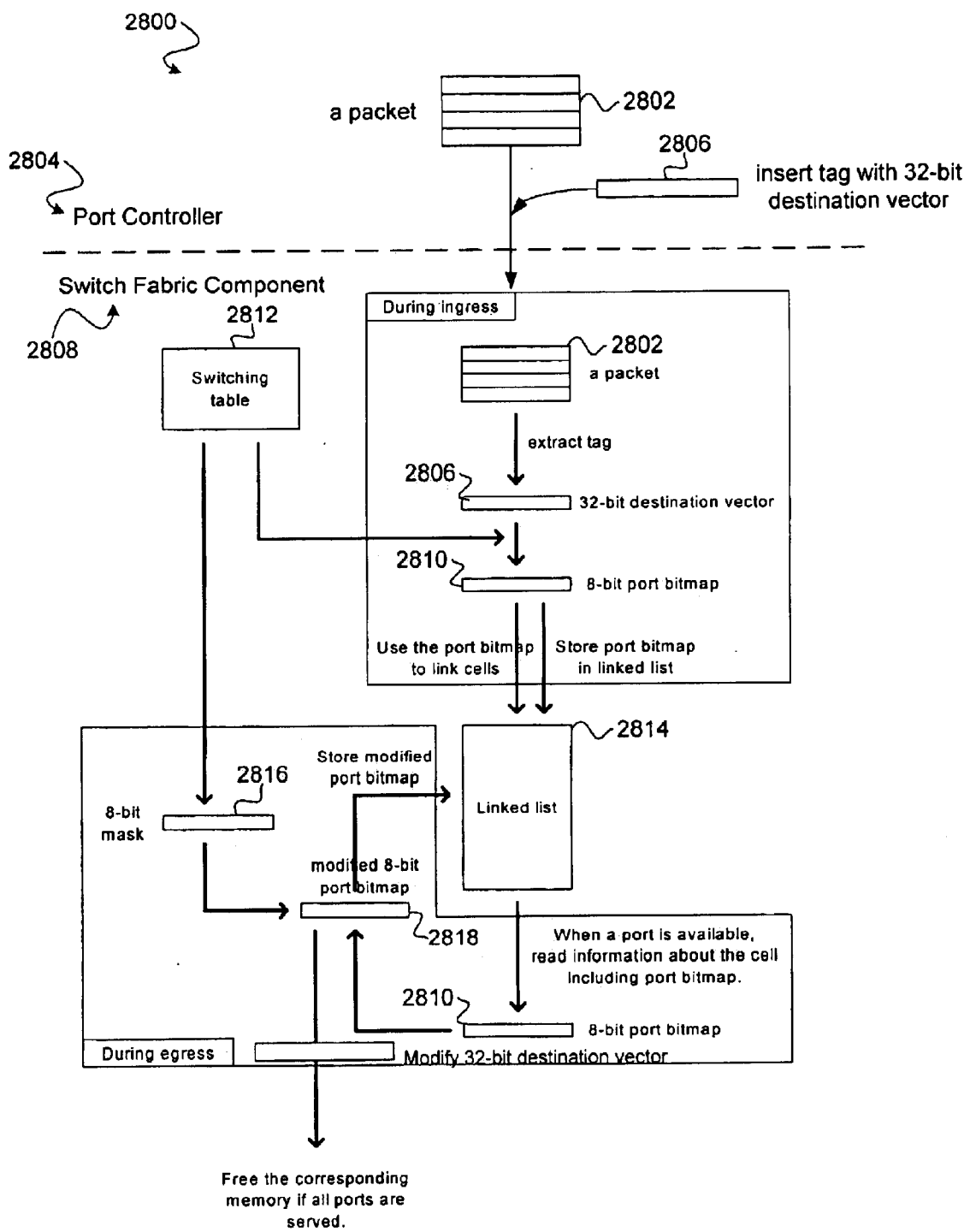
FIG. 28 is a schematic diagram illustrating a process for processing a packet through a switch fabric component where the determination result comprises a port bitmap in accordance with an embodiment of the present invention.

FIG. 28 is a schematic diagram illustrating a process 2800 for processing a packet through a switch fabric component where the determination result comprises a port bitmap in accordance with an embodiment of the present invention. Prior to ingress into the switch fabric component, a tag is inserted into the packet 2802 during processing of the packet in the port controller 2804. The tag includes a destination vector 2806 indicting one or more device ports the packet is destined. In a preferred embodiment, the destination vector 2806 may have a length of 32 bits (i.e., a "32-bit destination vector"). The port controller is coupled to a device port of the switch fabric component 2808 to permit transfer of the packet with the inserted tag into the switch fabric component.

Upon ingress of the packet (with inserted tag) 2802 into the into the switch fabric component 2808, the tag is extracted to obtain the destination vector 2806. A port bitmap 2810 is then generated based on the destination vector 2806 and the switching table 2812 of the switch fabric component 2808. In a preferred embodiment, the port bitmap has a length of 8 bits (i.e., an "8-bit port bitmap"). The packet is then stored in cells in the memory of the switch matrix of the switch fabric component. The generated port bitmap 2810 is used to link in a linked list 2814 the cells of memory in which the packet is stored. The port bitmap 2810 is also stored in the linked list 2814 in the switch fabric component 2808.

When a proper output port is determined to be available, the packet may egress the switch fabric component via the output port. Upon the determination of the availability of a proper output port, the information about the appropriate cells (including the port bitmap) is read from the linked list 2814 to obtain the port bitmap 2810. The switching table 2812 is then used to produce a mask 2816 for the port of egress. In a preferred embodiment, the mask 2816 has a length of 8 bits (i.e., an "8-bit mask"). Next, the mask 2816 is used to modify the port bitmap 2810 so that information relating to the sending of the packet through the output port is removed from the port bitmap. The modified port bitmap 1018 is then stored in the linked list 2814. If the modified port bitmap 2818 contains all "0" bits (i.e., no "1's"), then the corresponding memory cell in the switch matrix is freed. In a preferred aspect of such an embodiment, the linked list may include 8 bit/word by 256 word memory for storing port bitmaps. In another preferred aspect of such an embodiment, the switching table may include logic (i.e., circuits) to produce masks. In even another preferred aspect of this embodiment, the rows of the switching table may be exclusive with respect to one another.

Figure 30:
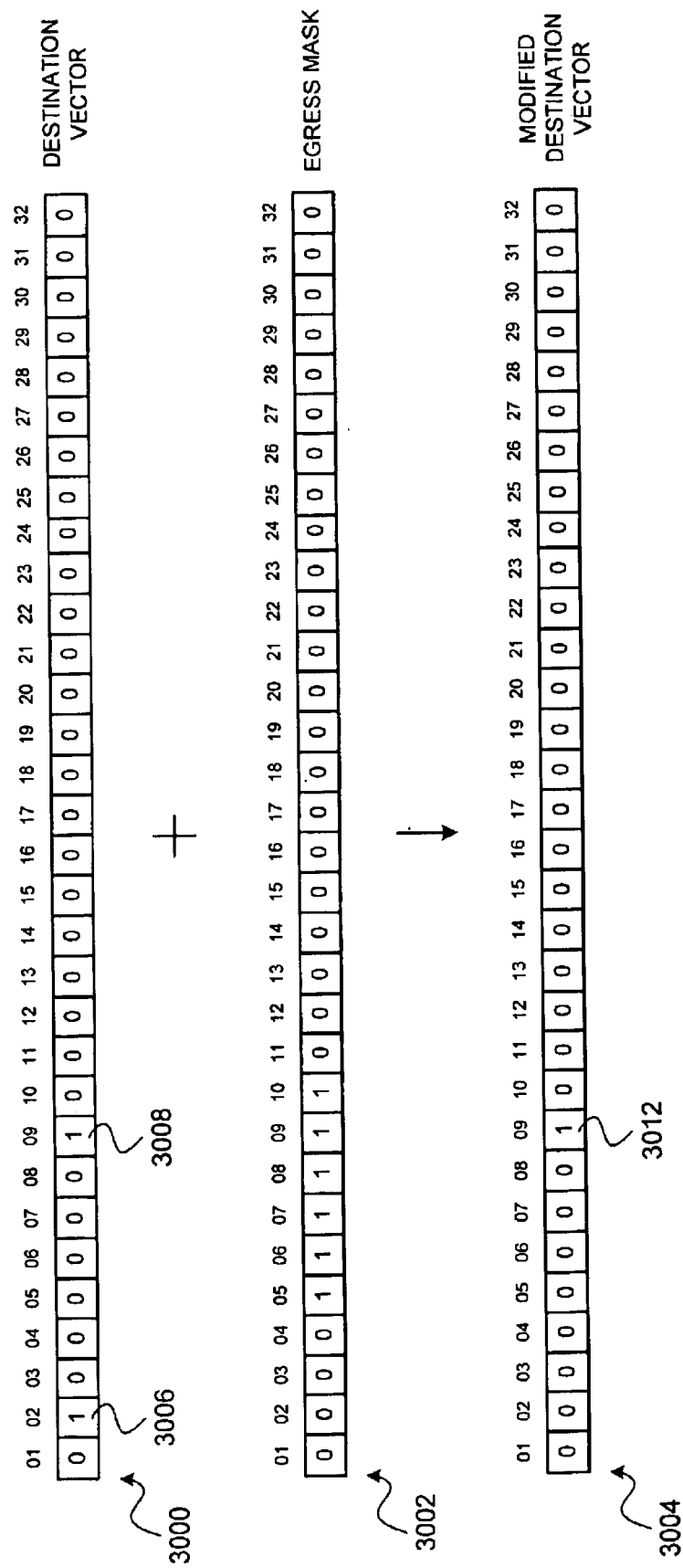
FIG. 30 is a schematic representation of an exemplary destination vector, an egress mask for the destination vector and a modified destination vector in accordance with an embodiment of the present invention.

As a preferred option to the process 2800 illustrated in FIG. 28, the destination vector may be cleared from a packet as the packet exits an outgoing port of a switch fabric component. A benefit to implementing such an option may be seen in the following illustration using the switch fabric 2200 depicted in FIG. 22: In this illustration, suppose a packet entering the switch fabric 2200 has two destinations: device port 2 in SF1 2202a and device port 7 in SF2 2202b. FIG. 30 is a schematic representation of a destination vector 3000 (in particular, a 32 bit destination vector) for a packet entering SF 1 2202 from device port 1 and having destinations of device port 2 in SF1 2202a and device port 7 in SF2 2202b in accordance with the present illustration.

PORT BITMAP

Figure 29:
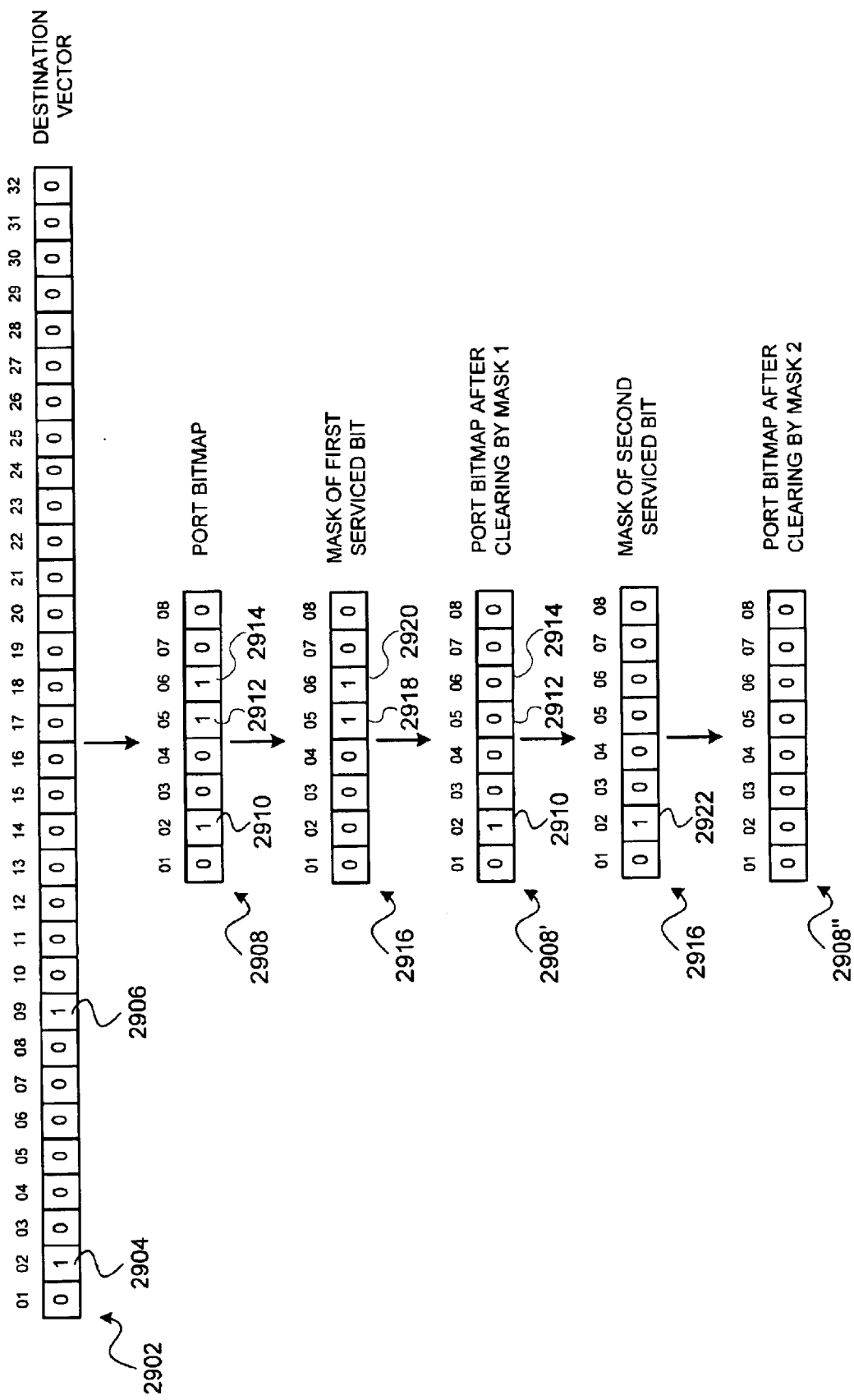
FIG. 29 is a schematic diagram illustrating an exemplary utilization of a port bitmap (in particular, an 8 bit port bitmap) in a switch fabric component in accordance with an embodiment of the present invention.

FIG. 29 is a schematic diagram illustrating an exemplary utilization of a port bitmap (in particular, an 8 bit port bitmap) in a switch fabric component in accordance with an embodiment of the present invention. This example is based upon the exemplary switch fabric 2200 illustrated in FIG. 22 and takes place in the switch fabric component SF1 2202a. In this example, a packet is received by SF1 via a port controller coupled to device port 1 and has 2 destinations: (1) device port 2 (located at SF1 2202a), and (2) device port 9 (located at SF4 2202d).

In SF1 2202a, the destination vector is extracted from the packet. As illustrated in FIG. 29, the extracted destination vector 2902 has a "1" in bits 2 and 9 2904, 2906 indicating the intended destination ports of the packet (device ports 2 and 9). Based on the information of the extracted destination vector 2902, the switch fabric component then uses it switching table to determine through which of its switch ports the packet can be routed to arrive at the packet's intended destinations. With reference to the switching table 2300 for switch fabric component SF1 illustrated in FIG. 23, we see that device port 2 can be accessed through switch port 2/1 of SF1 (see the row 2/1) and device port 9 can be accessed through switch ports 5/1 and 6/1 of SF1 (see rows 5/1 and 6/1).

A port bitmap is a bitmap generated by a switch fabric component based on information from the extracted destination vector of a packet received by the switch fabric component and information the switching table of the switch fabric component. Preferably, the port bitmap is generated by the central controller of a switch fabric component. The port bitmap indicates through which of the switch ports of the switch fabric component the packet needs to be routed through in order for the packet to reach its intended destination(s) (i.e., device port(s)). A port bit map comprises a plurality of bits with each bit being associated with a corresponding switch port of the associated switch fabric component. For example, in a switch fabric component having four switch ports, the port bitmap for that switch fabric has (at least) four bits, with each bit being associated with one of the four switch ports of the switch fabric component. As another example, in the embodiment illustrated in FIG. 22, each of the switch fabric components has eight switch ports. Therefore, the port bitmaps generated for each switch fabric component has at least eight bits, with each of the eight bits associated with a corresponding switch port of the respective switch fabric component. In a preferred embodiment, the port bitmap comprises eight (8) bits.

The bits of a port bitmap may each contain either a "1" or "0". In one embodiment, if a bit of the port bitmap contains a "1", then that indicates that the switch port associated with that particular bit may serve as a port for outputting the packet from the switch fabric component. Conversely, if a bit of the port bitmap contains a "0", then that indicates that the switch port associated with that particular bit may not serve as a port for outputting the packet from the switch fabric component.

Returning to FIG. 29, we see the port bitmap 2908 that may be generated by switch fabric component SF1 for the received packet based on the extracted destination vector 2902 and the switching table 2300 of SF1. This port bitmap 2908 includes "1's" in bits 2, 5 and 6 2910, 2912, 2914 which are associated with switch ports 2/1, 5/1 and 6/1 of SF1 respectively.

In the present illustration, suppose either switch port 5/1 or 6/1 is determined to be available (i.e., idle) before switch port 2/1. Then, in this example, the packet would first be output via switch port 5/1 or 6/1 towards its intended destination of device port 9 (via SF2 and then SF4). As set forth in the flowchart illustrated in FIG. 27 and with continuing reference to FIG. 29, a first mask 2916 is generated based on the port bitmap and the outputting switch port. In the present example, this first mask includes "1's" in bits 5 and 6 2918, 2920 which indicate the serviced bits of the port bitmap when the packet is outputted via switch ports 5/1 or 6/1.

Continuing with the present example, the port bitmap is then cleared of the served bits using the first mask 2916. In general, a clearing involves the clearing those bits in the port bitmap containing "1's" where the corresponding bits of the mask also contain "1's". In other words, a clearing involves the changing from "1's" to "0's" in the bits in the port bitmap containing "1's" where the corresponding bits of the mask also contain "1's". For example, FIG. 29 depicts the bits of the (modified) port bitmap 2908' after being cleared of the serviced bits using the first mask. As illustrated, the modified port bitmap has only a "1" remaining in bit 2 2910 and "0's" in bits 5 and 6 2912, 2914 indicating that that bit 2 has not been cleared (i.e., switch port 2/1 has not yet been serviced) and that bit 5 and 6 have been cleared (i.e., switch port 5/1 or 6/1 has been serviced).

Next, when switch port 2/1 is determined to be available (i.e., idle), a second mask 2916 is generated for the port bitmap based upon the servicing of switch port 2/1. This mask has a "1" in bit 2 2922 indicating the outputting of the packet via switch port 2/1. As the packet is then outputted from switch port 2/1 (i.e., device port 2), the port bitmap can be cleared using the second mask 2916. FIG. 13A shows the modified port bitmap 2908 after being cleared by the second mask 2916. As illustrated in FIG. 29, all of the bits of the modified port bitmap 2908 contain "0's" thereby indicating that no more destinations remain in the port bitmap for outputting the packet.

FIG. 30 is a schematic representation of an exemplary destination vector 3000, an egress mask 3002 for the destination vector and a modified destination vector 3004 in accordance with an embodiment of the present invention. As illustrated in FIG. 30, in the present illustration, the bits for device ports 2 and 7 3006, 3008 contain "1's" thereby indicating that the destinations of devices 2 and 7 for the associated packet. In SF1, the packet is transmitted out via 2/1 (i.e., device port 2) and also via 5/1 or 6/1 to SF2 (in order to reach device port 7). Now, if the packet that was sent to SF2 was transmitted without any modification to the destination vector 3000, SF2 will then extract the unmodified destination vector 3000 and process the packet as if one of the destinations from SF2 is device port 2 and therefore send a copy of the packet back to SF1 for transmission out through device port 2.

To cure this problem, a clearing process may be inserted at the end of each output port of a switch fabric component. The clearing process clears all bits of the destination vector of an outgoing packet except for the bits corresponding to the devices reachable through the outgoing port. This clearing process involves the generation of an egress mask 3002 and then using the egress mask 3002 to modify the destination vector of the exiting packet. The egress mask 3002 contains "1's" in all of the bits accessible through that particular egress port (and "0's" in the remaining bits). Continuing with the present illustration, the packet in SF1 can reach device port 7 from either port 5/1 or 6/1 of SF1 (see the switching table for SF1 in FIG. 23). With reference to the switching table for SF1 shown in FIG. 23, we can see that the device ports that can be reached via ports 5/1 or 5/6 are device ports 5–10. Therefore, the generated egress mask 3002 contains "1's" in bits 5 through 10 and "0's" in the remaining bits as illustrated in FIG. 30. This egress mask may then be used to modify the destination of the packet leaving SF1 from ports 5/1 or 6/1 for SF2 by clearing the destination vector of any "1's" in bits not covered by the "1's" of the egress mask. Thus, the modified destination vector 3004 for the present illustration depicted in FIG. 30 has only a single "1" in the bit for device port 7 3010 since the "1" in the bit for device port 2 was not "masked" by the "1's" of the egress mask. With such a clearing process, the modified destination vector does not include any information that would cause SF2 to send a copy of the packet back to SF1 for egress to device port 2. It should be noted that in a preferred embodiment, that the egress mask of each output port of a switch fabric component may be the same as the associated row of the switching table corresponding to each respective port. In one aspect of such a preferred embodiment, each output port of a switch fabric component may have a register which contains the same contents as associated row of the switching table of its respective switching component.

Figure 31:
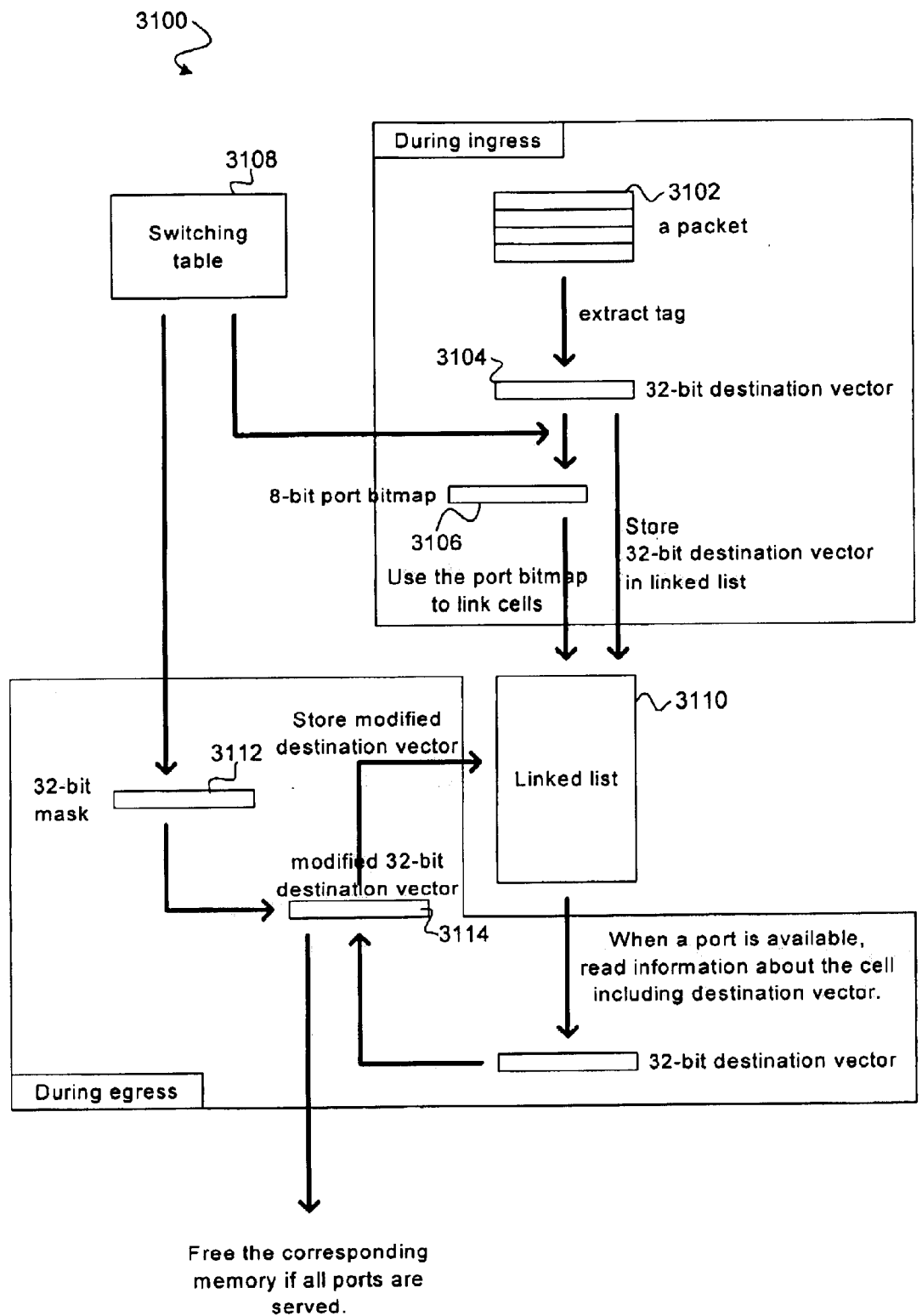
FIG. 31 is a schematic diagram illustrating another process for processing a packet through a switch fabric component where the determination result comprises a destination vector in accordance with an embodiment of the present invention.

FIG. 31 is a schematic diagram illustrating another process 3100 for processing a packet through a switch fabric component where the determination result comprises a destination vector in accordance with an embodiment of the present invention. Like the embodiment illustrated in FIG. 28, the tag including the destination vector (preferably, a 32-bit destination vector) is inserted into the packet 3102 during processing of the packet in the port controller coupled to the switch fabric component prior to ingress into the switch fabric component. Upon ingress of the packet 3102 into the into the switch fabric component, the tag is extracted to obtain the destination vector 3104. As in the process 2800 set forth in FIG. 28, a port bitmap 3106 is then generated based on the destination vector 3104 and the switching table 3108 of the switch fabric component 3100. In a preferred embodiment, the port bitmap 3106 comprises an 8-bit port bitmap. The generated port bitmap 3106 is used to link in a linked list 3110 the cells of memory in which the packet is stored. However, the 8-bit port bitmap 3106 is not stored in the linked list 3110. Instead, the (32-bit) destination vector 3104 is stored in the linked list 3110.

With continuing reference to FIG. 31, when a proper output port is determined to be available for egress of the packet, the cell information is read from the linked list 3110 and the destination vector 3104 is obtained. The switching table is used to generate a destination mask 3112 for the egress port. Preferably, the destination mask has a length of 32 bits (i.e., a "32 bit destination mask"). In one aspect, the 32-bit destination mask comprises a row of the switching table corresponding to the egress port. Next, the destination mask 3112 is used to modify the destination vector 3114 which is then subsequently stored in the linked list 3110. If, like the modified port mask 2818 in FIG. 28, the modified destination vector 3114 contains all "0" bits, the corresponding memory cell is freed.

In a preferred aspect of such an embodiment 3100, the linked list may include 32 bit/word by 256 word memory for storing the destination vector 3104. In another preferred aspect of such an embodiment, unlike the switching table 2812 of the embodiment depicted in FIG. 28, the switching table 3108 may not need to include logic (i.e., circuits) to produce destination masks since a destination mask is simply a row of the switching table 3108. In even another preferred aspect of this embodiment, the rows of the switching table need not be exclusive with respect to one another.

BACK PROPAGATION

Figure 32:
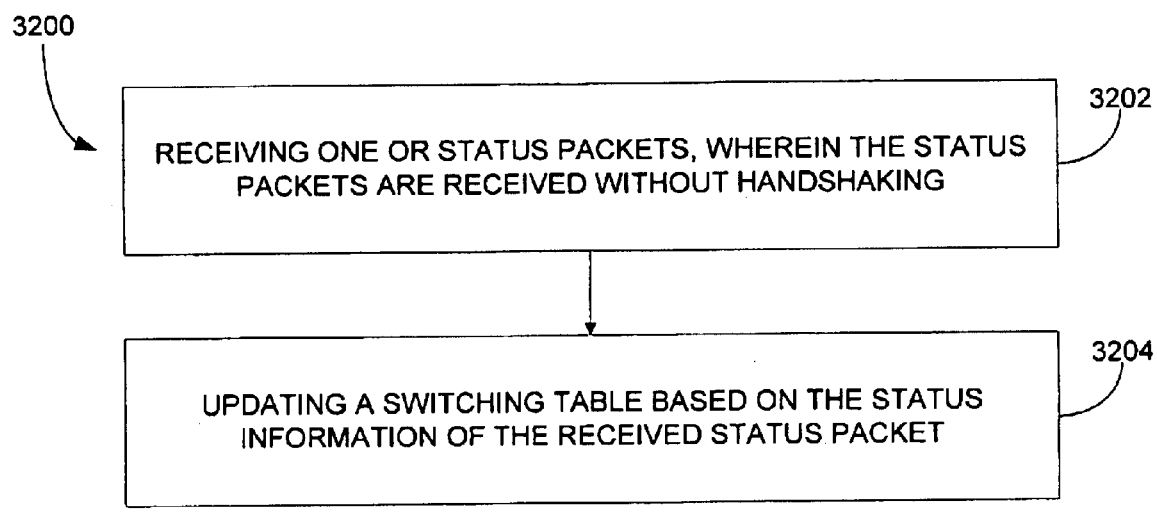
FIG. 32 is a flowchart of a process for updating a switching table in a switch fabric in accordance with an embodiment of the present invention.

FIG. 32 is a flowchart of a process 3200 for updating a switching table in a switch fabric in accordance with an embodiment of the present invention. In operation 3202, one or more status packets are received by a switch fabric component without handshaking between the transmitting source(s) and the receiving switch fabric component. Each status packet includes information relating to a status of an output port. A switching table is then updated based on the status information of the received status packet in operation 3204.

In an aspect of the present invention, the status packets may be received via paths/channels/conduits dedicated for transmitting the status packets and separate from paths dedicated for transmitting Ethernet packets through the switch fabric system. In another aspect of the present invention, the status packets may be received periodically and the switching table may be updated in real time.

In an embodiment of the present invention, a combined status packet may be generated based on the combined status information of the received status packets.

The combined status packet may then be transmitted to other switch fabric components. In one aspect of such an embodiment, the combined status packet may be transmitted from an outer layer switch fabric component to a middle layer switch fabric component.

In one aspect of the present invention, the received status packet may be generated from a port controller. In a further aspect of the present invention, the received status packet may be generated by a switch fabric component. In yet another aspect of the present invention, the status packet may comprise 32 bits of data with each bit being associated with a port of the switch fabric component.

In one embodiment, a switch system comprising a switch fabric port controller may utilize a handshaking protocol to determine the path by which a packet travels through the switch fabric to its destination port controller(s). However, the utilization of the handshaking protocol may lead to a reduction in the bandwidth of the switch system because: (1) the determination of path through the switch fabric must be performed for each incoming packet, and/or (2) the handshaking protocol is executed using the same channels or conduits by which the packet is propagated through the switch fabric.

Figure 33:
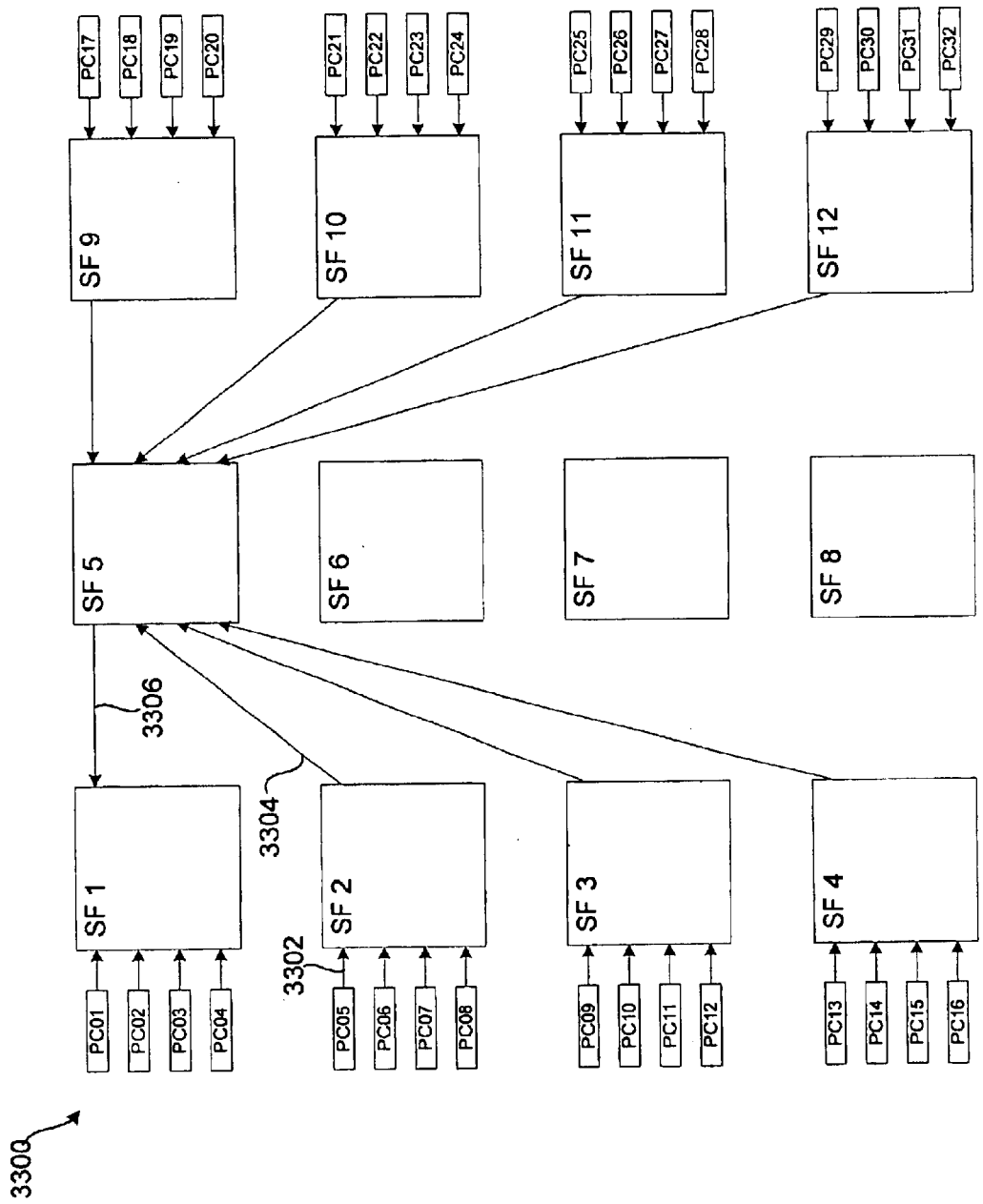
FIG. 33 is a schematic diagram illustrating an exemplary arrangement for back propagation of status and control information in a switch fabric in accordance with an embodiment of the present invention.

FIG. 33 is a schematic diagram illustrating an exemplary arrangement 3300 for back propagation of status and control information in a switch fabric in accordance with an embodiment of the present invention. The exemplary switch fabric 3300 depicted in FIG. 33 comprises twelve (12) switch fabric components (SF 1 through SF 12) preferably arranged in the Clos network topology of the multi-port switch architecture 100 illustrated in FIG. 1. The exemplary switch fabric 3300 also has thirty-two (32) port controllers (PCOI through PC32), with four port controllers coupled to each of outer layer switch fabric component (SF 1–4 and SF 9–12).

In the back propagation arrangement 3300, each port controller has a dedicated conduit (e.g., 3302) coupling the respective port controller to its associated outer layer switch fabric component. Similarly, each outer layer switch fabric component (SF 1–4 and SF 9–12) has a dedicated conduit (e.g., 3304) coupling the respective outer layer switch fabric component to each middle layer switch fabric component (SF 5–8). For sake of the clarity in explaining the back propagation process from the perspective of how SF 1 receives status information from each of the port controllers, only the dedicated conduits from the outer switch fabric components SF 2 through 4 and SF 9 through 12 are illustrated in FIG. 33. It should be understood that each of the outer switch fabric components (i.e., SF 1–4 and SF 9–12) has a dedicated conduit to each of the middle switch fabric components (i.e., SF 5–8). Each of the middle switch fabric components (i.e., SF 5–8) has a dedicated conduit (e.g., 3306) coupling the respective middle switch fabric component to each of the outer switch fabric components (i.e., SF 1–4 and SF 9–12). Again, for sake of the clarity in explaining the back propagation process with respect to how SF 1 receives status information from each of the port controllers, only the dedicated conduit 3306 from middle switch fabric component SF 5 to outer switch fabric component SF 1 is illustrated. However, it should be recognized that an outer layer switch fabric component may be receiving status information from each of the middle layer switch fabric components in a similar fashion as is set forth in the illustration in FIG. 33.

With continuing reference to FIG. 33, via these dedicated conduits (e.g., 3302, 3304, 3306), status information about the availability of the port controllers receiving a packet (and other control information) may be propagated through the switch fabric. The arrow heads of the dedicated conduits 3302, 3304, 3306 indicate the propagation of the status information from throughout the switch system to switch fabric component SF 1. In a preferred embodiment, the dedicated paths may each have a bandwidth that permits the transmission of 2 bits of information per cycle. In such a preferred embodiment, one bit of the bandwidth may be utilized for transmitting control information and the other bit may be utilized to transmit status information regarding the availability of the port controllers of the switch system.

It should be noted that while FIG. 33 depicts switch fabric component SF 1 coupled to the dedicated conduit of middle layer switch fabric component SF 5 to receive status information via SF 5, middle layer switch fabric components SF 6, SF 7, and SF 8 each may have a dedicated conduit coupled to SF 1 to provide status information to SF 1. This redundancy may be beneficial because it allows SF 1 to continue to receive status information about the port controllers even if SF 5 is unable to transmit status information to SF 1.

In general, when the output-port status is propagated backward through the switch fabric, it may be merged with the local output-port status of the switch fabric and thereby eventually building up provided information about the overall path status of the switch fabric. Consequently, with such an arrangement, each component in the switch system may keep real-time updated path status information of the ports, and use this local information to control packet flow without a handshaking protocol between the entry point of the packet into the switch system and the output destination of the packet in the switch system.

Figure 34:
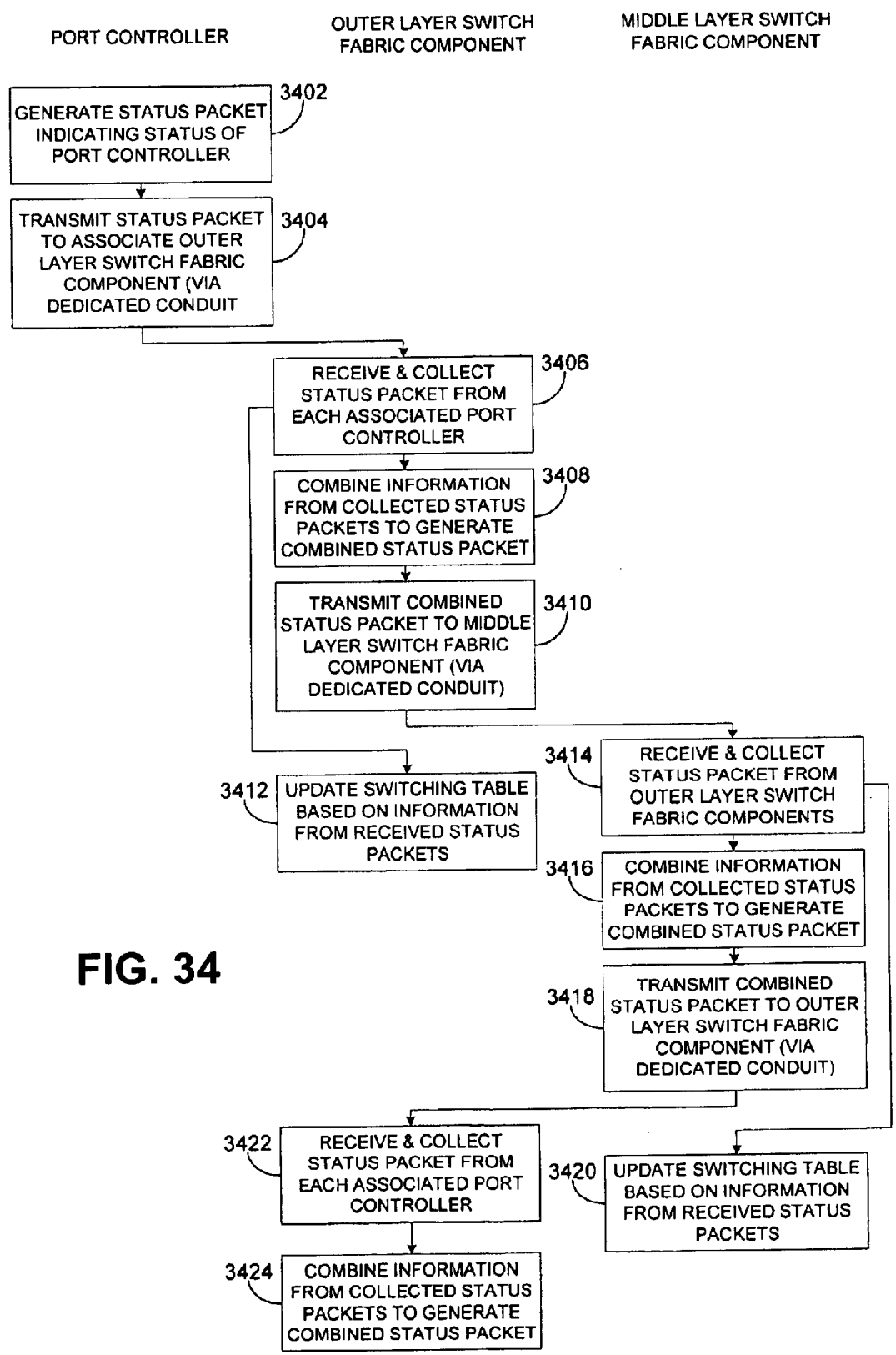
FIG. 34 is a flowchart of a process for updating switching tables in a switch fabric system in accordance with an embodiment of the present invention.

FIG. 34 is a flowchart of a process 3400 for updating switching tables in a switch fabric system in accordance with an embodiment of the present invention. In a preferred embodiment, the process is executed in a switch system having back processing dedicated conduits as set forth in the portion of the specification relating to FIG. 33. As shown in FIG. 34, portions of the process are executed in the port controllers of the switch fabric system while other portions of the process are executed in the outer layer and middle layer switch fabric components.

In operation 3402, a status packet is generated in a port controller. The status packet includes information which indicates the current status/availability of the port controller for receiving outgoing packets. The generated status packet is transmitted to the outer layer switch fabric component associated with the port controller in operation 3404. For example, with reference to FIG. 33, port controllers P32–08 are associated with switch fabric component SF 2. Therefore, port controllers P32–08 transmit the status packets they generate to switch fabric component SF 2. In the preferred embodiment, the port controller transmits the status packet to the associated outer layer switch fabric component via the dedicated conduit connecting them together (e.g., dedicated conduit 3302).

In operation 3406, the outer layer switch fabric component receives and collects the incoming status packets from its associated port controllers. The information from the received status packets is then combined in a status packet generated by the outer layer switch fabric component in operation 3408. The combined status packet is then transmitted to a middle layer switch fabric component in operation 3410. Preferably, the outer layer switch fabric component transmits the combined status packet to the middle layer switch fabric component via the dedicated conduit connecting them together (e.g., dedicated conduit 3304 connecting SF 2 to SF 5). The outer layer switch fabric component also uses the information from the status packet it receives from its port controllers to update its own switching table (see operation 3412).

The middle layer switch fabric component receives and collects the status packets transmitted by the outer layer switch fabric components in operation 3414. For example, with reference to the illustrative arrangement set forth in FIG. 33, In operation 3416, the middle layer switch fabric component generates a status packet that combines the status information included in the status packets received from the outer layer switch fabric components. For example, in the exemplary embodiment illustrated in FIG. 33, middle layer switch fabric component SF 5 receives status packets from outer layer switch fabric components SF 2–SF 12, with each of these packets having status information about the port controllers associated with each respective switch fabric component (e.g., the status packet from switch fabric component SF 2 has status information about port controllers P32–08, and so on).

In operation 3418, the status packet generated by the middle layer switch fabric component is transmitted to a receiving outer layer fabric component (e.g., in the example shown in FIG. 33, switch fabric component SF 1). Preferably, the middle layer switch fabric component transmits the combined status packet it generated to the receiving outer layer switch fabric component via the dedicated conduit connecting them together (e.g., dedicated conduit 3306 connecting SF 5 to SF 1). Additionally, the middle layer switch fabric component uses the information from the status packet it receives from the outer layer switch fabric components (regarding the status of the port controllers) to update its own switching table (see operation 3420).

After receiving the status packet from the middle layer switch fabric component in operation 3422, the receiving outer layer switch fabric component (e.g., switch fabric component SF1 in the example set forth in FIG. 33) updates its switching table in operation 3424 based on the status information included in the received status packet.

Thus, under the back propagation arrangement and procedures set forth in FIGS. 33 and 34, the dedicated conduits may be provided to periodically and/or continually broadcast (preferably in real time) notifications of the availability (i.e., output status) of all of device ports for receiving and outputting packets. Additionally, this back propagation arrangement does not necessarily need to utilize a handshaking protocol in order to transmit the status information to all of the switch fabric components.

Figure 35:
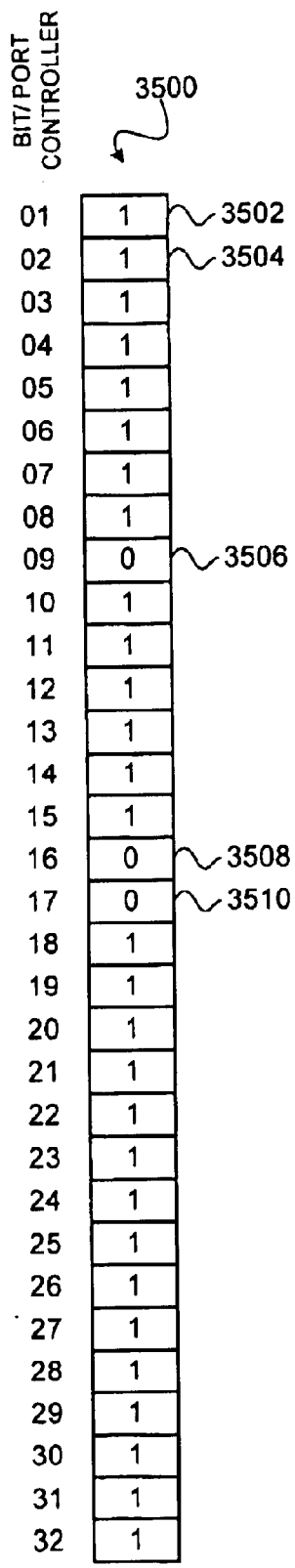
FIG. 35 is a schematic representation of a status packet that may be utilized in the process set forth in FIG. 34 in accordance with a preferred embodiment of the present invention.

FIG. 35 is a schematic representation of a status packet 3500 that may be utilized in the process set forth in FIG. 34 in accordance with a preferred embodiment of the present invention. The status packet comprises a plurality of bits, and in a preferred embodiment the status packet may comprise 32 bits. Each bit of the status packet may be associated with a particular port controller of the switch system. For example, based on the switch system illustrated in FIG. 33, bit 01 3502 of the status packet may be associated with port controller PC01, bit 02 3504 of the status packet may be associated with port controller P5, and so on. Each bit of the status packet may be used to indicate the availability (i.e., status)of its associated port controller for receiving/outputting a packet sent through the switch system.

As an illustrative example, a bit comprising a "1" may indicate that the associated 5 port controller is available for receiving/outputting a packet (i.e., the status of the port controller is "available"). Conversely, a bit comprising a "0" may indicate that the associated port controller is not available for receiving/outputting a packet (i.e., the status of the port controller is "unavailable"). Thus, in the exemplary status packet 3500 set forth in FIG. 35, the "1's" contained in bits 01 and 02 3502, 3504 indicate that port controllers PCOI and P5 are available while the "0's" contained in bits 09, 16, and 17 3506, 3508, 3510 indicate that port controllers PC09, PC16, PC17 are unavailable.

MULTI-BANK BUFFER

Figure 36:
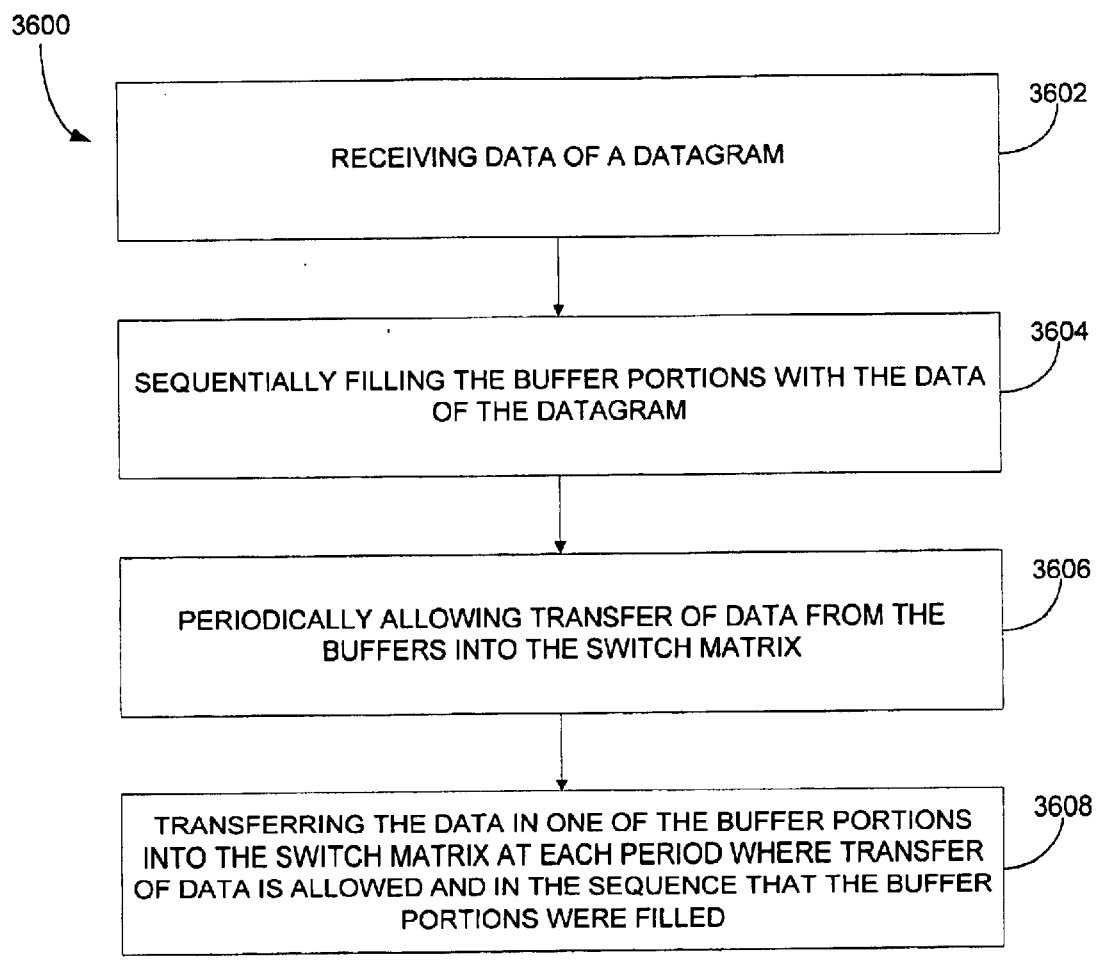
FIG. 36 is a flowchart of a process for storing an incoming datagram in a switch matrix of a switch fabric in accordance with an embodiment of the present invention.

FIG. 36 is a flowchart of a process 3600 for storing an incoming datagram in a switch matrix of a switch fabric. The switch matrix has a pair of buffers with each buffer having a pair of portions. Data of a datagram is received in operation 3602 and the buffer portions are sequentially filled with the data in operation 3604,. Periodically, transfer of data is allowed from the buffers into the switch matrix in operation 3606. At each period where transfer of data is allowed in the sequence that the buffer portions were filled, the data in one of the buffer portions may be transferred into the switch matrix in operation 3608.

In an aspect of the present invention, data in a buffer portion may only be transferred into the switch matrix if the buffer portion is filled with data or contains an end of a datagram (i.e., the tail or last byte of the datagram). In another aspect of the present invention, the switch matrix may comprise a plurality of memory banks for storing the transferred data. In such an embodiment, the memory banks may alternate in receiving data transferred from the buffer portions.

In a further aspect of the present invention, the buffer portions may each have equal storage capacities for storing received data. In a preferred embodiment, each buffer portion has a storage capacity of 16 bytes for storing the incoming data. In another preferred embodiment, wherein transfer of data may be allowed every 16 cycles.

Figure 37:
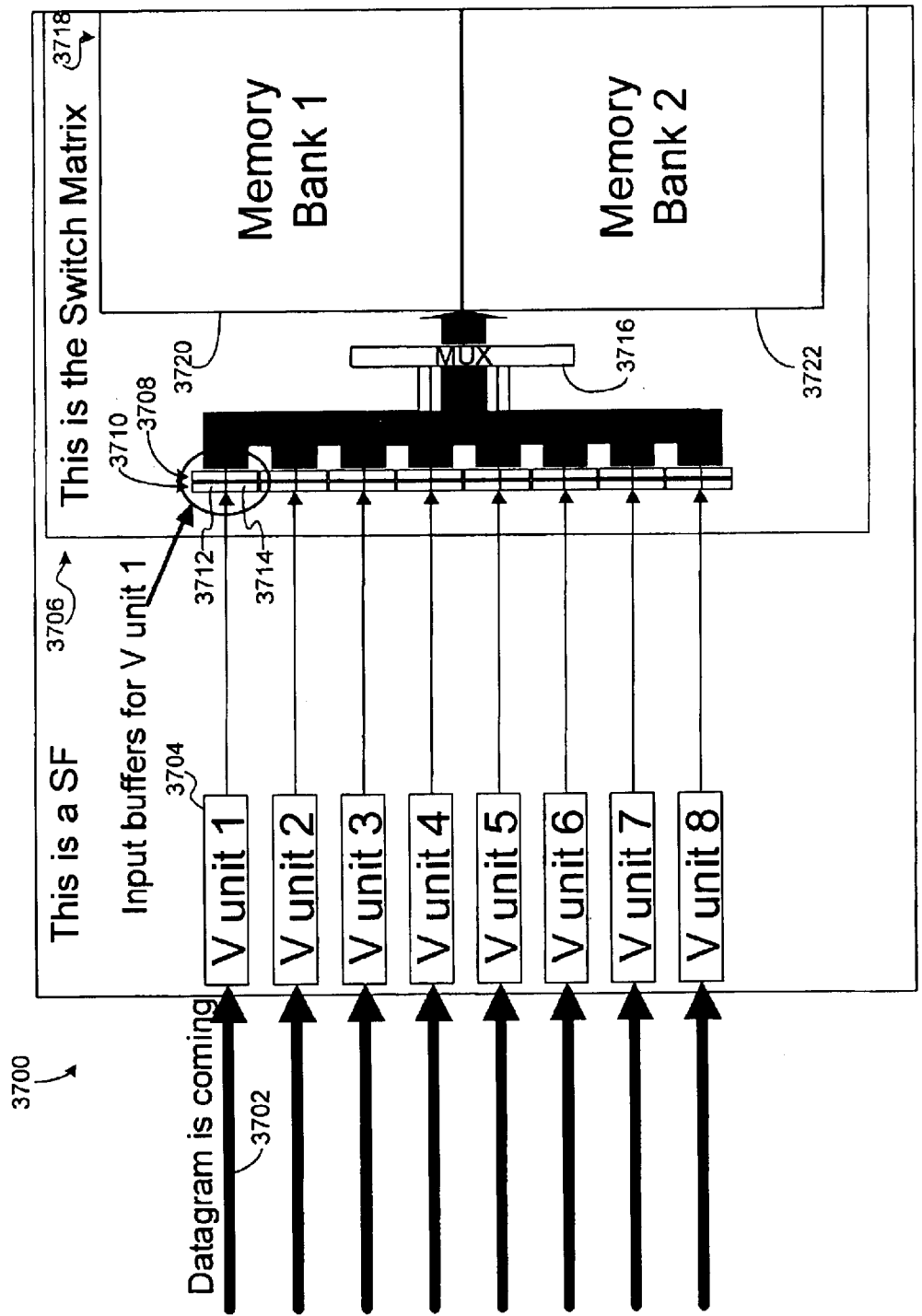
FIG. 37 is a schematic diagram illustrating the ingress and storage of packets (i.e., datagrams) in a switch fabric component in accordance with an embodiment of the present invention.

FIG. 37 is a schematic diagram illustrating the ingress and storage of packets (i.e., datagrams) )3702 in a switch fabric component 3700 in accordance with an embodiment of the present invention. As discussed previously, the switch fabric component 3700 may include a plurality of interface receivers 3704, with the illustrated embodiment having eight ingress receivers (e.g., such as the switch fabric components illustrated in FIG. 1 and 22) which are labeled as V unit 1–9.

Each ingress receiver is connected to the switch matrix 3706 thereby permitting transmission of an incoming packet from the particular ingress receiver into the switch matrix 3706. In particular, ingress receiver is coupled to an associated set of input buffers. In one embodiment, each set of input buffers comprises two input buffers 3708, 37100. In one embodiment, each input buffer may have a storage capacity of least to 16 bytes. In a preferred embodiment, each input buffer may have a storage capacity of 32 bytes. As a preferred option, each input buffer may be divided into two portions (e.g., the two portions 3712, 3714 of input buffer 3710). With such an option, it is preferred that the two portions 3712, 3714 of each input buffer have equal data holding capacities (e.g., in the 32 byte capacity preferred embodiment).

The central controller 3716 controls the transfer of data stored in the input buffers into memory 3718 of the switch matrix. In one embodiment, the memory of the switch matrix may comprise a plurality of memory banks therein. As illustrated in FIG. 37, in the preferred embodiment where each input buffer comprise two portions, the memory of the switch matrix may comprise two memory banks 3720, 3722 with each memory bank preferably being dedicated for receiving data from one of the two portions of each input buffer (e.g., memory bank 3720 is dedicated to input buffer portion 3712 and memory bank 3722 is dedicated to input buffer portion 3714).

Figure 38:
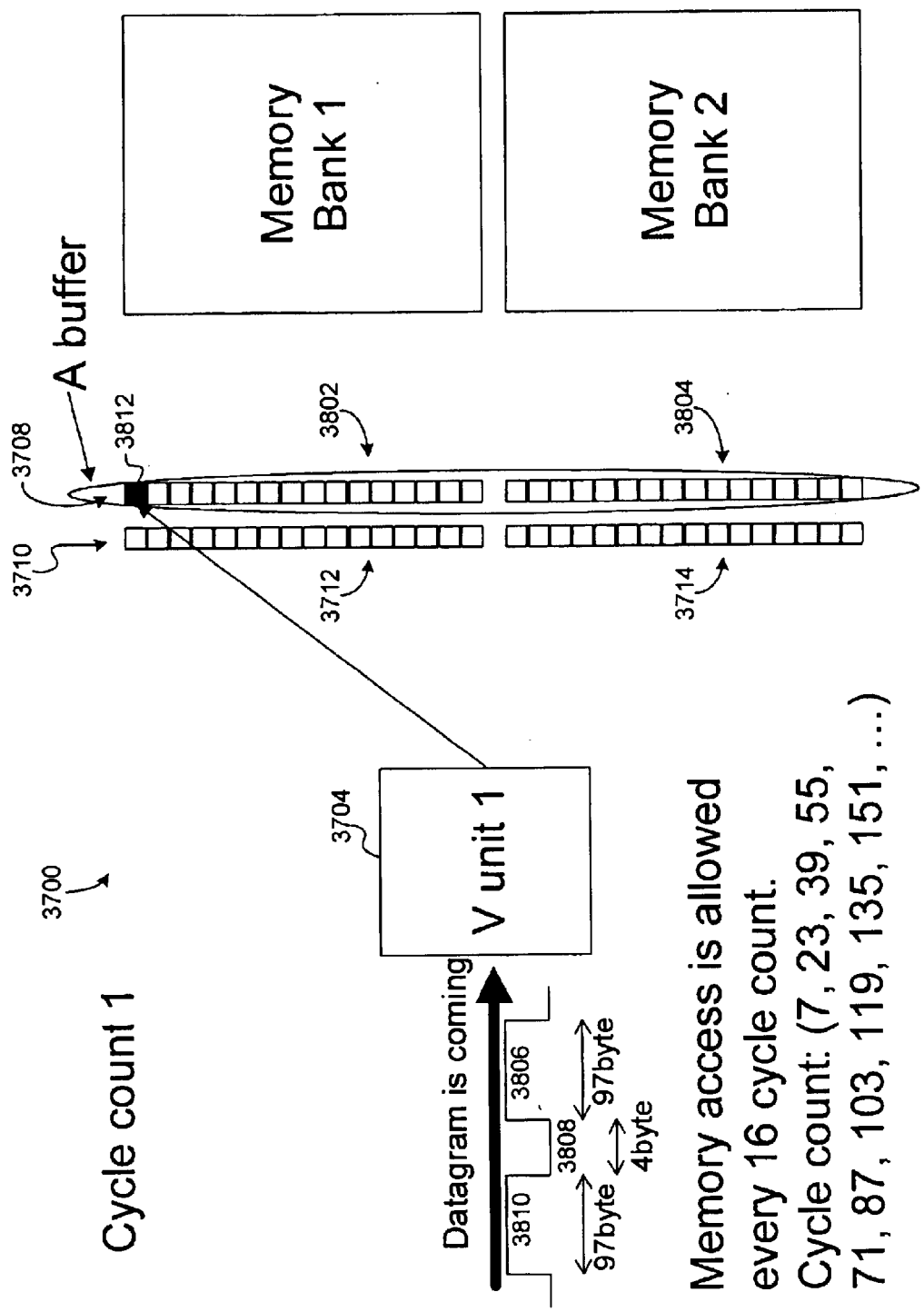
FIG. 38 is a schematic diagram of a scenario illustrating the ingress and storage of packets in a switch fabric component having a pair of two-portion input buffers and a two-memory-bank switch matrix in accordance with an embodiment of the present invention.

FIG. 38 is a schematic diagram of a scenario illustrating the ingress and storage of packets in a switch fabric component 3700 having a pair of two-portion input buffers 3708, 3710 and a two-memory-bank switch matrix 3706 in accordance with an embodiment of the present invention. A first of the two input buffers 3708 comprises a pair of portions ("portion A" 3802 and "portion B" 3804) while the second input buffer 3710 comprises another pair of portions ("portion C" 3712 and "portion D" 3714). Each input buffer 3708, 3710 has a capacity of 32 bytes with each portion 3712, 3714, 3802, 3804 having a capacity of 16 bytes. With reference to FIG. 38, each byte in each of the buffers is represented by a square. A blacked square represents that the particular byte is filled with data.

The ingress receiver 3704 may transfer 1 byte of an incoming packet it is receiving into a byte of one of the input buffers each cycle. The ingress receiver fills the bytes of an input buffer sequentially during this transfer of data. Also, the central controller periodically permits access to the memory every 16-cycle count to allow transfer of data from a portion of an input buffer into the memory (either memory bank 1 3720 or memory bank 2 3722). In the present scenario, memory access is first allowed on cycle count 7 and then allowed on cycle counts, 23, 39, 55, 71, 87, 103, 119, 135, 151, and so on. Additionally, transfer of data from the input buffers to a memory bank only occurs if a portion of the input buffers has been completely filled with data (i.e., 16 bytes of data) or contains the ending byte of a packet (i.e., the last byte of the packet).

Further, the memory banks alternate in receiving packet data from the input buffers. For example, in a first memory access, data may be transferred into memory bank 1, in a second memory access, data may be transferred into memory bank 2, and in a third memory access, data may be transferred into memory bank 3, and so on.

In the scenario presented in FIG. 38, a first incoming packet 3806 having a length of 97 bytes is being transmitted to an ingress receiver 3704 of the switch fabric 3700 followed by a space 3808 of 4 bytes which is then followed by a second incoming packet 3810 having a length of 97 bytes. On cycle count 1, a first byte of the first packet is received by the ingress receiver and transferred to fill a first byte 3812 of portion A 3802 of the first input buffer.

At cycle 7, seven of sixteen bytes of portion A 3812 are filled with the first seven bytes of data of the first packet 3806 and the central controller allows access to the memory banks for the first time in this scenario. However, since none of the portions of the input buffers have been completely filled and none of them contain an ending byte of a packet, no transfer of packet data occurs between the input buffers and memory banks at cycle 7.

At cycle count 16, all sixteen bytes of portion A 3812 of the first input buffer are filled with the first sixteen incoming bytes of packet 1. However, at this point, the next memory access will not occur until cycle count 23.

Figure 39:
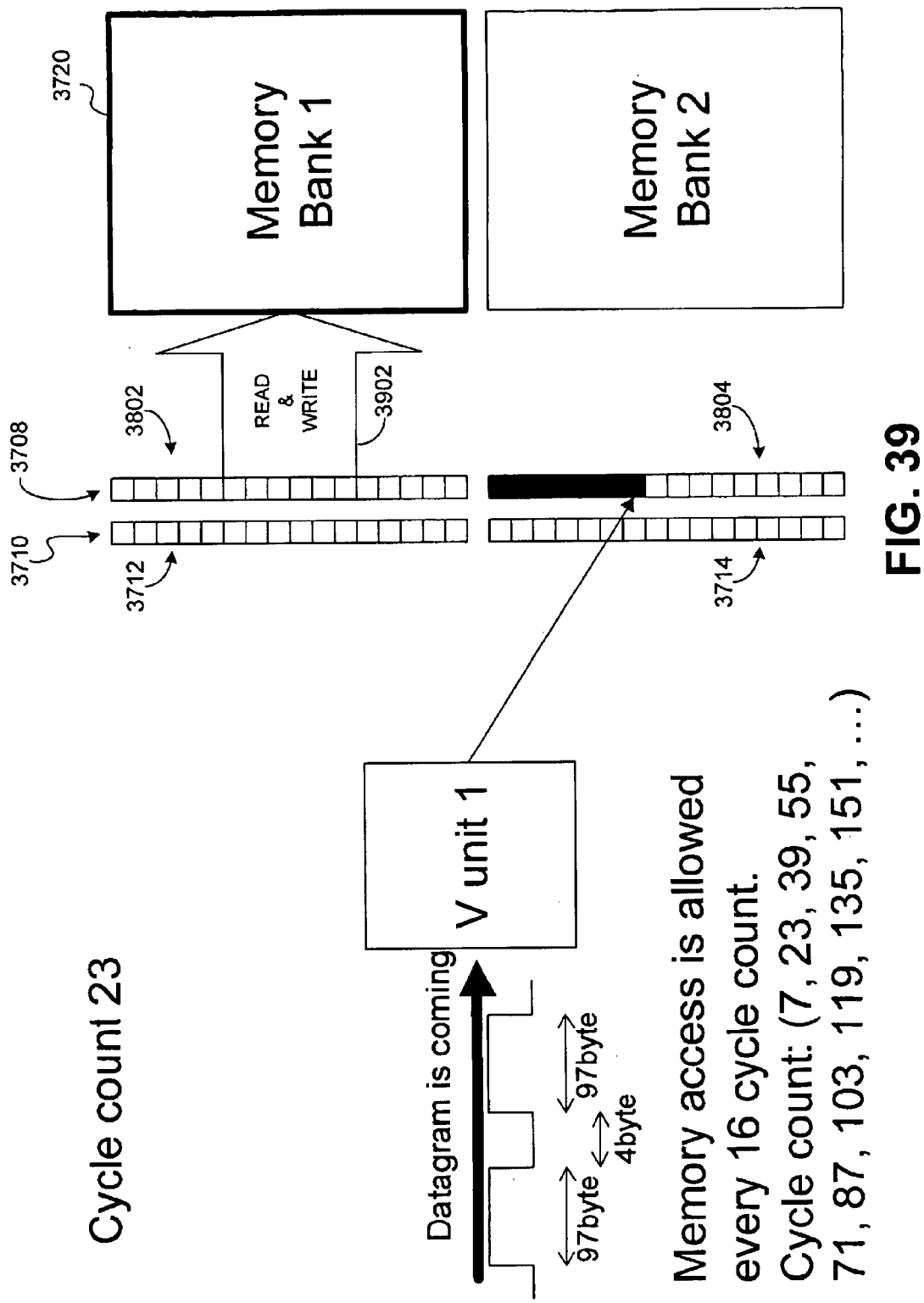
FIG. 39 is a schematic diagram of the scenario set forth in FIG. 38 at cycle count 23 in accordance with an embodiment of the present invention.

FIG. 39 is a schematic diagram of the scenario set forth in FIG. 38 at cycle count 23 in accordance with an embodiment of the present invention. By cycle count 23, seven more bytes of packet 1 have been transferred into portion B 3804 of the input buffer 1. Also, as illustrated in FIG. 39, in cycle count 23, memory access is allowed by the central controller and since portion A of input buffer 1 has been filled (since cycle count 16), the 16 bytes of data contained in portion A 3802 is read and written (see arrow 3902) into memory bank 1 3720 and then cleared from portion A 3802.

By the time of the next memory access at cycle count 39, all of portion B of the input buffer 1 has been filled with data from packet 1 (since cycle count 32) and bytes 33–39 of packet 1 have been transferred to portion C 3712 of input buffer 2 3710. Therefore, at cycle count 39, all of the bytes of data in portion B are transferred (i.e., executing read and write functions) into memory bank 2 3722.

At the time of the next memory access at cycle count 55, all of portion C of input buffer 2 has been filled with data from packet 1 (since cycle count 48) and bytes 49–55 of packet 1 have been transferred to portion D 3714 of input buffer 2 3710. Therefore, at cycle count 55, all of the bytes of data in portion C are transferred (i.e., executing read and write functions) into memory bank 1 3720 (since the memory banks alternate in availability for the receipt of data).

At the time of the next memory access at cycle count 71, all of portion D of input buffer 2 has been filled with data from packet 1 (since cycle count 64) and bytes 65–71 of packet 1 have been transferred to portion A 3802 of input buffer 1 3708. Also at cycle count 71, all of the bytes of data in portion D are transferred into memory bank 2 3722.

The next memory access occurs at cycle count 87, at which time all of portion A of input buffer 1 has been filled with data from packet 1 (since cycle count 80) and bytes 81–87 of packet 1 have been transferred to portion B 3804 of input buffer 1 3708. Also, all of the bytes of data in portion A are transferred into memory bank 1 3720 at cycle count 87.

Figure 40:
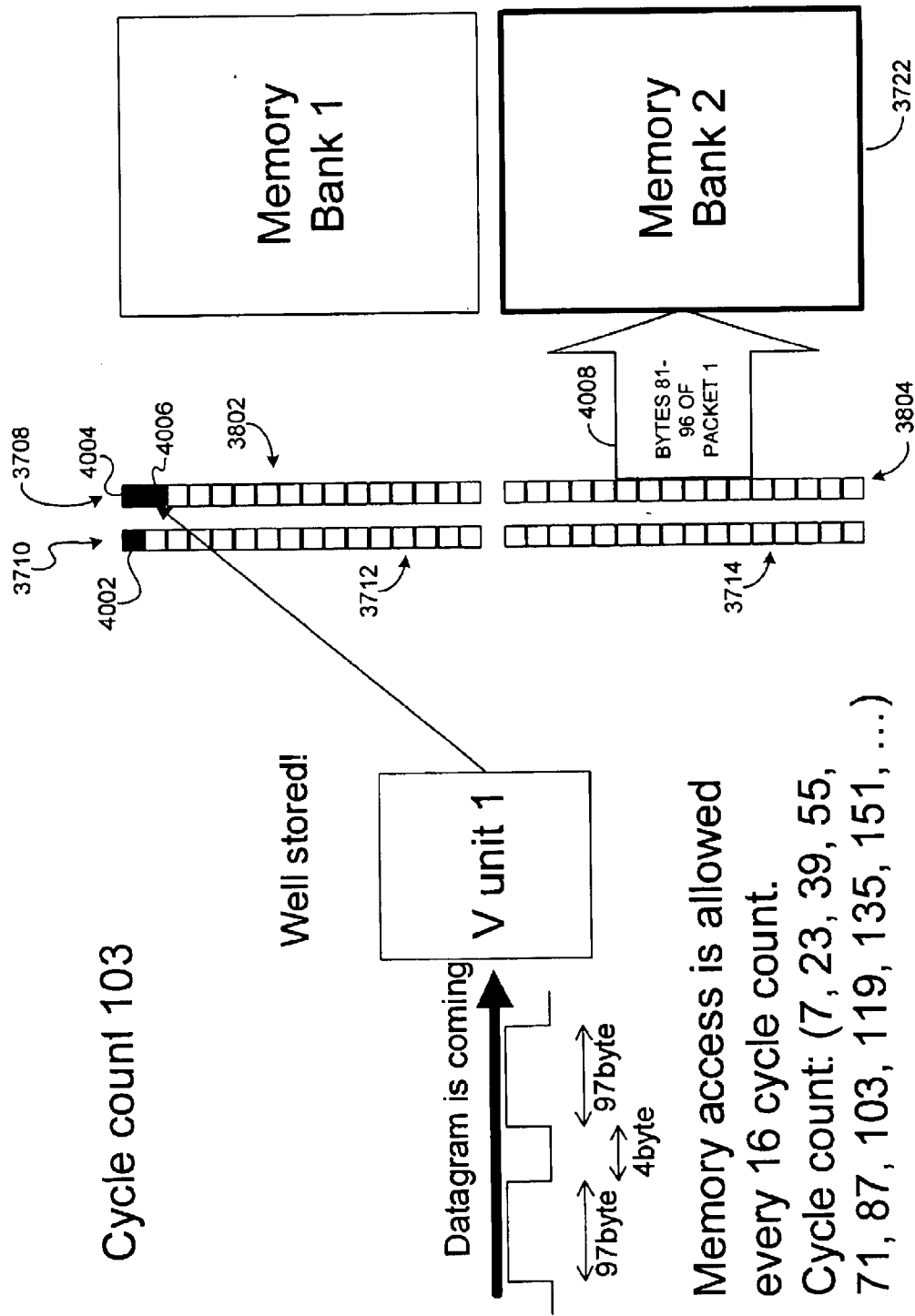
FIG. 40 is a schematic diagram of the scenario set forth in FIG. 38 at cycle count 103 in accordance with an embodiment of the present invention.

FIG. 40 is a schematic diagram of the scenario set forth in FIG. 38 at cycle count 103 in accordance with an embodiment of the present invention. FIG. 40 will be used for the following discussion of what takes places in the scenario between cycle counts 88 and cycle count 103. At cycle count 96, all of portion B of input buffer 1 has been filled with bytes 81–96 of packet 1. At cycle count 97, the last byte of packet 1 (byte 97) is transferred into the first byte 4002 of portion C of input buffer B. Since byte 97 of packet 1 is the ending byte of packet 1, the central controller ends the filling of data into of input buffer 2.

During cycles 98, 99, 100, 101, no data is received by the ingress receiver because of the 4 byte space between packets 1 and 2. At cycle count 102, the first byte of packet 2 is received by the ingress receiver and transferred to the first byte of portion A of input buffer 1. It is important to keep in mind that at this point, portion B of input buffer 1 still contains bytes 81–96 of packet 1. The incoming byte of packet 1 received at cycle count 102 that was transferred to input buffer 1 does not overwrite any of the data from packet 1 that is also concurrently stored in input buffer 1 since the incoming first byte of packet 2 4002 is stored in portion A of input buffer 1 while the stored bytes of packet 1 (bytes 81–96) are stored in portion B of input buffer 1.

At cycle count 103, the next memory access occurs. Bytes 81–96 of packet 1 are transferred to memory bank 2 3722 and portion B of input buffer 1 is cleared. Also during cycle count 103, the second incoming byte 4006 of packet 2 is transferred into portion B of input buffer 1. Byte 97 of packet 1 4002 still remains in portion C 4002 of input buffer 2. At cycle count 119, the next subsequent memory access is allowed by the central controller. At this point, byte 97 of packet 1 4002 is transferred into memory band 1 since byte 97 is an ending byte of a packet. Also transferred into memory bank 1 at cycle count 119 are the first 16 bytes of packet 2 which had completed filled portion A at cycle count 117.

Figure 41:
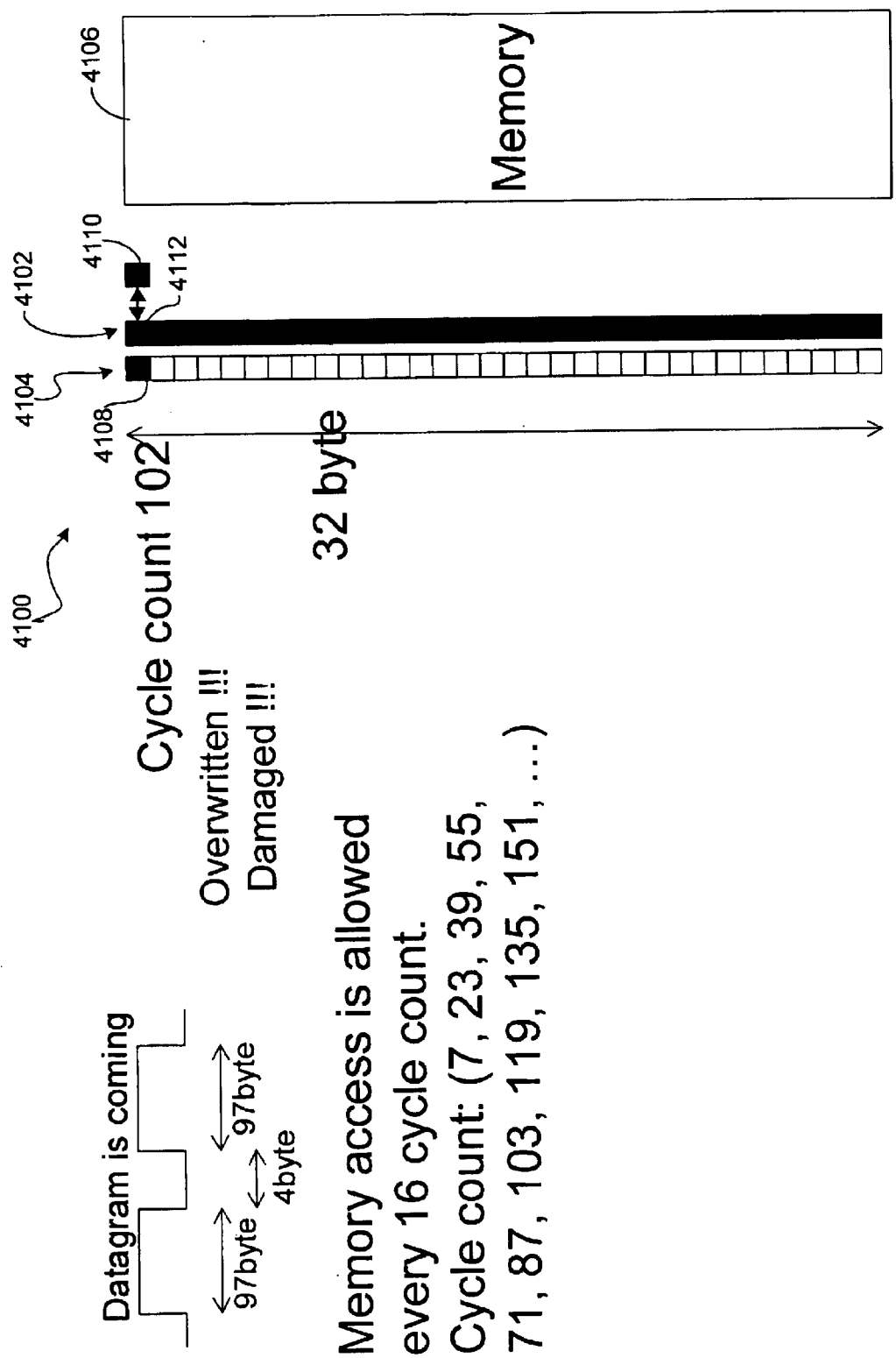
FIG. 41 is a schematic illustration of a scenario similar to scenario presented in FIG. 38 where trivial dual input buffers are used instead of the dual two-portion buffers used in FIG. 38 in accordance with an embodiment of the present invention.

FIG. 41 is a schematic illustration of a scenario 4100 similar to scenario presented in FIG. 38 where trivial dual input buffers 4102, 4104 are used instead of the dual two-portion buffers used in FIG. 38 in accordance with an embodiment of the present invention. Also, in this scenario 4100, a single bank memory 4106 is provided in the switch matrix instead of a dual memory bank Like in the scenario set forth in FIG. 38, each input buffer 4102, 4104 has a capacity for holding 32 bytes with each byte represented by a square in the respective buffer. A blacked square represents that the particular byte is filled with data. The central controller periodically also permits access to the memory every 16-cycle count in this scenario P800 (just as in the scenario of FIG. 38) to allow transfer of data from an input buffer into the memory bank. In this present scenario, memory access is also first allowed on cycle count 7 and then allowed on cycle counts, 23, 39, 55, 71, 87, 103, 119, 135, 151, and so on. Additionally in this scenario 4100, transfer of data from the input buffers to a memory bank only occurs if an input buffer has been completely filled with data (i.e., 32 bytes of data) or contains the ending byte of a packet (i.e., the last byte of the packet).

Furthermore, as in the scenario set forth in FIG. 38, in this scenario 4100, a first incoming packet 3806 having a length of 97 bytes is transmitted to the ingress receiver followed by a space of 4 bytes which is then followed by a second incoming packet having a length of 97 bytes. On cycle count 1, a first byte of the first packet is received by the ingress receiver and transferred to fill a byte of the first input buffer 4102.

As problem with this arrangement when compare to the arrangement set forth in FIG. 38 is that the trivial dual input buffers cannot handle variably-sized incoming packets. This problem is illustrated in FIG. 41:which shows the situation of the scenario 4100 at cycle count 102. At cycle count 96, the first input buffer 4102 is completely filled with bytes 65–96 of the first incoming packet. Because the first input buffer was not filled and did not contain an ending byte of a packet, transfer of the data in the first input butter 4102 was not allowed in the memory accesses at cycle count 71 and 87. At cycle count 97, the last byte (byte 97) 4108 of the first incoming packet is received and transferred to the first byte of the second input buffer 4104. However, the next memory access will be allowed at cycle count 103. Therefore, the data of the first packet in the first input buffer cannot be transferred until cycle count 103.

Between cycle counts 98–101, the space between the incoming packets occurs so no data is transferred into the input buffers during these cycles. At cycle count 102, the first byte 4110 of the second packet is received by the ingress receiver and transferred into the first input buffer (according to standard packet transfer protocols) and therefore overwrites a byte 4112 (byte 65) of the first packet stored in the first input buffer thereby damaging the data of the first packet before it can be transferred into the memory bank 4106. One option to avoid the problem of damaging the data of the first packet such a situation, is to add a third input buffer. Another option is to use the dual two-portion input buffers arrangement as set forth in FIG. 38. By using the dual two-portion input buffers arrangement, a hardware reduction of the total chip area of the switch matrix/switch fabric component may be achieved.

Figure 42:
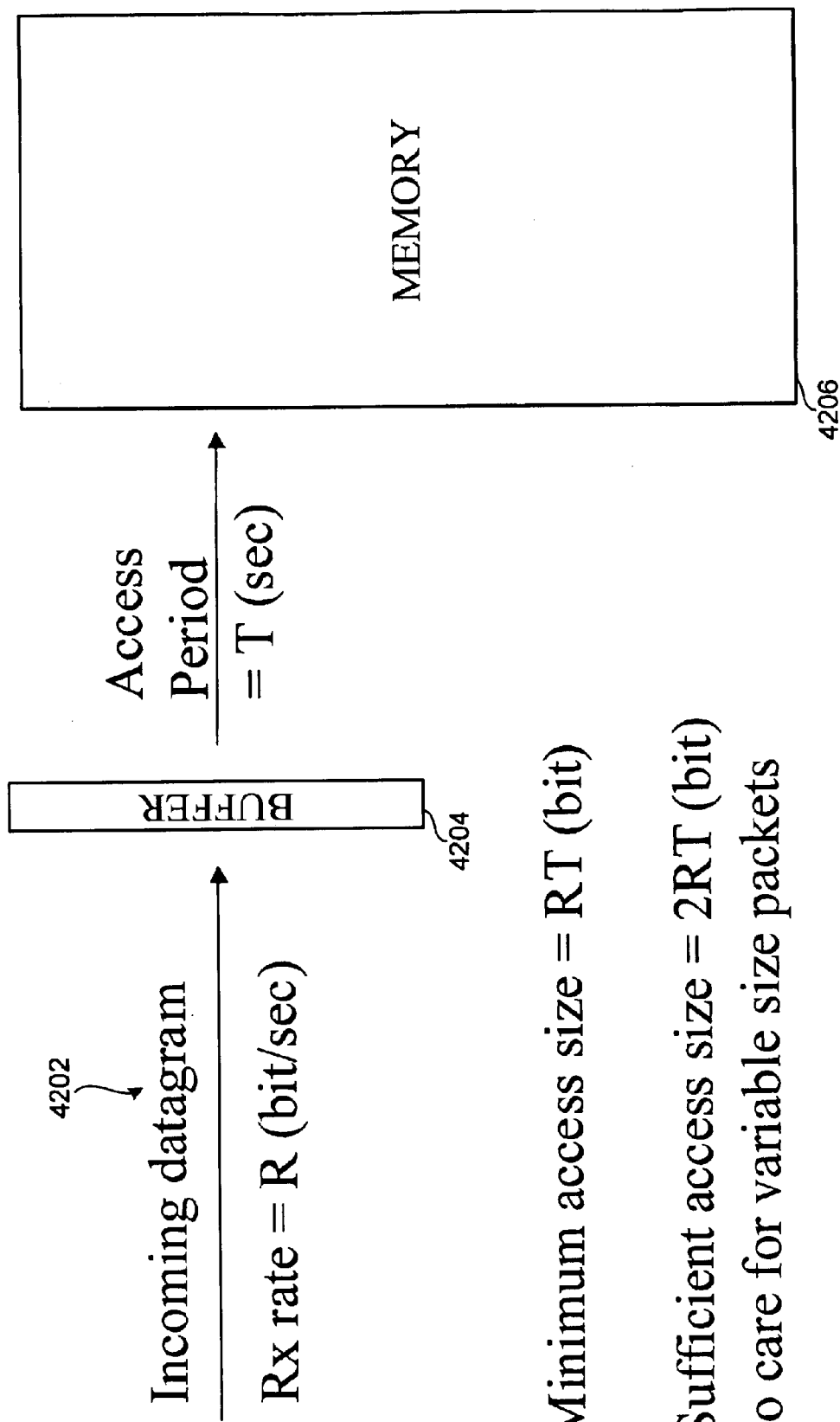
FIG. 42 is a schematic diagram illustrating memory access size for a switch matrix memory bank in accordance with an embodiment of the present invention.

FIG. 42 is a schematic diagram illustrating memory access size for a switch matrix memory bank in accordance with an embodiment of the present invention. The data transmission rate ("Rx rate") for an incoming packet (i.e., datagram) 4202 into a input buffer 4204 may be expressed as R (bit/sec). Access to the memory 4206 is permitted every T(sec) period ("Access Period") for each input buffer (and may also be the same for each output buffer). In accordance with an embodiment of the present invention, a minimum memory access size for a memory is RT (bit). In a preferred embodiment, a memory access size sufficient to care for variably sized packets is 2RT (bit).

Figure 43:
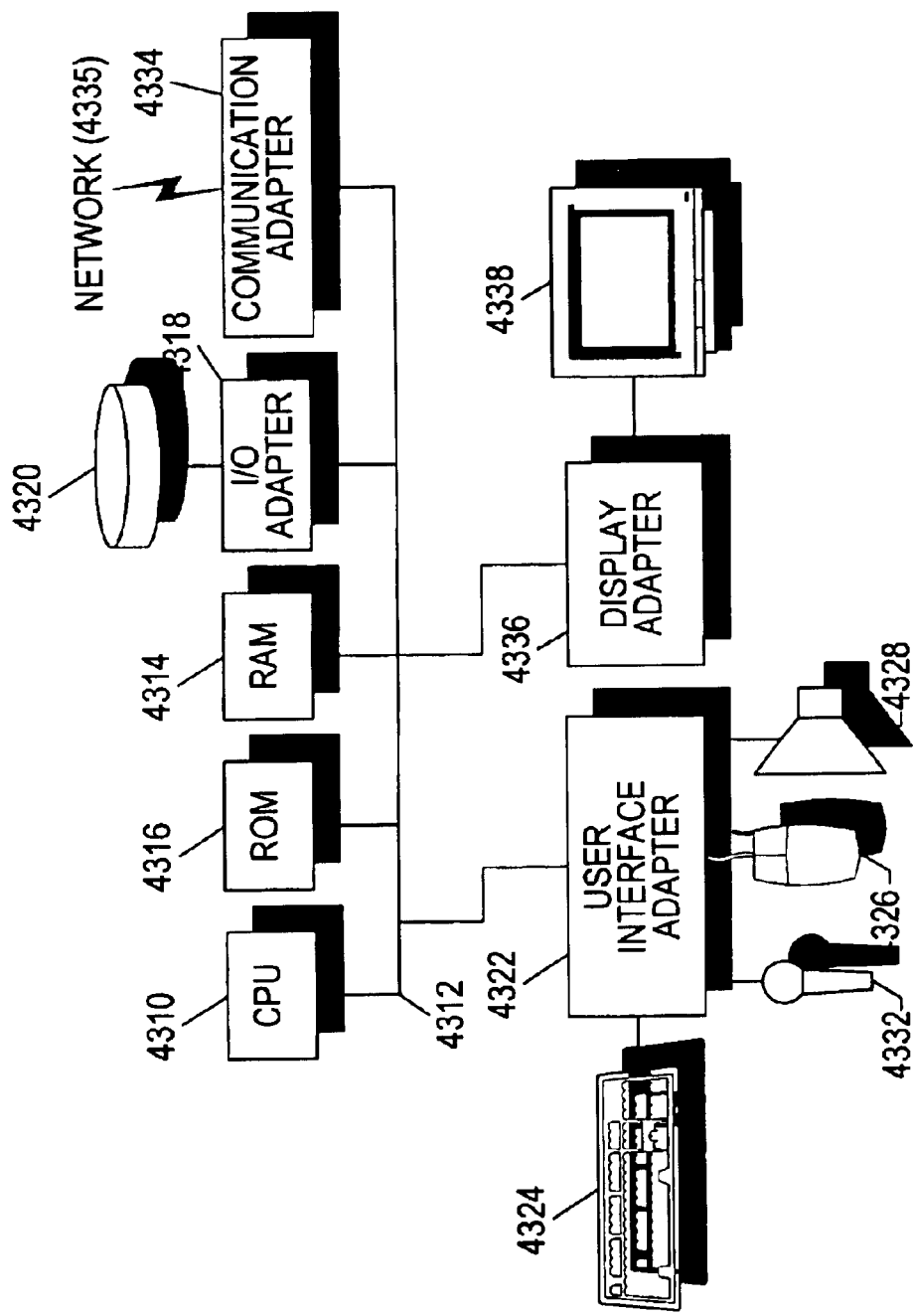
FIG. 43 is a schematic diagram of a hardware implementation of one embodiment of the present invention.

One embodiment of a system in accordance with the present invention may be practiced in the context of a computer such as an IBM compatible personal computer, Apple Macintosh computer or UNIX based workstation. A representative hardware environment is depicted in FIG. 43, which illustrates a typical hardware configuration of a workstation in accordance with an embodiment having a central processing unit 4310, such as a microprocessor, and a number of other units interconnected via a system bus 4312. The workstation further includes a Random Access Memory (RAM) 4314, Read Only Memory (ROM) 4316, an I/O adapter 4318 for connecting peripheral devices such as disk storage units 4320 to the bus 4312, a user interface adapter 4322 for connecting a keyboard 4324, a mouse 4326, a speaker 4328, a microphone 4332, and/or other user interface devices such as a touch screen (not shown) to the bus 4312, communication adapter 4334 for connecting the workstation to a communication network 4335 (e.g., a data processing network) and a display adapter 4336 for connecting the bus 4312 to a display device 4338. The workstation typically has resident thereon an operating system such as the Microsoft Windows NT or Windows/95 Operating System (OS), the IBM OS/2 operating system, the MAC OS, or UNIX operating system. Those skilled in the art will appreciate that embodiments present invention may also be implemented on platforms and operating systems other than those mentioned. An embodiment may be written using JAVA, C, and the C++ language and utilizes object oriented programming methodology.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for updating a switching table in a switch fabric, comprising:
   (a) receiving at a switch fabric component one or more status packets from at least one port controller and a plurality of other switch fabric components, wherein each status packet includes information relating to a status of at least one output port and control information, wherein the information relating to a status of at least output port indicates whether or not the output port is available for receiving, for output therefrom, a datagram transmitted through the switch fabric, and wherein the status packets are received without utilization of a handshaking protocol; and
   (b) updating a switching table in the switch fabric component based on the status information of the received status packets, and wherein the switching table provides information for identifying the availability of one or more ports of the switch fabric component for outputting datagram therefrom.

2. The method of claim 1, wherein the status packets are received via paths in the switch fabric dedicated for transmitting the status packets that are separate from paths dedicated for transmitting Ethernet packets through the switch fabric.

3. The method of claim 1, wherein the status packets are received periodically and the switching table is updated in real time.

4. The method of claim 1, further comprising: generating a combined status packet based on the combined status information of the received status packets, and transmitting the combined status packet to another switch fabric component.

5. The method of claim 4, wherein the combined status packet is transmitted from an outer layer switch fabric component to a middle layer switch fabric component.

6. The method of claim 1, wherein at least one of the one or more received status packets is generated from a port controller.

7. The method of claim 1, wherein at least one of the one or more received status packets is generated by a switch fabric component.

8. The method of claim 1, wherein a status packet comprises 32 bits of data.

9. A system for updating a switching table in a switch fabric, comprising:
   (a) logic for receiving at a switch fabric component one or more status packets from at least one port controller and a plurality of other switch fabric components, wherein each status packet includes information relating to a status of at least one output port and control information, wherein the information relating to a status of at least output port indicates whether or not the output port is available for receiving for output therefrom, a datagram transmitted through the switch fabric, and wherein the status packets are received without utilization of a handshaking protocol; and
   (b) logic for updating a switching table in the switch fabric component based on the status information of the received status packets, and wherein the switching table provides information for identifying the availability of one or more ports of the switch fabric component for outputting datagram therefrom.

10. The system of claim 9, wherein the status packets are received via paths in the switch fabric dedicated for transmitting the status packets that are separate from paths dedicated for transmitting Ethernet packets through the switch fabric.

11. The system of claim 9, wherein the status packets are received periodically and the switching table is updated in real time.

12. The system of claim 9, further comprising logic for generating a combined status packet based on the combined status information of the received status packets, and logic for transmitting the combined status packet to another switch fabric component.

13. The system of claim 12, wherein the combined status packet is transmitted from an outer layer switch fabric component to a middle layer switch fabric component.

14. The system of claim 9, wherein at least one of the one or more received status packets is generated from a port controller.

15. The system of claim 9, wherein at least one of the one or more received status packets is generated by a switch fabric component.

16. The system of claim 9, wherein a status packet comprises 32 bits of data.

17. A computer program product for updating a switching table in a switch fabric, comprising:
   (a) computer code for receiving at a switch fabric component one or more status packets from at least one port controller and a plurality of other switch fabric components, wherein each status packet includes information relating to a status of at least one output port and control information, wherein the information relating to a status of at least output port indicates whether or not the output port is available for receiving, for output therefrom a datagram transmitted through the switch fabric, and wherein the status packets are received without utilization of a handshaking protocol; and (b) computer code for updating a switching table in the switch fabric component based on the status information of the received status packets, and wherein the switching table provides information for identifying the availability of one or more ports of the switch fabric component for outputting datagram therefrom.

18. The computer program product of claim 17, wherein the status packets are received via paths in the switch fabric dedicated for transmitting the status packets that are separate from paths dedicated for transmitting Ethernet packets through the switch fabric.

19. The computer program product of claim 17, wherein the status packets are received periodically and the switching table is updated in real time.

20. The computer program product of claim 17, further comprising computer code for generating a combined status packet based on the combined status information of the received status packets, and computer code for transmitting the combined status packet.

21. A method for updating a switching table in a switch fabric, comprising:

(a) periodically receiving at a switch fabric component of a switch fabric a plurality of status packets from at least one of: a port controller and another switch fabric component; wherein the status packets are received via paths between the receiving switch fabric component and the at least one of the port controller and another switch fabric component dedicated for transmitting the status packets that are separate from paths utilized for transmitting Ethernet packets through the switch fabric, wherein each status packet includes information relating to a status of at least one output port associated with the switch fabric, wherein each status packet comprises 32 bits of data; wherein the status packets are received without utilization of a handshaking protocol between the receiving switch fabric component and the at least one of the port controller and another switch fabric component;

(b) updating in real time a switching table in the receiving switch fabric component based on the status information of the received status packets;

(c) generating in the receiving switch fabric component a combined status packet based on the combined status information of the received status packets; and (d) transmitting the combined status packet to an additional receiving switch fabric component.

22. A system for updating a switching table in a switch fabric, comprising:

(a) logic for periodically receiving at a switch fabric component of a switch fabric a plurality of status packets from at least one of: a port controller and another switch fabric component; wherein the status packets are received via paths between the receiving switch fabric component and the at least one of the port controller and another switch fabric component dedicated for transmitting the status packets that are separate from paths utilized for transmitting Ethernet packets through the switch fabric, wherein each status packet includes information relating to a status of at least one output port associated with the switch fabric, wherein each status packet comprises 32 bits of data; wherein the status packets are received without utilization of a handshaking protocol between the receiving switch fabric component and the at least one of the port controller and another switch fabric component;

(b) logic for updating in real time a switching table in the receiving switch fabric component based on the status information of the received status packets;

(c) logic for generating in the receiving switch fabric component a combined status packet based on the combined status information of the received status packets; and (d) logic for transmitting the combined status packet to an additional receiving switch fabric component.

23. A computer program product for updating a switching table in a switch fabric, comprising:

(a) computer code for periodically receiving at a switch fabric component of a switch fabric a plurality of status packets from at least one of: a port controller and another switch fabric component; wherein the status packets are received via paths between the receiving switch fabric component and the at least one of the port controller and another switch fabric component dedicated for transmitting the status packets that are separate from paths utilized for transmitting Ethernet packets through the switch fabric, wherein each status packet includes information relating to a status of at least one output port associated with the switch fabric, wherein each status packet comprises 32 bits of data; wherein the status packets are received without utilization of a handshaking protocol between the receiving switch fabric component and the at least one of the port controller and another switch fabric component;

(b) computer code for updating in real time a switching table in the receiving switch fabric component based on the status information of the received status packets;

(c) computer code for generating in the receiving switch fabric component a combined status packet based on the combined status information of the received status packets; and (d) computer code for transmitting the combined status packet to an additional receiving switch fabric component.

24. A method for updating a switching table in a switch fabric, comprising:

(a) periodically receiving at a switch fabric component of a switch fabric a plurality of status packets from a plurality of a port controller and a plurality of other switch fabric components; wherein the status packets are received via paths between the receiving switch fabric component and the port controllers and other switch fabric components dedicated for transmitting the status packets, wherein each status packet includes information relating to a status of at least one output port associated with the switch fabric, wherein the status packets are received without utilization of a handshaking protocol between the receiving switch fabric component and the at least one of the port controller and another switch fabric component;

(b) updating in real time a switching table in the receiving switch fabric component based on the status information of the received status packets;

(c) generating in the receiving switch fabric component a combined status packet based on the combined status information of the received status packets; and (d) transmitting the combined status packet to an additional receiving switch fabric component.

25. A method for updating a switching table in a switch fabric comprising a plurality of outer layer switch fabric components and a plurality of inner layer switch fabric components interposed between the outer layer switch fabric components, each of the outer layer switch fabric components having at least one port controller for receiving a datagram for output therefrom and a switching table, the method comprising:

(a) each outer layer switch fabric component receiving a status packet from each associated port controller, wherein each status packet includes information relating to a status of the respective port controller for receiving a datagram for output therefrom, (b) each outer layer switch fabric component transmitting to each inner layer switch fabric component a status packet containing information relating to the status of the associated port controller for receiving a datagram for output therefrom;

(c) each inner layer switch fabric component updating its switching table based on the status information of the status packets received from the outer switch fabrics;

(d) each inner layer switch fabric component generating a status packet based on the status information contained in the status packets received from the outer layer switch fabric components;

(e) each inner layer switch fabric components transmitting the associated generated status packet to the outer layer switch fabric components; and (f) each outer switch fabric component updating its switching table based on the status information of the status packets received from the inner switch fabric components.

* * * * *